(12) United States Patent
Koonce et al.

(10) Patent No.: US 10,237,368 B2
(45) Date of Patent: Mar. 19, 2019

(54) SEMANTIC INFORMATION PROCESSING

(71) Applicant: Virtuanet LLC, Saint Louis, MO (US)

(72) Inventors: Michael Sean Koonce, Saint Louis, MO (US); Soeb Ahmed, Saint Louis, MO (US)

(73) Assignee: Virtuanet LLC, St. Louis, MO (US)

( * ) Notice: Subject to any disclaimer, the term of this patent is extended or adjusted under 35 U.S.C. 154(b) by 425 days.

(21) Appl. No.: 14/981,467

(22) Filed: Dec. 28, 2015

(65) Prior Publication Data

US 2016/0285999 A1 Sep. 29, 2016

Related U.S. Application Data

(62) Division of application No. 13/331,506, filed on Dec. 20, 2011, now Pat. No. 9,230,019.

(60) Provisional application No. 61/426,951, filed on Dec. 23, 2010.

(51) Int. Cl.
| | |
|---|---|
| *G06F 15/16* | (2006.01) |
| *H04L 29/08* | (2006.01) |
| *G06F 16/95* | (2019.01) |
| *G06N 5/02* | (2006.01) |
| *G06Q 30/02* | (2012.01) |

(52) U.S. Cl.
CPC ............ *H04L 67/306* (2013.01); *G06F 16/95* (2019.01); *G06N 5/02* (2013.01); *G06Q 30/0277* (2013.01); *H04L 67/18* (2013.01); *H04L 67/22* (2013.01)

(58) Field of Classification Search
CPC ....... H04L 67/306; H04L 67/18; H04L 67/22; G06F 17/30861; G06N 5/02; G06Q 30/0277
See application file for complete search history.

(56) References Cited

U.S. PATENT DOCUMENTS

| | | |
|---|---|---|
| 5,754,938 A | 5/1998 | Herz et al. |
| 5,754,939 A | 5/1998 | Herz et al. |
| 5,835,087 A | 11/1998 | Herz et al. |
| 5,890,152 A | 3/1999 | Rapaport et al. |
| 6,029,195 A | 2/2000 | Herz |
| 6,460,036 B1 | 10/2002 | Herz |
| 6,834,195 B2 | 12/2004 | Brandenberg et al. |
| 6,868,525 B1 | 3/2005 | Szabo |
| 7,062,475 B1 | 6/2006 | Szabo et al. |
| 7,181,438 B1 | 2/2007 | Szabo |
| 7,483,871 B2 | 1/2009 | Herz |
| 7,801,896 B2 | 9/2010 | Szabo |

(Continued)

*Primary Examiner* — Jonathan A Bui
(74) *Attorney, Agent, or Firm* — Armstrong Teasdale LLP

(57) ABSTRACT

A system for exchanging various forms of information between computer-executable agents. A computing device is configured to determine semantic data associated with each data object (DO) of a plurality of DOs. Each DO is associated with a location, and the semantic data describes the content of the associated DO. The computing device receives, from a first user computing device, a request for DO information and, in response to the request, provides DO information including the locations and the semantic data associated with the retrieved DOs to the user computing device by (a) transmitting the locations and the semantic data to the first user computing device, and/or (b) instructing the first user computing device to request the DO information from a second user computing device to which the locations and the semantic data were previously transmitted.

12 Claims, 34 Drawing Sheets

(56) References Cited

U.S. PATENT DOCUMENTS

| | | |
|---|---|---|
| 8,224,968 B1 | 7/2012 | Chen et al. |
| 2004/0230572 A1 | 11/2004 | Omoigui |
| 2004/0267700 A1 | 12/2004 | Dumais et al. |
| 2005/0165613 A1* | 7/2005 | Kim ............... G06F 17/30017 705/1.1 |
| 2006/0173985 A1 | 8/2006 | Moore |
| 2007/0055697 A1 | 3/2007 | Parlin et al. |
| 2007/0061301 A1* | 3/2007 | Ramer ............ G06F 17/30867 |
| 2007/0064702 A1 | 3/2007 | Bates et al. |
| 2007/0081197 A1 | 4/2007 | Omoigui |
| 2008/0005086 A1 | 1/2008 | Moore |
| 2008/0215557 A1* | 9/2008 | Ramer ............ G06F 17/30749 |
| 2008/0294584 A1 | 11/2008 | Herz |
| 2008/0301246 A1 | 12/2008 | Gkantsidis et al. |
| 2010/0070448 A1* | 3/2010 | Omoigui ............ H01L 27/1463 706/47 |
| 2010/0100543 A1* | 4/2010 | Brady ............. G06F 17/30613 707/732 |
| 2010/0122312 A1* | 5/2010 | Green ................ G06Q 30/02 726/1 |
| 2010/0169338 A1 | 7/2010 | Kenedy et al. |
| 2010/0191825 A1 | 7/2010 | Yamagishi et al. |
| 2010/0205541 A1 | 8/2010 | Rapaport et al. |
| 2010/0293248 A1 | 11/2010 | Kamay et al. |
| 2011/0029514 A1* | 2/2011 | Kerschberg ....... G06F 17/30648 707/732 |
| 2011/0106614 A1* | 5/2011 | Ramer ............. G06F 17/30867 705/14.46 |
| 2011/0137882 A1* | 6/2011 | Weerasinghe .... G06F 17/30864 707/707 |
| 2011/0225153 A1* | 9/2011 | Haseyama ........ G06F 17/3002 707/736 |
| 2012/0079029 A1 | 3/2012 | Damola et al. |
| 2012/0136935 A1 | 5/2012 | Tcha et al. |
| 2012/0278326 A1 | 11/2012 | Bauer |
| 2012/0278386 A1 | 11/2012 | Losacco et al. |
| 2013/0117413 A1 | 5/2013 | Kaneko et al. |
| 2013/0144981 A1 | 6/2013 | Koreeda et al. |
| 2014/0304214 A1* | 10/2014 | Sakunkoo ............ G06N 5/022 706/55 |

* cited by examiner

Steps:
1: Initial request sent
2: Information propagation Agent locations sent back
3-6: Peer to Peer request and response for information
7-8: Reporting of peer to peer information relay to Agent A Steps:
1: Initial request to contact
2: FOAF information request
3: FOAF information response
4: Contact relay of FOAF response

SEMANTIC INFORMATION PROCESSING

CROSS-REFERENCE TO RELATED APPLICATIONS

This application is a divisional of application Ser. No. 13/331,506, filed on Dec. 20, 2011, which is hereby incorporated by reference in its entirety.

BACKGROUND

Aspects of the disclosure relate to information exchange and transmission, the semantic internet, and intelligent agents. In particular, aspects of the disclosure relate to a new and useful system that efficiently allows intelligent agents to communicate, interact, consume and process semantic data, and present useful information to users for a personalized and secure internet experience.

Semantics is the study of meaning. The semantic web is a term encompassing a vision of the internet in which machines, such as agents, are semantically intelligent and understand the meaning of the information they consume.

The vision of a semantic internet has yet to be realized as web pages are meant for humans to read and not machines. To get around this problem, semantic schemas and languages have been developed so that machines may better understand text encountered on the internet. Some of the popular schemas include XML, RDF, OWL, and SPARQL. Usually a person manually transforms a human readable web page, usually in HTML, into a corresponding machine readable page in one or more of these formats or protocols.

SUMMARY

Briefly stated, aspects of the disclosure involve a system in which various forms of information, such as semantic information and intelligence about data objects, can be efficiently transferred between autonomous and semi-autonomous intelligent agent programs. The system uses P2P and/or centralized transmission schemas to effectively share data and limit network and computer resource usage such as bandwidth and processor power. The system includes three parts. It contains one central point referred to as a master agent, transmission schemas for information exchange, and a network of connected user agents. The transmission schemas allow user agents and a centralized master agent to exchange information with each other. This network architecture provides solutions for connecting producers and consumers directly together thereby increasing the dissemination of pertinent information to users. It provides security and privacy, allowing for the sharing of networking responsibilities, and increasing the marketability of the internet itself.

Further, aspects of the disclosure involve a system in which a self-organizing intelligence construct can efficiently and accurately make information decisions on behalf of its user. It can predict which DataObjects the user would be interested in consuming over the domain of internet DataObjects. As a user's preferences change over time so does the adapting intelligence construct. The construct can also communicate with other constructs throughout the internet in both a centralized or decentralized manner. The system can keep user consumption information private from central points like websites while still being able to serve up personalized, targeted ads and DataObjects to the user.

DETAILED DESCRIPTION

Figure 1:
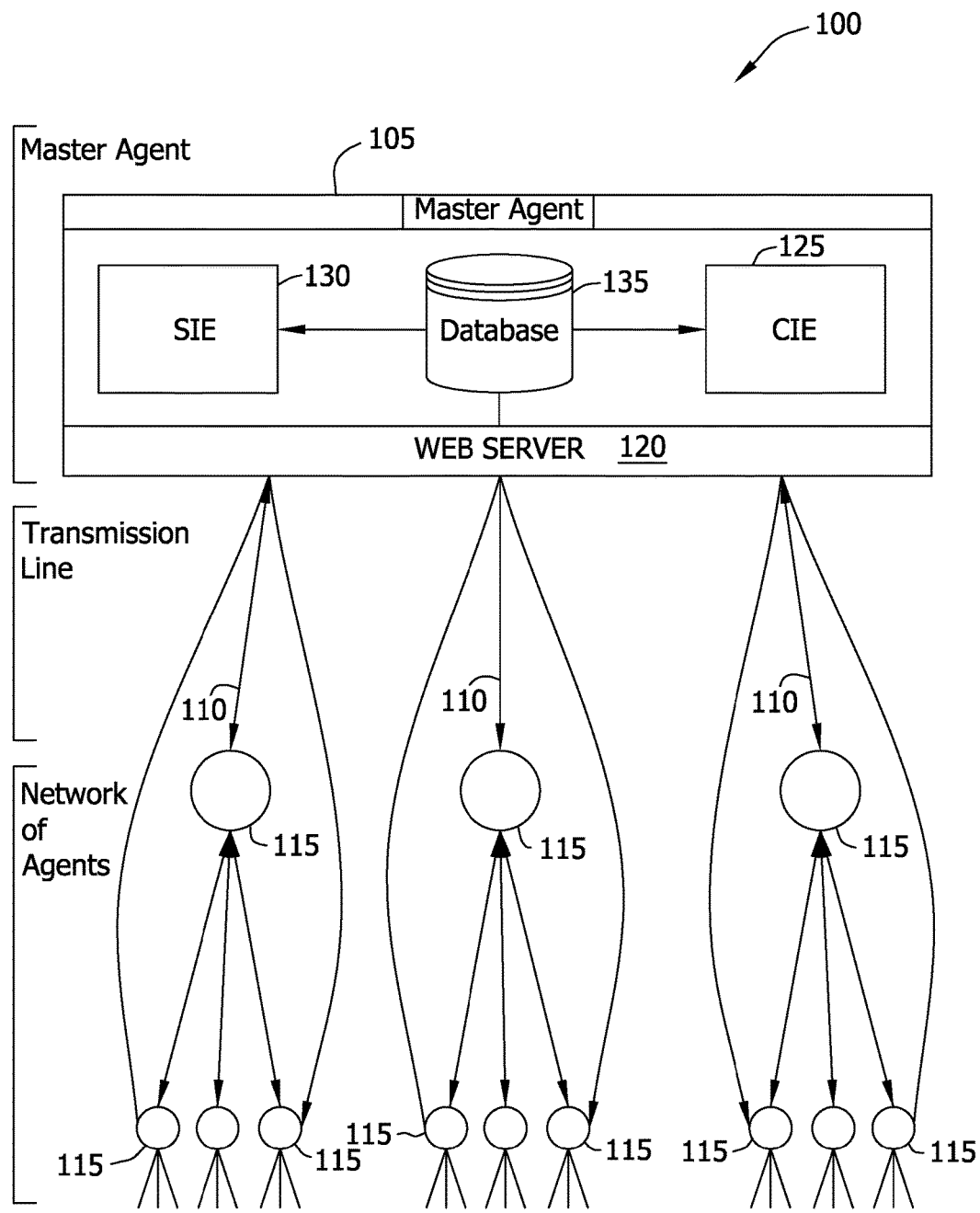
FIG. 1 is a block diagram of an information exchange system with a Master Agent (SIE, CIE, DB, WS), transmission lines, and user agents with diagram information propagation sequence.

The following abbreviations and exemplary definitions are used to describe some embodiments of the disclosure.

ACL=Access Control List
API=Application Programming Interface
CA=Contact Agent
CIE=Collective Intelligence Engine
DB=Database
DE=Decision Engine
DO=DataObject
FOAF=Friend of a Friend
FSM=Finite State Machine
LTM=Long Term Memory
MA=Master Agent
NN=Neural Network
NOA=Network of Agents
OSA=Original Sending Agent
P2P=Peer to Peer (or Agent to Agent)
PA=Proxy Agent
PSTU=People Similar to you
RPA=Randomly Paired Agent
SIE=Semantic Intelligence Engine
SOPC=Self-Organizing Preference Component
UA=User Agent
UGC=User Generated Content
UI=User Interface
WS=Web Server Anonymization network—A network in which the transmission of information is transferred between proxies in such a way as to enable internet anonymity of the original sender from the perspective of the final destination node.

Autonomous Agent—An autonomous agent that can operate based on input and other environmental stimuli, not just on explicit user commands alone. Autonomous agents can have different degrees of autonomy. Some agents do not get help from a central point or a network of other agents to assist in information gathering, transmission, and processing tasks. Some communicate sporadically with other agents and central points. Still others rely on shared network duties between other agents and central points for proper operation. In some fashion, autonomous agents gather information, process it, and make decisions or perform tasks for its user. Autonomous agents keep an internal routing table to communicate with information sources and other agents. They do not necessarily need to use a central point as an index to locate and communicate with other agents; however, this does not exclude autonomous agents from using a central point from finding another network entity. Weakly autonomous agents rely on a central point like a master agent for network information and intelligence updates but executes intelligence and information ranking of DataObjects itself. A strongly autonomous agent is a self-sufficient agent that gathers intelligence and information by itself on the internet. Although a strongly autonomous agent doesn't necessarily need updates from a master agent, it can exchange information by communicating in a P2P manner with other user agents and master agents.

Browser—A computer program that displays web content for a user

Client-Server Architecture—A centralized network architecture in which users on a network called clients make requests to servers, which host websites, for information that is stored on the server. The server responds to the client by sending back the requested information.

Concepts—A distinctly classified space of ideas and/or things

Consumer—A user or a user's agent that consumes information

DataObject—A document, body of text, image, or other collection of data, such as a story, advertisement, event, restaurant information, retail sale or coupon, message, phone call (e.g., an audio recording or transcript), file, webpage, video, audio recording, TV Show, movie, product, person or network user profile, or any source of information. DataObjects include, but are not limited to, descriptions of a person, place, or thing. Each DataObject is associated with a location from which the DataObject may be accessed. For example, the location may include a uniform resource identifier (URI) (e.g., a uniform resource locator and uniform resource name), a shared storage location, and/or any other address at which a computing device may access (e.g., download) the DataObject.

Entity—Something that is real and exists or has existed in the past such as a particular person, place, or thing.

Environment—Any external information domain of data that is input to the learning system.

Environmental Stimuli—Data object information within the environment that the system consumes. This is any information that can be reduced down to text including voice.

Information Exchange—Information that is exchanged between two parties. It could be semantic-type information about DataObjects, commands for sharing information with others or distributed computing commands between agents.

Intelligent Agent—A computer program acting on the behalf of a user. It has the ability to understand semantic data. Based on input data, agents can make decisions and predictions for its user. It can perform tasks for the user and present the user with new and useful information. Intelligent agents have different degrees of autonomy.

Network Supporter—Node on the network that contributes to the flow of information. Such a node could be a website that stores information (online drive), a node that specializes in streaming information to other nodes, or a node that does distributed computation for agents. These nodes could be user agents, a master agent, or special programs and network resources set up to interact with the system's flow of information.

P2P—Peer-To-Peer or Agent-To-Agent

Passive Consumption—Consumption by a user in which information is implicitly brought and presented to the user, such as by an intelligent agent. In such a scenario the user does not have to explicitly go out and find information manually in order to consume it.

Producer—A user or user's agent that produces information such as a story, webpage, video, etc. Websites are also considered producers for the information that they produce.

Recommender system—A computer program that tries to recommend informational items such a films, television shows, music, etc to an interested user.

Secure transmission—Encrypted transmission between two parties that is communicated in such a way that a third party cannot listen in and understand the transmission.

Semantic data—Information describing the essence or content of a DataObject. In exemplary embodiments, semantic data associated with a DataObject includes entities (e.g., people, places, times, and/or events) referenced by the DataObject, as well as relationships between the referenced entities. For example, a DataObject may indicate that a particular person became the head of state of a particular country on a particular date.

SPO—Subject-Predicate-Object grammar statement

TOR—A network of nodes set up to anonymize user information such as the location of a user and mask other factors that could identify them. TOR stands for "The Onion Router" because information is packaged in encrypted, layered envelopes where proxy nodes can only decrypt one layer telling them how to route the message while not giving access to the message payload.

User Interface—A computer program that controls the display for a user on a viewing device like a computer monitor and allows the user to interact and give commands to computer programs.

User Preferences—Information of what a person does in life and their overall personal composition. This information could include information consumption, activities, feeling and emotions, things related to the person such as affiliations, and physical and mental characteristics of the person.

Exemplary embodiments provide one or more of the following features:

1. A generalized intelligence that handles any problem space to make decisions. Conventional recommender system algorithms to solve specific problems in small problem spaces. The system described herein, also referred to as a "construct", adapts to the problem space by its own actions and with help from the SIE. Conventional systems include hard coded, unchanging programs specifically coded for their particular problem spaces.

2. Decision models allow the construct to make decisions and take actions—including a recommendation—but could be an action based on action model, such as transmitting a notification or playing an audio track.

3. Autonomous user agents learn on their own, sharing with each other in a peer to peer manner and/or with central points, amalgamating experiences together to become smarter by new intelligence and learnings sharing. Each agent can re-assemble dimensions with newly added or deleted dimensions and still make decisions, assess how that affects success or failure, and adapt decision models accordingly if advantageous.

4. Advertisement personalization for an advertiser/producer while keeping advertising selection and/or viewing private from the advertiser/producer. Accordingly, the system may operate as a secure middle man between the producer, the ad network, and the user 5. An ability to passively retrieve DOs/ads for the user while keeping user information private from central points (e.g., the master agent) and/or untrusted parties.

6. An ability to passively share DOs with other users without explicit action. This is in contrast on how people share information using social media, where the user must take explicit action, like clicking a "share" button, to share content. Agents may automatically share consumed DOs (if user permissions allow) with each other and filter if those shared DOs are shown to a user based on user preference. Sharing and filtering are performed transparently to the user, such that the user sees only DOs determined to be relevant.

7. An ability for anyone to produce DOs, get those DOs to interested user (passively), and earn money from the DO with personalized, privatized ads.

8. An architecture in which an SIE performs intelligence processing (e.g., extracts semantic data from a DO) and then sends semantic data to a client to make a decision (on the client processor) about which DOs to present to a user. Analysis is performed by an SIE type program, and condensed essence list is sent from the SIE to a client program, which performs personalized decision making to recommend a DO, take action with respect to the DO, or do nothing, based on the semantic data associated with the DO.

9. The state of the user agent may be copied (e.g., synchronized) between devices. Attributes used by the user agent, such as depth of computation, DO types to access, etc., may be specified per device.

10. Dimensions of a problem are determined by an SIE like device, which creates a decision model and sends the decision model to a client. The client can also determine new (and/or delete, and/or change weightings of) dimensions in a problem space as the context might be different for different users or client computers. As an example, a desktop agent can request and get more information like elements within the operating system (OS) file system, how the elements are related to files, what files are and contain, etc., for the local agent to determine how such information may be relevant to a user of the OS.

11. Condensed essence lists may include advertisements.

Specific examples are used herein to describe the function of exemplary embodiments. Accordingly, references to "the system", "this system", and "the construct" are exemplary only.

Semantic Internet Logistical Information Exchange System

In exemplary embodiments, agent programs perform information gathering, information transmission, and other tasks on behalf of users. In order to perform the tasks, the agents have some level of intelligence to efficiently interact with the vast environment of the World Wide Web. Agents not only interact with data sources but also with other agents. Agents can share data and intelligence with each other. In this manner the semantic web is slightly different that the current, mostly centralized internet where browsers are powered by explicit user commands to consume data in a client-server fashion.

Semantic tools referred to herein are capable of describing relations within text that a computer program can understand. In exemplary embodiments, methods described herein employ a "top-down" approach to the semantic web. The top-down approach may be understood as a scheme in which a semantic computer system retrieves and consumes certain types of information. This information is processed and exposed, possibly in semantic formats, to external systems through a web service or an Application Programming Interface (API). Exemplary embodiments employ a top-down approach for gathering and semantically processing data before transmitting processed data to a network of agents.

The theoretical view of the semantic web is an internet that is more decentralized and is based on intelligent agents. Agents can share information and intelligence with each other in a peer-to-peer (P2P) manner without going through centralized points like websites. Because agents are semantically intelligent, websites, and the internet itself, become more of an open database where agents query sources by consuming the content, analyze the content for its semantic value, and perform some useful function on the content for the user. The useful functions of agents could be as simple as recommending content to a user for consumption. In this way agents make decisions for the user. They predict what the user would like to consume.

In exemplary embodiments, agents are not required to perform computationally intensive tasks, such as individually gathering information from a myriad of sources on the internet and then classifying the data. Rather, such tasks may be performed by a centralized master agent. Further, because processed data is provided to decentralized agents by the master agent, the need for agents to rely upon other agents to provide such data is obviated. Accordingly, exemplary embodiments reduce or eliminate the need to synchronize this data among an entire system of decentralized agents.

Exemplary embodiments use a central point for gathering and distribution while allowing agents to work semi-autonomously. Agents are thus freed from the responsibility of having to autonomously query the internet for information or rely on other, connected agents for new information updates. Computation by agents may be concentrated on processing data for users, giving the user a better internet experience while optimizing the use of network and local resources.

The essence of the semantic web is bringing meaning and order to the internet's information. Once agents understand the meaning of the information they consume, they can bring information to users. These aspects of the disclosure allow the logistical networking means for such a scenario. The scenario may be understood as a "passive" internet experience where users no longer have to explicitly go out and find information on websites. The information they are interested in is brought to them. This system also helps to negate the problems of information overload and "bad" information hits (e.g., falsely identifying irrelevant information as relevant). Highly probable, "good" information hits are presented to users by their filtering intelligent agents. This system provides an infrastructure enabling such an improved user experience.

Users generally have little control over third party information sharing (e.g., among websites) and are usually unaware of it. Further, some computer systems request account credentials from a user to access contacts and/or other information from a corresponding account. From a security point of view, sharing credentials with third parties is extremely insecure. Exemplary embodiments operate without sharing user behavior information between websites and without requiring a user to share account credentials between websites. For example, exemplary network architectures support the network agents' ability to keep desired user information private and away from centralized points like websites and advertising networks.

For optimization purposes, exemplary embodiments allow both decentralized and centralized information transmissions. A master agent holds collective network information and intelligence of the system. The master agent updates user agents with updated network information through a propagation scheme. Then user agents can propagate the information to other agents throughout the network. As mentioned earlier, it's computationally intensive for a user agent to consume all the information on the web, break it down, process it, and make it useful for user presentation. The client resources of memory and permanent disk space have to be extremely large. It's more efficient and logistically feasible to have a master agent that does most of the work before sending the digested knowledge to user agents. It's also more efficient for user agents to aggregate information on a master agent that can collectively process, store, and retransmit the updated data.

Because the master agent takes the responsibility of gathering information, classifying it, and then disseminating it to a network of agents, it can directly connect producers of information with the likely consumer of that information. Central points, like websites, become optional as agents exchange information in a mesh of connected consumers and producers. Producers can be central points, such as websites, or other network agents whose users produce user-generated-content (UGC). UGC may be stored within a central point because of the predominant client-server network architecture of the internet. This causes problems in the continual support and production of new information. Central points usually get the majority, if not all, of the advertising revenue from the contributions of others. Exemplary embodiments enable an internet marketing model in which producers of content are directly paid based on the popularity of their contributions since in most cases there is no need for a middle man.

Methods and systems described herein facilitate simplified distribution of information to interested parties via agents. For example, DataObjects may be disseminated through the agent network. In some embodiments, DataObjects include advertisements, and an agent may select the advertisements that are determined to be most relevant for the user of the agent. This mechanism provides a marketable vehicle for advertisers, thereby encouraging the continual production and publication of DataObjects by network producers. Accordingly, agents may precisely target people yet not infringe on their privacy. An information exchange structure allows agents to provide a passive entertainment experience, similar to TV, for their users.

In exemplary embodiments, no source or producer on the network receives preferential treatment or has an unfair advantage because of size, leverage, user base, or capital. Rather, all producers are equal and have an equal opportunity to produce information and to publish that information on the network so others can consume it. Because the agent pulls information instead of the user needing to know where to go to find information, which is usually the sites with the biggest advertising budgets to reach users through brand recognition, a fairer method of competition is provided for information exchange. For example, a local classified advertisement of a garage sale has just as much potential visibility as a news story from a major news outlet because of the ability the system gives agents to pull and rapidly assess information.

In some embodiments, agents work together in a collective, swarm-like manner. The agents can share information, the distributed processing of information, storage of data, and other logistical network responsibilities in cohesion. The system also allows agents to share intelligence for collective learning which can be efficiently aggregated and processed on the master agent. Agents can work together in an anonymity network (e.g., similar to TOR) to anonymize the source of a request for information, thereby enabling a withholding of the user's identity and consumption from centralized points. The system has a scheme to accept anonymized consumption reporting yet verify that reporting sent in is correct and has not been changed by malicious agents on the network.

Exemplary embodiments provide one or more notable features, as described below.

1. Support for seamless sharing of information where pertinent information desirable to users is retrieved autonomously on their behalf. Agents associated with similar users are enabled to share information with each other so that users can consume new and useful sources of information that they would not have done so otherwise.

2. Support for agents that are stateful and keep user information private. This system works with agents to validate consumption data from agents without infringing on user privacy rights. Through private transmissions between agents, the system has a collective memory of what all users of the system are doing on the internet, even within silos.

This facilitates collaboration, new information discovery, and increases in collective learning.

3. The current internet client-server infrastructure is difficult to create sustainable business models by marketing to internet users. The current internet architecture makes it practically impossible to effectively market to users without infringing on their privacy rights. This system gives intelligent agents the infrastructure and support to increase the business value of the internet to marketers without infringing upon user privacy rights. This system provides the mechanism for marketability by sending out advertisements that are semantically classified for agents to process so that each user can be better targeted in a private manner.

4. The system allows a global collective memory to emerge based on the experiences of each user agent that is aggregated to the master agent. Currently most semantic data is manually created by a human for very small, local knowledge areas such as a webpage. There is no system that can tie all these local areas of knowledge together for a bigger, more intelligent viewpoint of the internet, its information, and how it is semantically related. This system can accomplish these tasks with its network infrastructure. It provides a master agent and a user agent a logistic and efficient means of transferring information. Some examples of collective knowledge that can be learned by the system: male teens like to watch violent movies; more women go to church than men; 25% of users are not planning to vote in an election where candidate x has 65% of the vote of known voters; financial professionals like to read the Wall Street Journal; 21-34 year-olds are most likely to go to bars and night clubs on Friday and Saturday night over any other demographic.

5. Through support of information gathering and dissemination duties, the system makes it feasible for intelligent agents to operate efficiently and brings about a purer vision of the semantic web where bottom-up and top-down approaches have been nonexistent or have failed to materialize all together.

6. Through its coordination of agent information propagation and distributed computing, the system maximizes network resource allocation and usage. It assists agents in using each other to better serve their users. Because resources are used more efficiently, the system uses less overall resources, especially at central points, for information processing and distribution.

7. The system supports agents in giving users a passive internet experience by the continual distribution of pre-processed and summarized semantically described DataObjects. This allows agents to expend most of their energies analyzing just the condensed DataObjects that they are sent for presentation to the user. This encourages the frequency of useful, good information hits to the user without overloading the user with information. Current trends on websites, especially social media sites, leverage their user base to transfer information. Information is virally disseminated between site contacts with little or no analysis of how the information pertains to the user. Massive amounts of poor information hits are presented to the user, degrading the user experience.

8. Systems as described herein can be used to help to solve copyright infringement issues. The system can calculate the similarity of DataObjects through a comparison of the semantic composition between DataObjects. Whether published and/or hosted by some party on the internet, the system can make sure to notify the correct copyright holder of the issue and make sure that monies earned from consumption of the DataObject are received by the correct party.

9. The system facilitates eliminating unfair advantages to information producers that reach audiences simply because of market position and brand recognition alone. The system enables equality in the dissemination of information and ability to reach users. Each content producer may have equal means to publish and disseminate information. Anyone has the ability to produce DOs, get those DOs to interested users passively through the network of agents, and make money off the DOs with personalized, privatized advertisements. The system will automatically pick up newly produced information, analyze it, and send it out to the network of agents where people interested in it will be able to consume it. This more passive experience is in contrast to current systems of producers explicitly having to put information on websites and consumers explicitly having to go out and find the information to consume it.

10. A network of agents as described herein may make the web more marketable as people can anonymously be targeted without tracking, thereby abiding by user privacy rights and/or preferences. The Master Agent has the ability to work with the network of agents to keep user data private. In particular, personalized, private advertisements that are semantically analyzed, delivered, and reported back to central point in an anonymous way. The anonymous advertising may allow personalized marketing without infringing on user's privacy and a reporting scheme that can be verified as accurate without revealing the consumer of the advertisement or infringing on a user's privacy. If there are malicious nodes on network they can be identified and ostracized. Individual preferences are not aggregated on a central point away from user control.

11. The system architecture is conducive to supporting traditional forms of media on the internet. For example investigative journalist can publish stories and still reach an audience. They directly benefit based on consumption and can continue their art without the need of support from a major media outlet.

12. The intelligence of the system may increase over time based on collective knowledge aggregated on the master agents from the network of user agents it serves information to.

13. Since the system is stateful, it can help to minimize the impact and prevalence of malware and other malicious content introduced into the system by actively seeking and ostracizing the producers of such content.

14. The system enables the production of relevant, serendipitous information hits for users. It can find better (e.g., more relevant), newer information based on collective data consumption habits and user similarity comparisons. Users have the chance to consume information that they wouldn't have seen or consumed alone.

15. The system is conducive toward the emergence of collective intelligence and problems solving through the use and dissemination of decision models between network agents and the Master Agent.

16. The system is conducive toward collective, swarm-like behavior to share network responsibilities between network agents and a Master Agent.

17. The system architecture allows the SIE to do the heavy intelligence calculations on analyzing the meaning of DOs and creating decision models. With the help of a MA, lists of the semantic essence of DOs, including advertisements, as well as decision models are sent to client agents where decisions are made on whether or not to take an action such as recommending DOs.

FIG. 1 is a block diagram of an exemplary information exchange system 100 including three parts, which may take the form of executable software components. The first part is of the system is the Master Agent 105, which may be abbreviated as "MA". The master agent 105 aggregates system knowledge and intelligence and is the central point of the system. The second part of the system is the transmission schemas 110 of information to and from the user agents 115. The transmissions 110 are packaged correctly for agents to understand and compact enough for quick transfer over the wire. The last part of the system is a network of intelligent agents 115 that receive information transmissions from the master agent 105. These agents 115 work on behalf of their associated users and may be referred to as user agents 115, abbreviated as "UA". The master agent 105 supplies the agents 115 with packaged, semantic data such as webpages, movies, advertisements, and also included semantic intelligence itself. These agents 115 in return work with the master agent 105 to report user actions and consumption history in a privatized way such that the collective intelligence of the system can increase over time without disclosing details of individual user behavior.

By having these three components working together an effective system of information and knowledge transfer is provided. Using a central point (e.g., the master agent 105) in coordination with a network of agents 115 means that the agents 115 do not have to perform redundant data gathering and analysis. A waste of time and resources would occur with decentralized agents working autonomously to query the information sources on the internet. Logistical problems also occur in a network of agents working together to gather and process information. Synchronizing information and maintaining network state is difficult and resource intensive. By using a master agent 105 that specializes in information gathering, semantic processing, and transmission, it is more efficient than having a myriad of agents doing it autonomously or working together in a decentralized manner.

The components can facilitate the emergence of auxiliary properties of the system. A system acts as a framework of information and intelligence where the production of information can accurately and seamlessly find the correct consumers for it. This architecture leads to other beneficial characteristics as well such as keeping user information private while allowing for a more personalized, yet anonymous, marketing approach for information producers.

Master Agent

The master agent is different from a user agent. In exemplary embodiments, the master agent is associated with greater computational and network resources than those associated with typical user agents. Referring to FIG. 1, the master agent 105 includes a web server (WS) 120, collective intelligence engine (CIE) 125, and semantic intelligence engine (SIE) 130. The WS 120 takes in information from and sends information to network user agents 115. Network agents 115 can communicate with the master agent 105 in a centralized manner through the master agent's WS 120. A database 135 stores data provided by, and/or retrieved by, WS 120, CIE 125, and SIE 130.

The web server portion of the master agent acts as the internet or agent network facing part of the system. It acts as a central point that sends and receives messages from agents, keeps network state for agents while they are offline, and coordinates transmissions and network responsibilities between agents. The WS keeps track of each agent's user DataObject consumption and explicit user actions such as commenting on, sharing, or rating DataObjects.

The WS is the point of service for agent queries for information they don't know. When agents are unable to find answers from connected agents, the master agent can be called upon to solve a knowledge problem. An agent may have never encountered a certain piece of semantic data that makes up a DataObject. In order to process the DataObject correctly, it can query the master agent for all metadata and intelligence relating to the new piece of data.

The master agent keeps network state for the agents while they are offline. The WS is responsible for updating agents with DataObjects and messages sent to them when they come back online. Once online the information stored temporarily on the master agent is retrieved and sent to the newly online agent. It keeps a record of new DataObjects that offline agents miss.

The master agent can work and coordinate tasks for network agents. It is beneficial for agents to work in coordination with each other or a master agent for network cohesion. If they work together and share responsibilities then the users of agents can benefit with better overall service from their agent. For example the master agent can pair together two agents that do not know each other but are online at opposite times of the day. Therefore one agent can do the semantic processing of DataObjects for the other agent while it is offline. Once the offline agent comes online, there is not a DataObject processing delay in presenting DataObjects to the user. These agents will trade off processing duties with each other while the other is offline to increase the user experience for both of their users.

The web server works in coordination with a CIE. The CIE records user action and consumption information sent in from agents. Collective data goes to the CIE for processing. The CIE processes the information to form a collective knowledge base that makes the whole network smarter and better at working together. The CIE determines similarity between agents on the network, similarity between DataObjects on the network, DataObject popularity, global user sentiment toward concepts and DataObjects, and "hot spots" where people and agents are aggregating around the internet for data consumption. The CIE records and calculates collective metadata about DataObjects such as which are most popular, top rated, shared, etc. The CIE will package data based on its calculations so that it can be output to the agents. The packaged information is sent to the WS to be sent out with other DataObject transmissions.

Sometimes agents discover new information that they can share with the CIE, a special function of the CIE is analyzing new knowledge sent to it by agents. These new insights range from new semantic relations to new websites and producers. It can record new semantic knowledge learned by agents and analyze the knowledge for its collective value. If enough agents in the field observe or learn the same knowledge it will reach a learning threshold, and the CIE can pass on that knowledge to the SIE to be incorporated into its intelligence database (e.g., in database 135). The CIE can also pass it on to other agents in the network that may benefit from it. In this way a network of agents can learn and become smarter over time. The new, collective knowledge of agents populates and augments the SIE's central knowledge base over time. The CIE supports both supervised and unsupervised learning schemes so that an administrator can approve of new system knowledge before adoption.

The WS and CIE together are able to semantically analyze knowledge and DataObjects. They work in conjunction with an SIE. Together, these components allow the master agent to act as a bridge between information producers and information consumers. It can implicitly retrieve data from producers such as websites or receive data that is explicitly sent to it by agents such as user generated content (UGC). The data is analyzed by the SIE for its semantic value. The SIE is responsible for understanding the information that producers on the network create so that it can be sent back out to user agents to process further and possibly recommend to their users.

After the DataObjects are analyzed by the SIE, their semantic content is extracted and summarized so they can be compactly packaged into a low bandwidth version. Before the WS can send out the DataObjects, the CIE calculates the similarity between DataObjects on the network so that agents can avoid presenting redundant DataObjects to users. The WS gets the new streams of DataObjects and distributes them to agents on the network. This compressed version allows thousands of DataObjects can be sent out together to agents for further processing.

Exemplary embodiments perform information discovery, semantic value processing, packaging, and distribution at a central point. An autonomous agent or completely decentralized network of agents could accomplish the same tasks but it would take massive amounts of computing power on the client computer, an extremely complex information syncing algorithm between all the agents, and high amounts of bandwidth. Therefore, a central point for such a semantic network frees up the user agents to spend their time evaluating information for the user.

System Transmissions

The second part of the system is the transmission schemas (shown as transmissions 110 in FIG. 1) and methods that allow the system to transfer information effectively in a timely, resource-friendly manner. Although most websites at present relay and send all information to the user, this involves a substantial quantity of web servers, processing resources, and bandwidth. This system facilitates effectively transferring information without requiring nearly as many resources per user supported in the network. It does this by propagating information throughout the network instead of one-on-one transfer from each user to the central point.

Figure 2A:
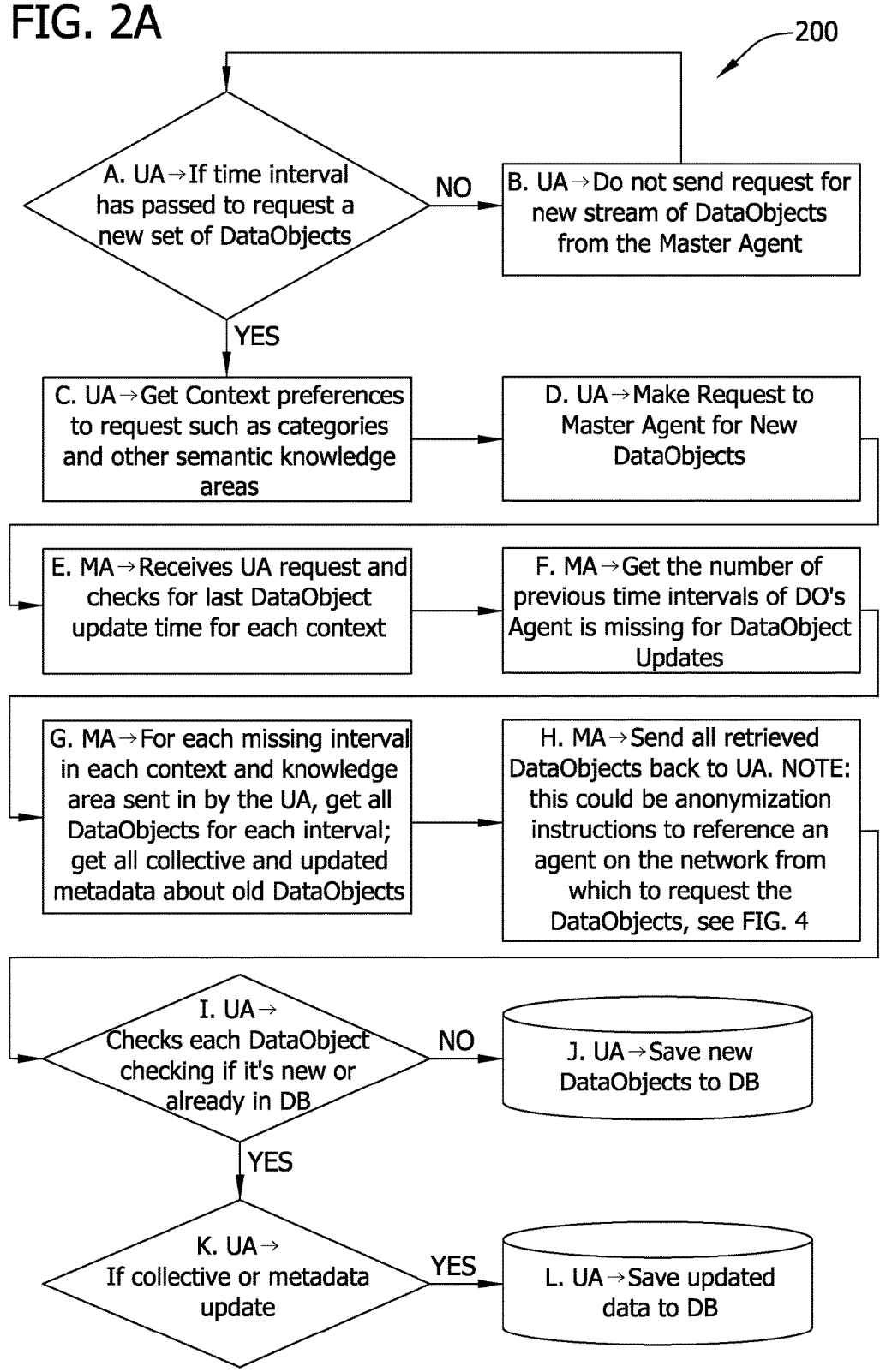
FIGS. 2A and 2B are a flowchart of an exemplary method of master agent communicating with a user agent for getting new DataObjects.
Figure 2B:
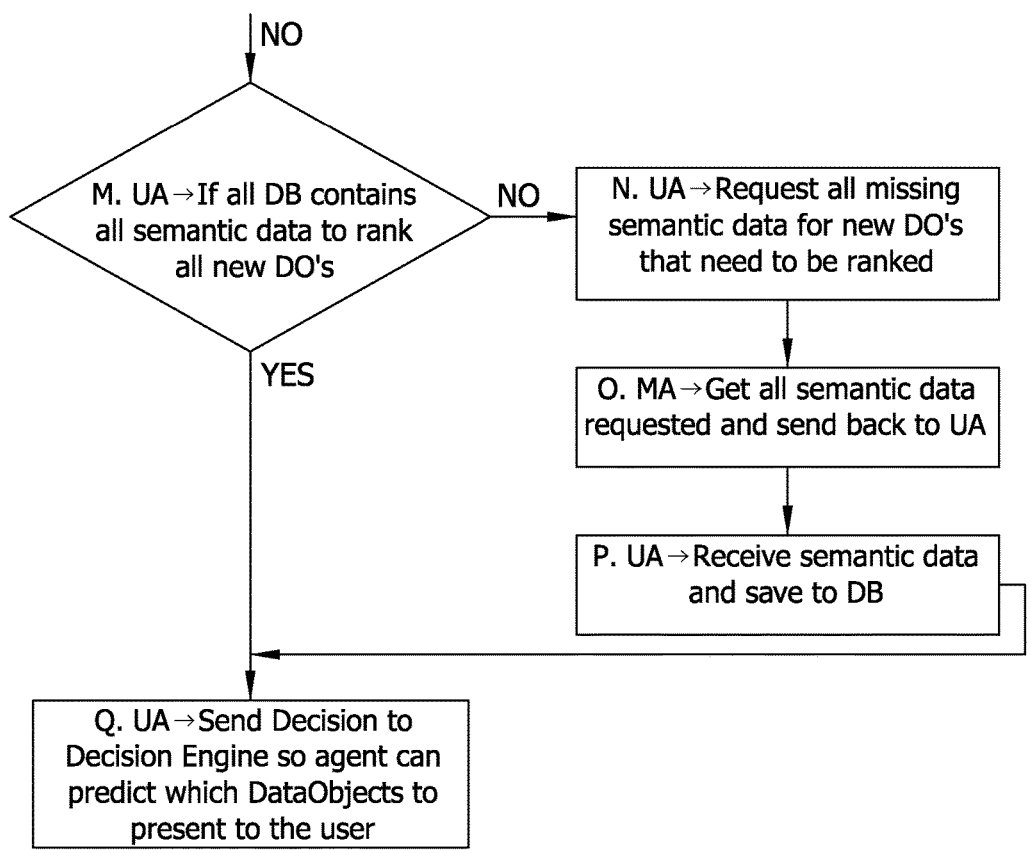
Figure 3:
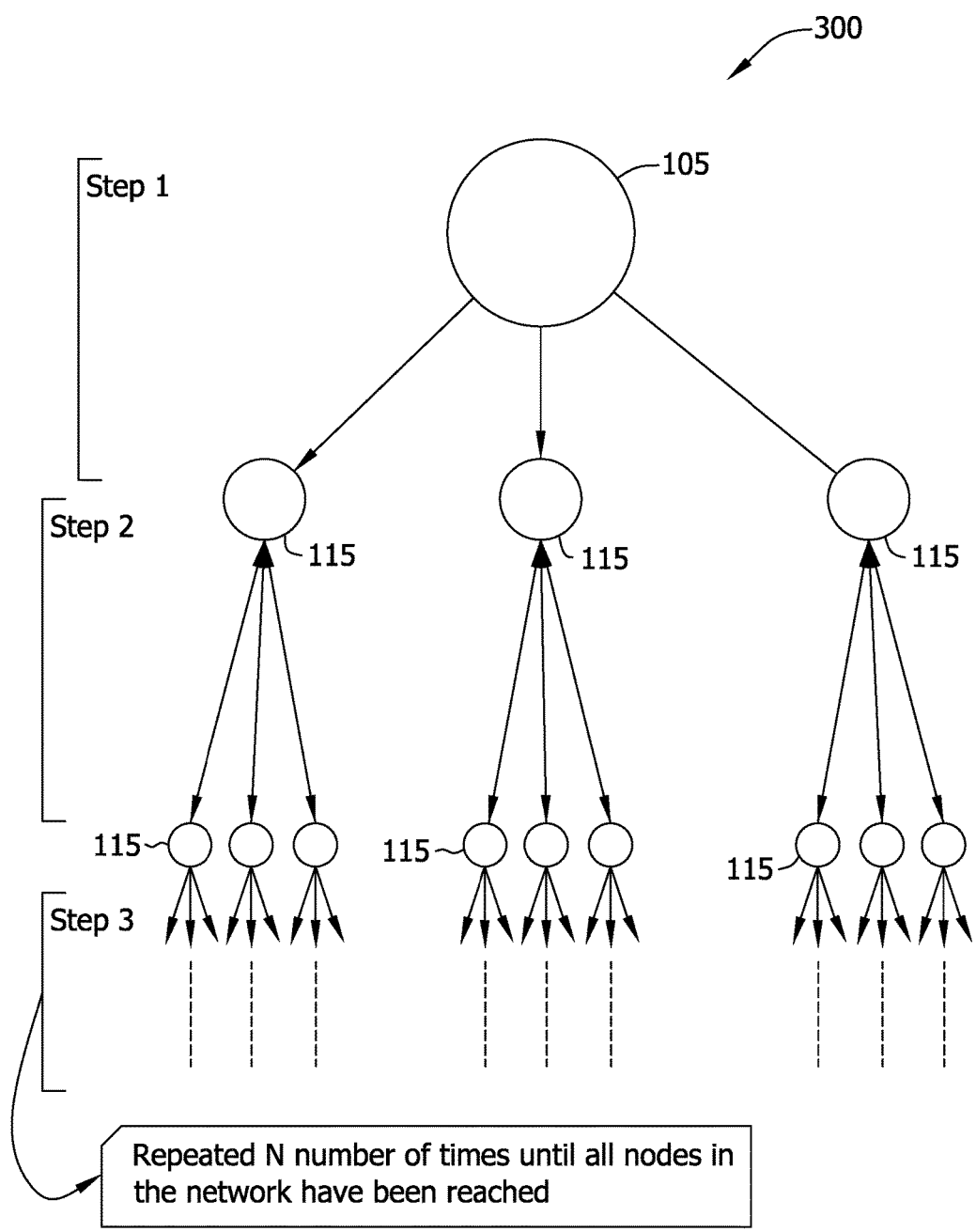
FIG. 3 is a diagram of network raw propagation sequence.
Figure 4:
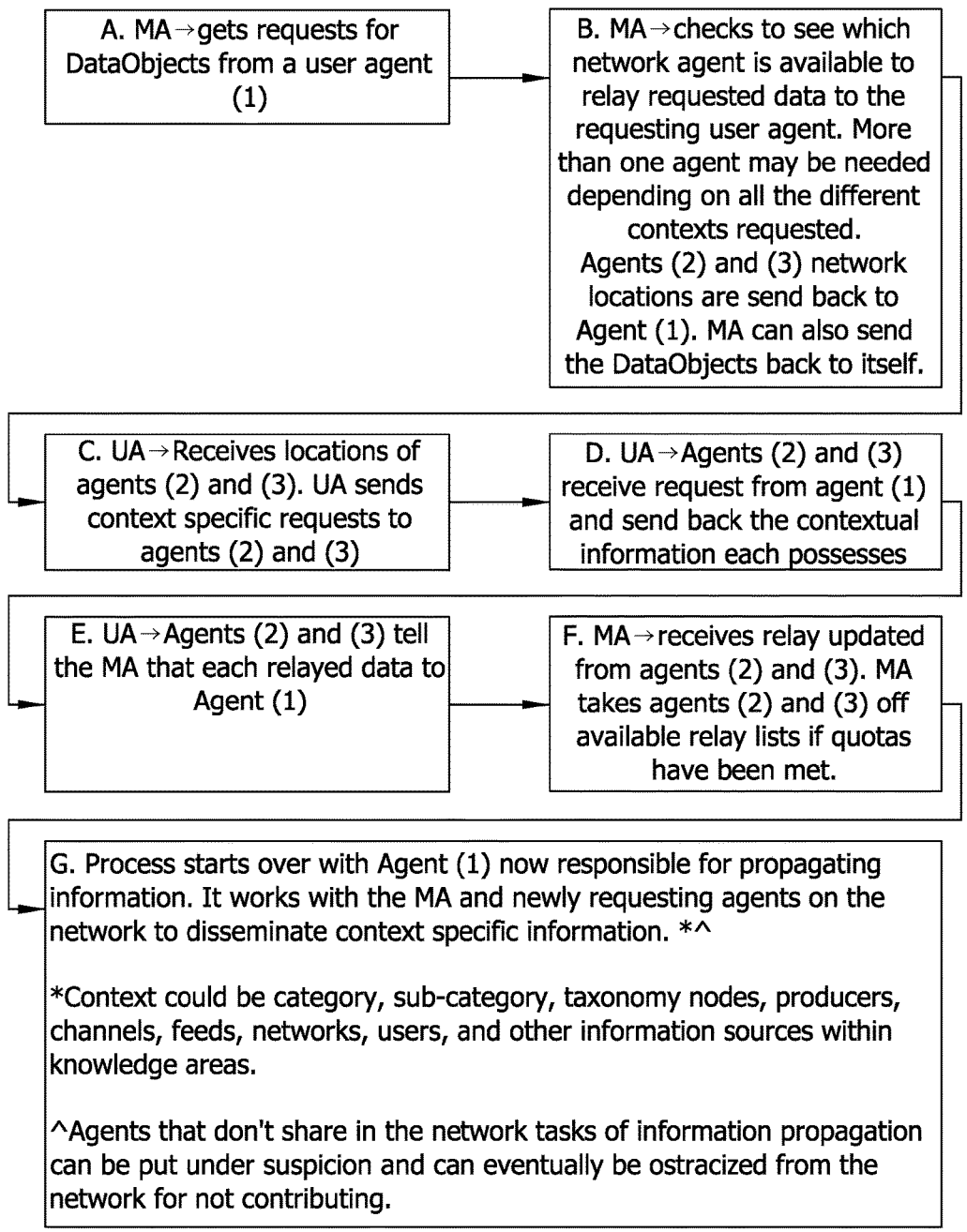
FIG. 4 is a flowchart of an exemplary method of centralized DataObject information propagation.

FIGS. 2A and 2B are a flowchart of an exemplary method 200 by which a master agent communicates with a user agent for providing DataObjects to the user agent. In exemplary embodiments, repeatedly (e.g., periodically, continually, and/or upon request), the master agent will transmit information to network agents. For example, the user agents may periodically (e.g., several times per hour) request new DataObject information from the master agent. This information includes new DataObject metadata (e.g., locations, such as uniform resource indicators, and semantic data), updated metadata for old DataObjects, and newly discovered collective and semantic knowledge. Rather than make the same call to each user agent, the master agent can coordinate the propagation of information so that agents can effectively transfer the new information to other agents on the network. FIG. 3 is a diagram 300 of information propagation in information exchange system 100 (shown in FIG. 1). FIG. 4 is a flowchart of an exemplary method 400 for centralized DataObject information propagation. This process may continue until all online agents have been updated. In this way the system leverages other agents on network and their resources to work together in order to send information quickly and efficiently in a P2P manner. Therefore, no massive network infrastructure is needed for the master agent. This swarm-like exchange allows each member to pass on information to its neighbors and keep the whole network in the same updated state. Not all categories of information are necessarily sent to each agent. To further the economy of transmission the system sometimes uses an algorithm to form mini-networks and make sure agents that share similar information consumption preferences propagate information with each other. This allows for a minimization of bandwidth usage and strain on the network.

Figure 5:
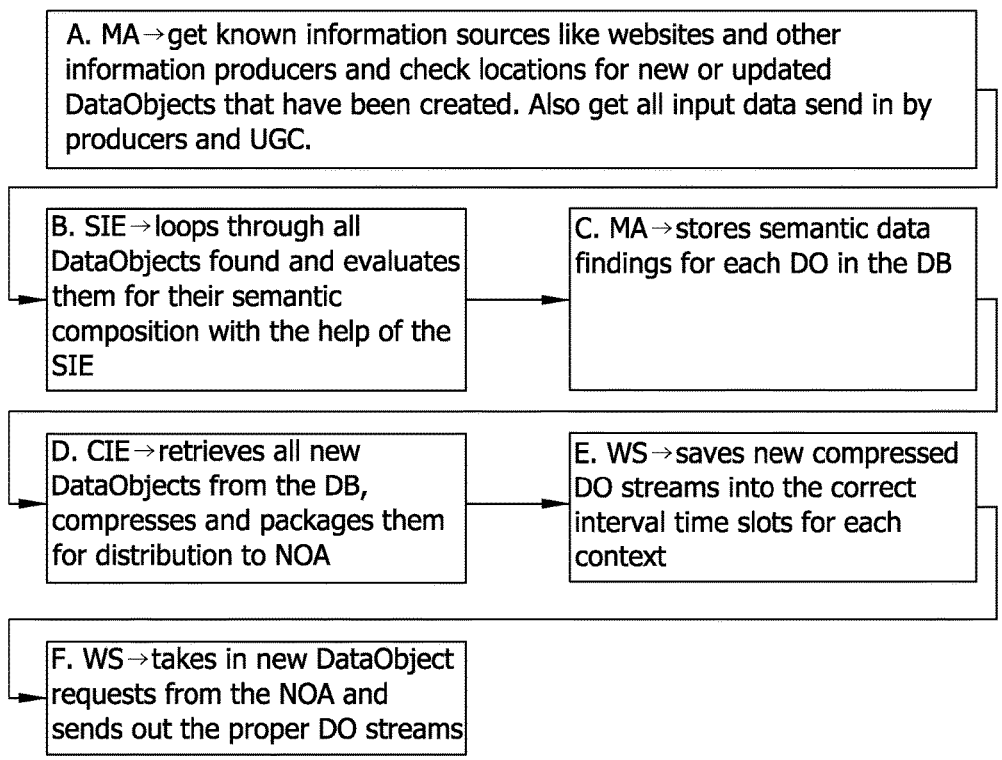
FIG. 5 is a flowchart of an exemplary method of master agent retrieving or receiving DataObjects, evaluating them, compressing them, distributing them, and agents receiving them.
Figure 6:
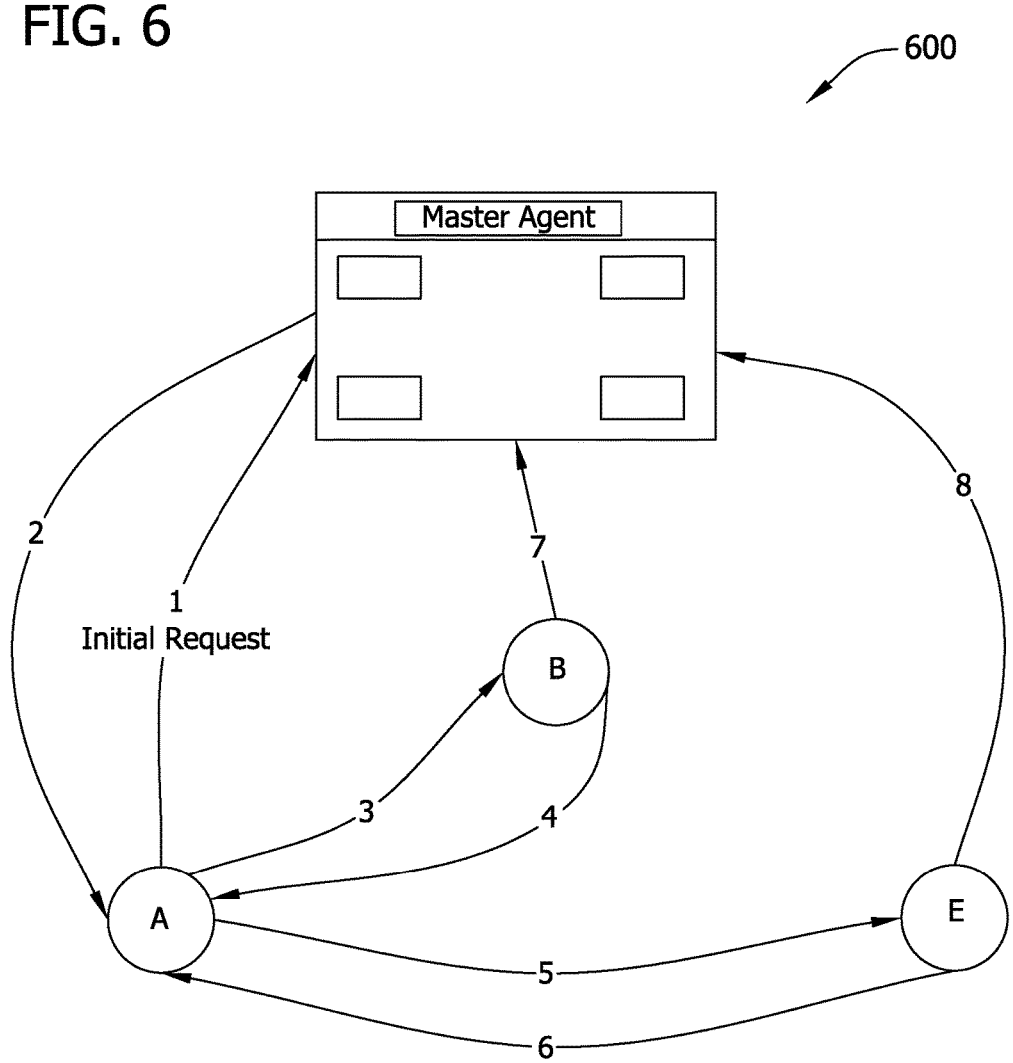
FIG. 6 is a diagram of an exemplary centralized model of information propagation.

In some embodiments, the system compresses the information transmitted when the information is packaged for further increases in efficiencies. FIG. 5 is a flowchart of an exemplary method 500 for distributing DataObject information by the master agent. FIG. 6 is a diagram 600 of an exemplary centralized model of DataObject information propagation. The informational and intellectual essence of each DataObject is semantically summarized and packaged together. This allows the system to disseminated large amounts of DataObjects with every interval's information propagation. The system facilitates a well-developed perspective for user agents on what is being produced and consumed on the internet as a whole. This information compression allows user agents to quickly process DataObjects without having to traverse and semantically classify the full breadth of each DataObject. The most important parts of each DataObject, such as semantic essence and relations, location of the DataObject, collective metadata like popularity, are sent in the propagation stream allowing quick ranking and recommendation to users from network user agents.

Using a master agent as a central point with the SIE allows for tremendous savings in CPU usage, bandwidth, and overall network resources. In this manner the system is a hybrid P2P and centralized system using the best logistical features of both network architectural transmission methods. Using just one or the other may lead to decreases in efficiency, increase the system resources, and/or diminish user experience overall due to lack of prompt DataObject delivery updates.

Alternatively agents can discover new data objects without being part of the propagation network. The system also publishes RSS feeds about new DataObjects for different categories and knowledge areas. This dissemination of information is similar to how torrent networks publish data. Agents can consume the RSS feeds, rank which DataObjects they think the user will be interested in, and retrieve those DataObjects. Some agents will become trackers that assist the Master Agent and network agents in keeping track of which agents have which DataObjects. The tracker helps to keep state of which agents have which parts of the file so it can be shared rapidly within the network. This approach may be used for sharing DataObjects that are large in size such a movie files. An agent can find out who the current trackers on the network are from the torrent file for a particular DataObject. An agent can then contact those trackers to see which agents have those DataObjects. The agent can then request parts of the DataObject from multiple agents to retrieve it more quickly than requesting from one agent alone. Once the agent has all or part of the DataObject it can share it with other agents on the network as well.

For additional security information and data can be sent in a TOR style manner where it is sent in layered, encrypted envelopes so that proxy agents can only decrypt one layer giving the proxy agent instructions on what action to take such as instructing it on what node to next send the information. This allows further anonymization among nodes and central points as well as the ability to save data such as personal, important messages or other private data on a central point where the encrypted data can be stored and later relayed to the message receiver when they come online again.

In addition to DataObjects, the MA also disseminates decision models to the network of agents. The Semantic Intelligence Engine (SIE) remotely builds global semantic intelligence outside of the intelligence construct. Through the Master Agent the SIE updates network constructs with decision models. The Decision Engine (DE) within the intelligence construct uses decision models to make decisions based on DataObjects' semantic essence data sent to the construct via the Master Agent and user actions over time (recorded locally by the construct). The two parts of the SIE and DE work together.

The decision models are sent in such a format so that for any type of decision the agent has to make, the proper dimensional data types, weightings for those dimensions, and sequence of processing is available to plug into the decision. All decisions are made based on what the SIE determines is relevant for a given contextual problem space and has an action associated with it such as making a recommendation. The SIE develops models for these based on experiences it has with data it encounters. The internet and network of agents act as the domain of its experience; however, with more data, like sensor data, this could be extended into the physical world as well. These models or experiences can be shared with local user agents. The network of agents can also figure out new significant dimensions based on their own experiences and number crunching. These local experiences can be sent to the SIE to do collective computations and processing. If relevant to the network as a whole these local experiences and learning will be globalized on the network and sent out to other agents to assist in their decision processes. The domain of semantic data is covered specifically but this process and decision models can be used to make decisions over any problem space, even for problems in the real world.

Network of Agents

Figure 7:
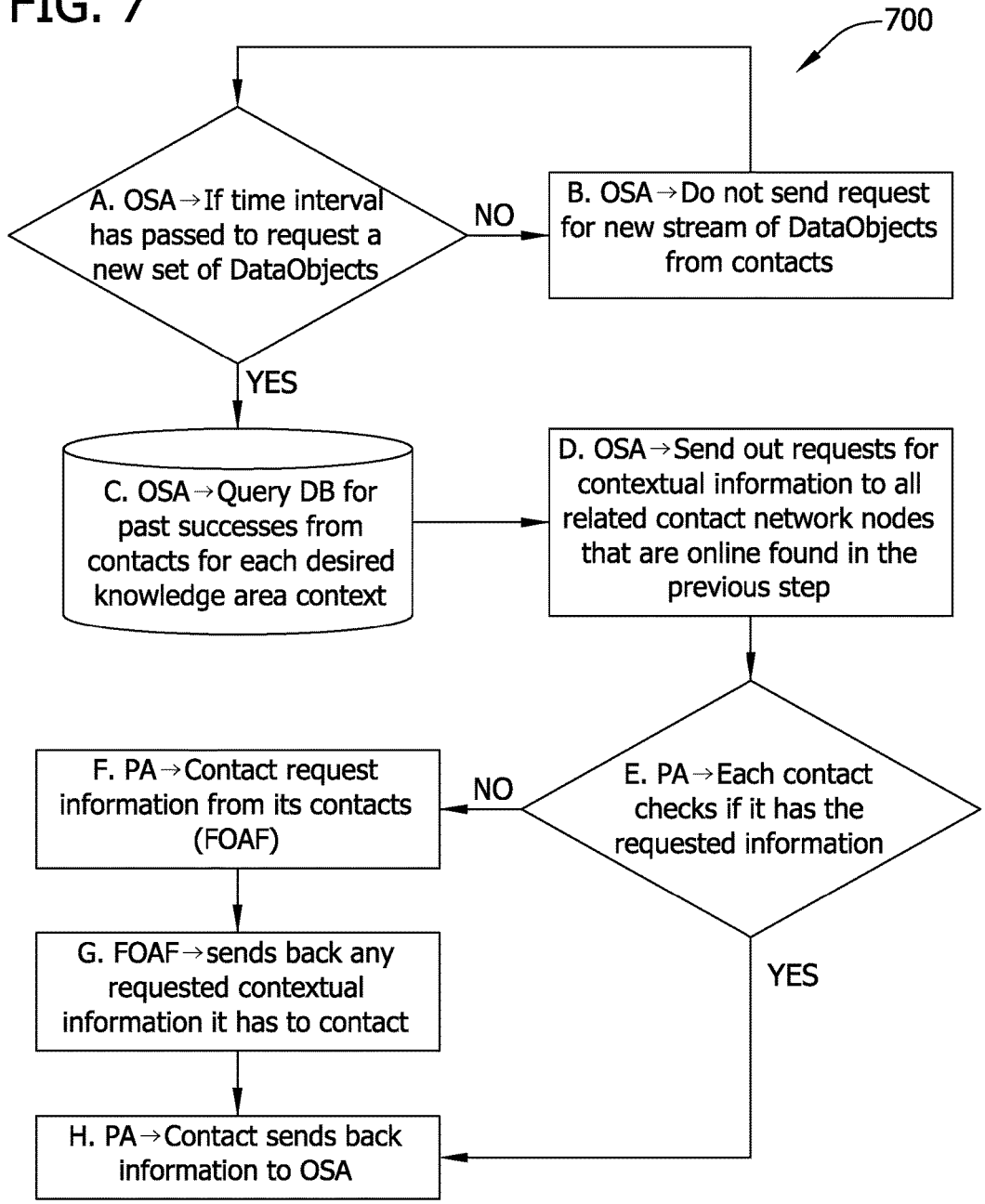
FIG. 7 is a flowchart of an exemplary method of decentralized DataObject information propagation.
Figure 8:
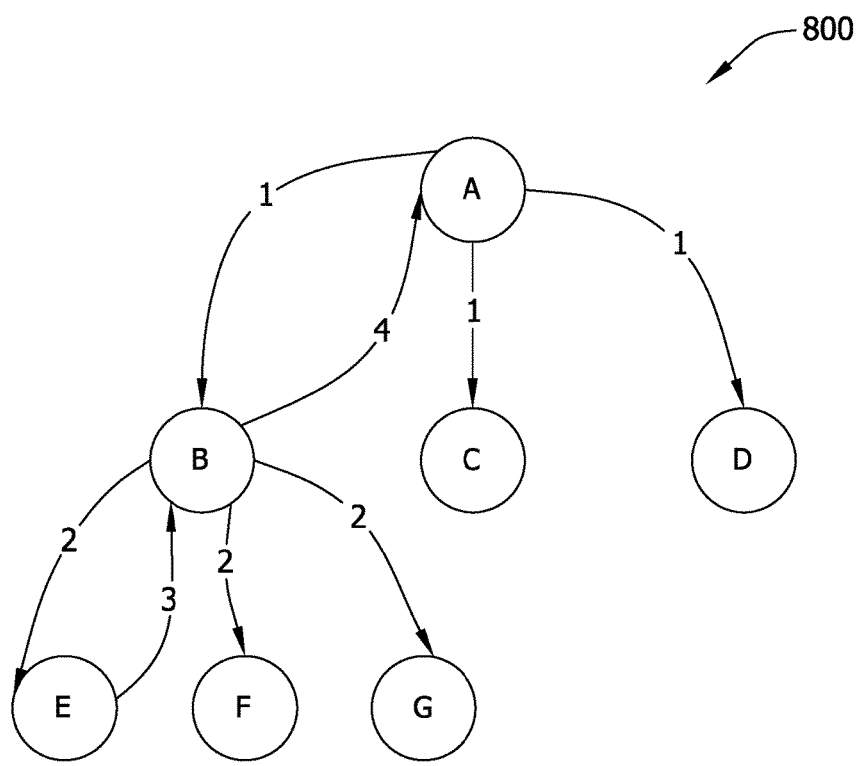
FIG. 8 is a diagram of an exemplary decentralized model of information propagation.

The last part of the system is the logistical information exchange to, from, and within a network of user agents. The system uses centralized (e.g., as shown in FIGS. 4 and 6) and/or decentralized (e.g., as shown in FIGS. 7 and 8) information propagation. FIG. 7 is a flowchart of an exemplary method 700 for decentralized DataObject information propagation. FIG. 8 is a diagram 800 of an exemplary decentralized model of information propagation.

User agents can be weakly or strongly autonomous in the system. Weakly autonomous agents rely on a central point like a master agent for network information and intelligence updates but locally executes intelligence and information ranking of DataObjects itself. A strongly autonomous agent is a self-sufficient agent that gathers intelligence and information by itself on the internet. Although a strongly autonomous agent doesn't necessarily need updates from a master agent, it can exchange information by communicating in a P2P manner with other user agents (e.g., FIG. 7-D) and possibly master agents.

User agents are intelligent agents that do work on behalf of their user, whether or not they are strongly or weakly autonomous. They work on behalf of the user to gather data, process data, determine which data the user would be interested in consuming, and presenting that data to a user. This includes finding stories, syncing and sharing data like files between each other, or downloading new music for the user. It should be noted the system itself does not include the intellectual property for such an agent; however, the aspects of the disclosure are a system of information exchange between such agents.

Figure 9:
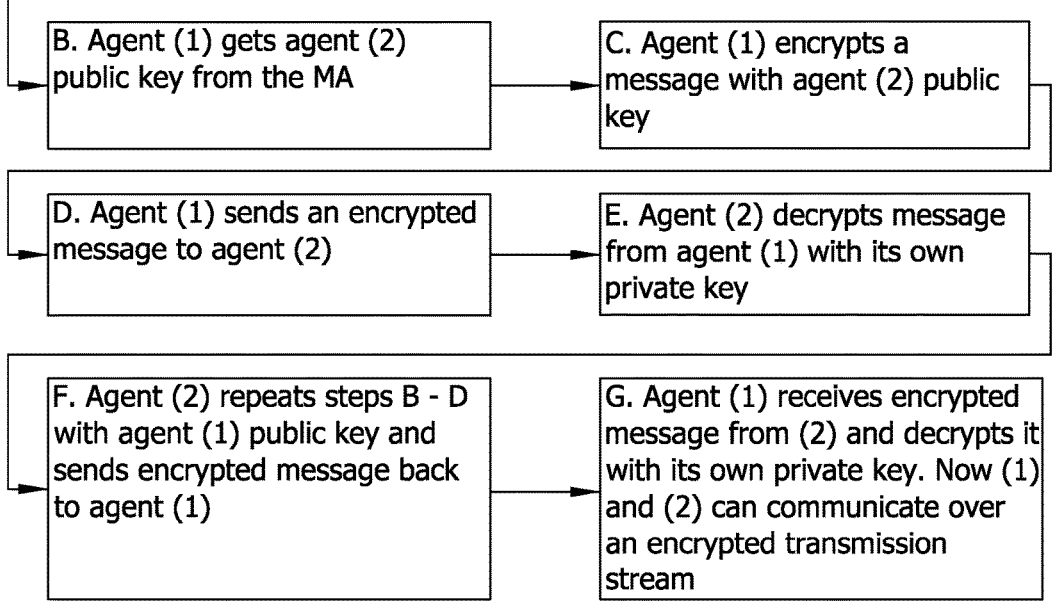
FIG. 9 is a flowchart of an exemplary method of a master agent operating as a certifying authority for secure communication.
Figure 10:
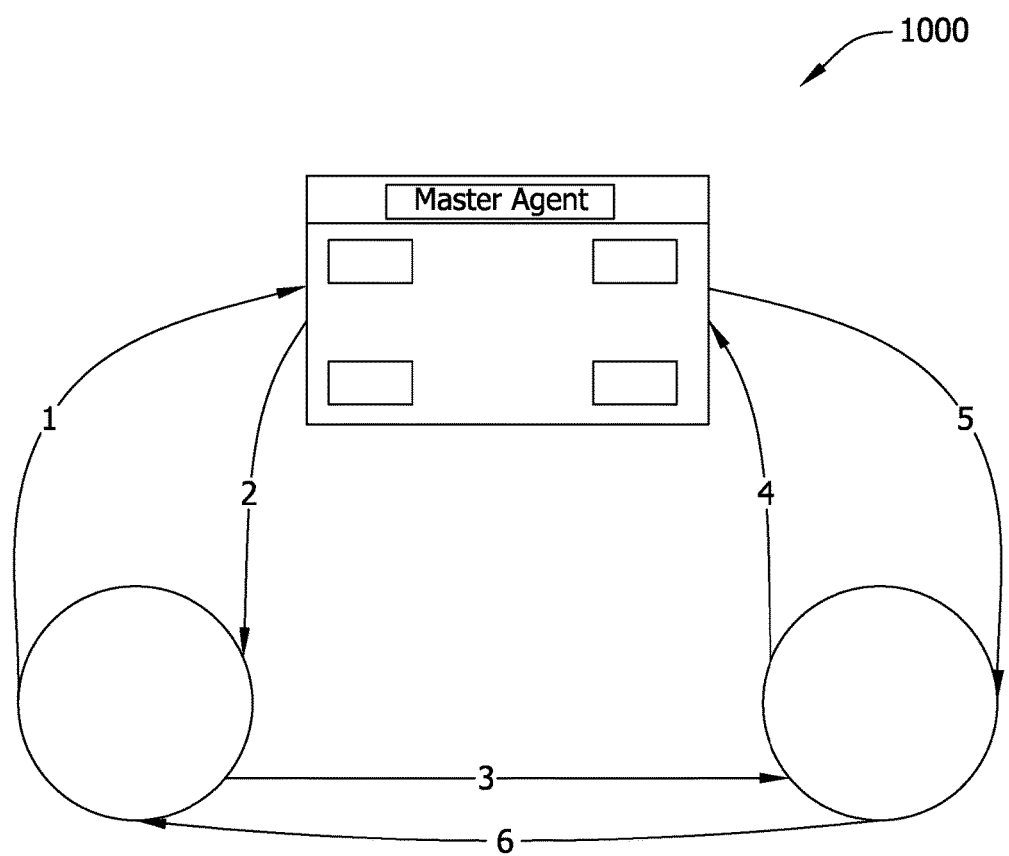
FIG. 10 is a diagram of Public/Private Key Exchange.

The master agent allows the network agents to communicate in a secure manner. All system transmissions, including transmissions between the master and user agents and also transmissions between user agents themselves may be encrypted. The system supports a network of agents that use a public/private key encryption scheme. FIG. 9 is a flowchart of an exemplary method 900 of a master agent operating as a certifying authority in secure communication between user agents. FIG. 10 is a diagram 1000 of cryptographic key exchange.

For agents to be able to communicate securely in a P2P manner, they may have some way of verifying that the other agent they are trying to communicate with is the actual agent and not an imposter. The master agent acts as the certifying authority for agent identification. As certifying authority it authenticates the identity of each agent before they can communicate over an encrypted stream. Once the master agent confirms that both agents really are who they say they are it provides the public keys of each agent to the other. This allows each agent to then decrypt messages from the other agent while making sure that it is communicating with the correct agent on the other end. If there are agents in the network trying to masquerade as an agent different from themselves, the system can record their malicious activities and ostracize rogue agents from the network. It will send out warnings so that valid agents are aware of network elements that should be avoided.

Figure 11:
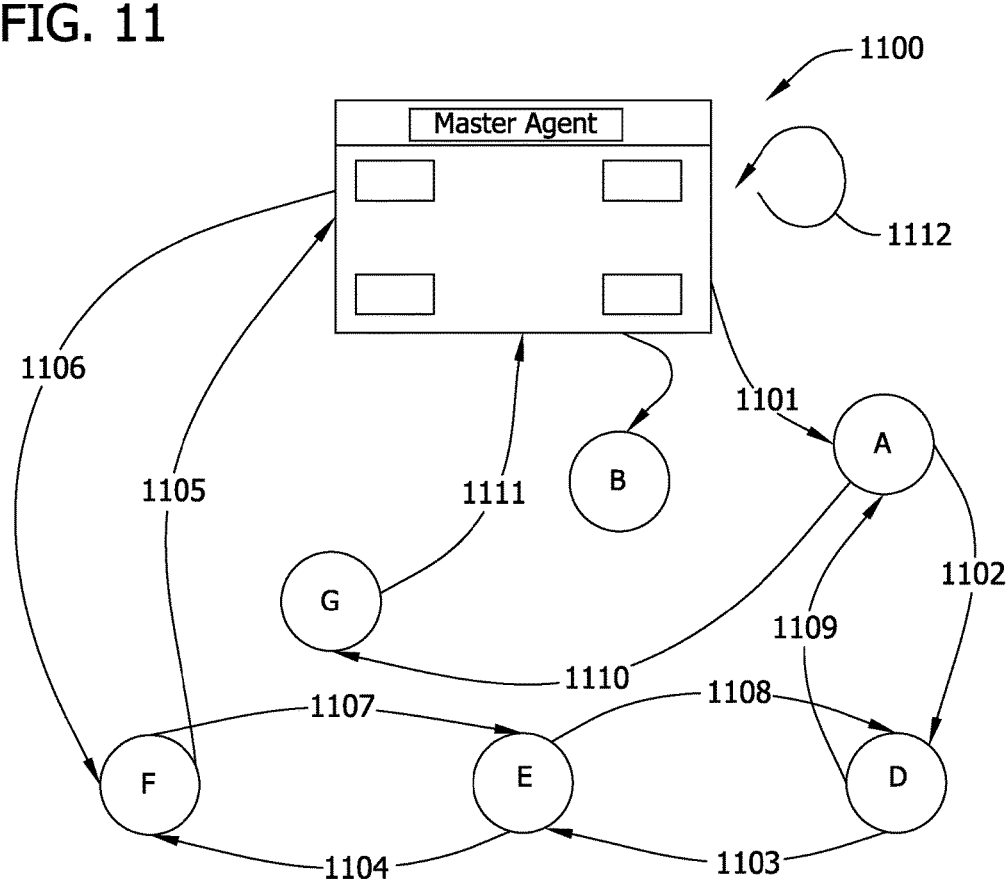
FIG. 11 is a diagram of anonymization network of agents concealing private information like ads the user consumes and validation of reporting with master agent.
Figure 12:
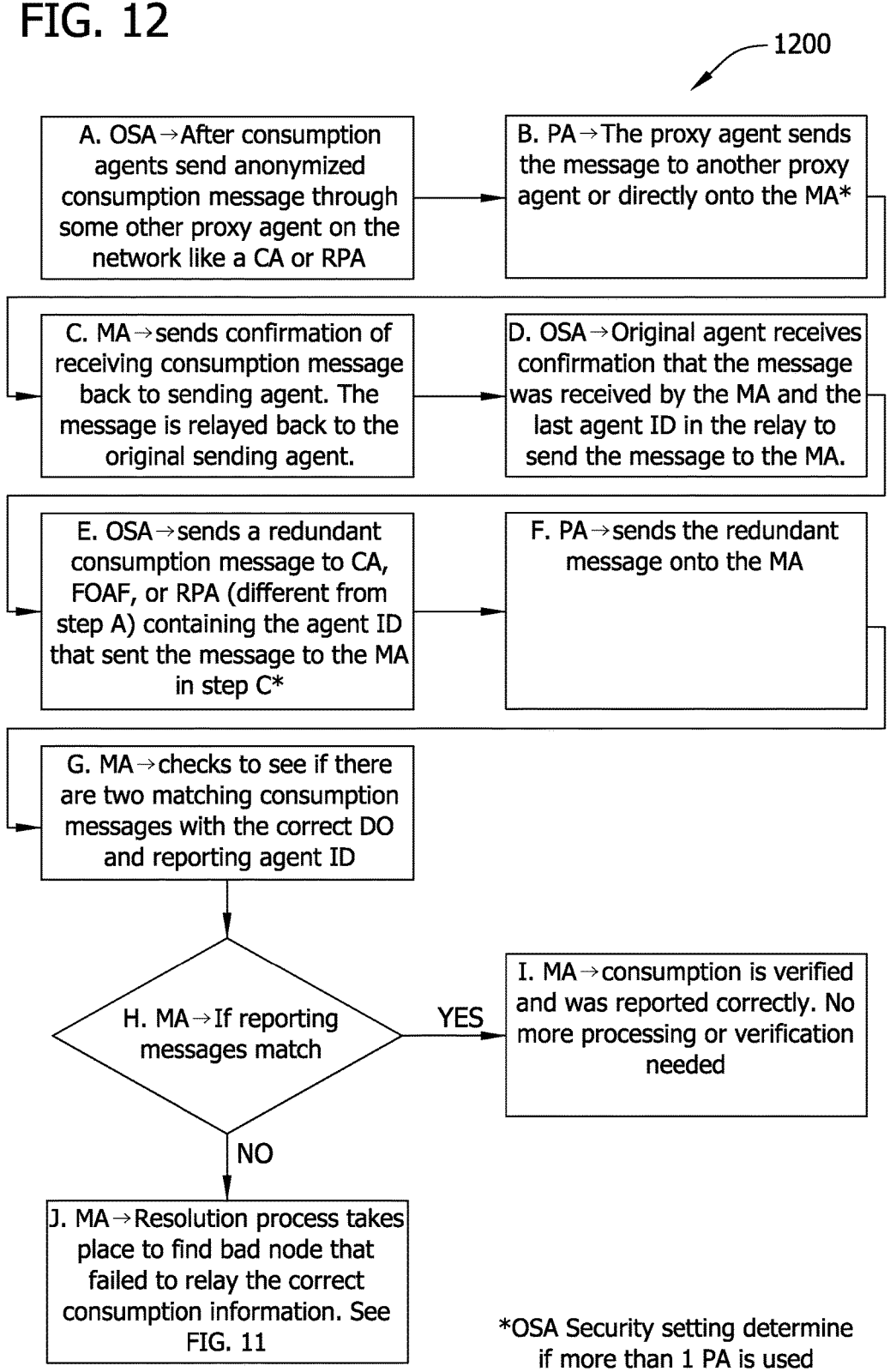
FIG. 12 is a flowchart of an exemplary method of anonymization concealment between agents and validation with master agent.
Figure 13:
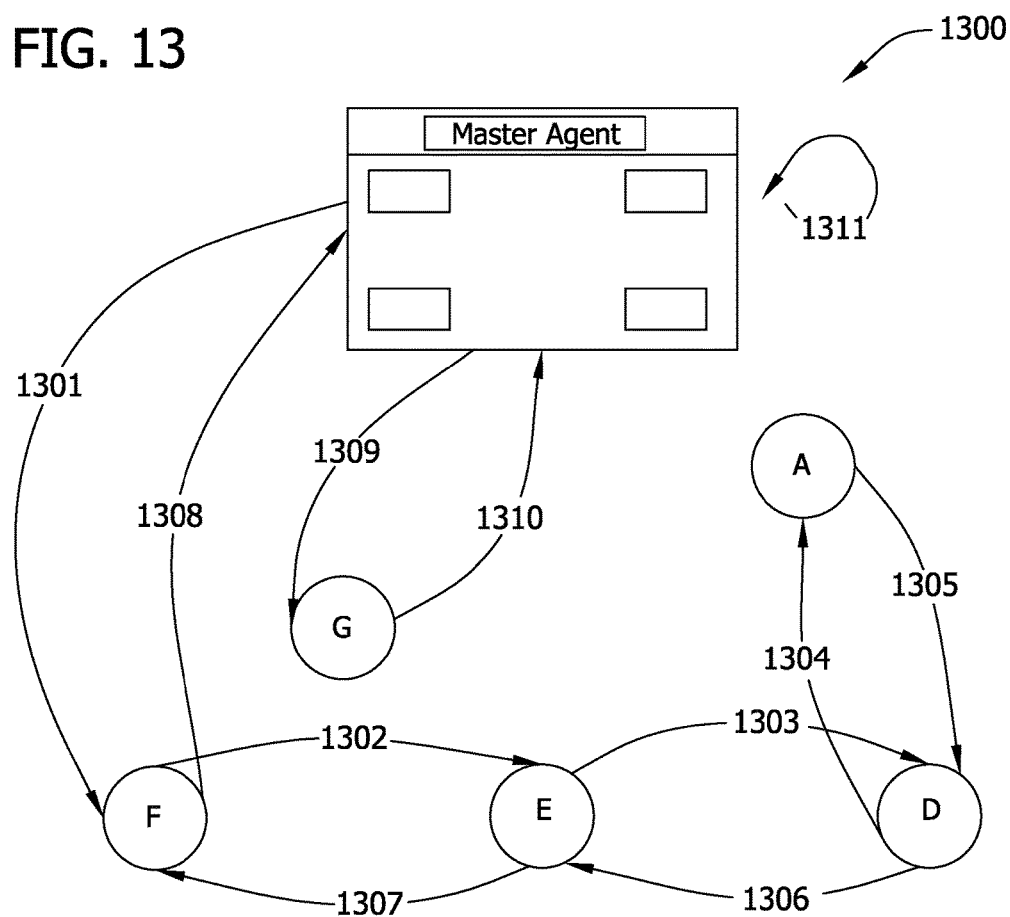
FIG. 13 is a diagram of exemplary model of Anonymous Consumption Reporting Error Resolution.

The system supports anonymized transmissions from agents. FIG. 11 is a diagram 1100 of an exemplary model of an anonymization network of agents concealing private information like ads the user consumes and validation of reporting with master agent. FIG. 12 is a flowchart of an exemplary method 1200 of anonymization concealment between agents and validation with master agent. Agents within the network from a network of proxy agents like an anonymization network to report consumption of other user agents without revealing the original sender of the transmission. The original sending agent will send detailed information such as web page x was consumed or DataObject y was rated 5.0 through one set of proxies. Since anonymized transmissions go through a proxy agent, the master agent has no way to directly verify the original message is indeed the message that it receives. FIG. 13 is a diagram 1300 of an exemplary model of anonymous consumption reporting error resolution for verification purposes. As shown in diagram 1300, an additional message is sent by the original message sender to a second proxy so that the master agent can verify that messages have not been altered by malicious agents. If inconsistencies are found an error resolution process takes place to determine the bad relay node on the network.

System Properties

Figure 14:
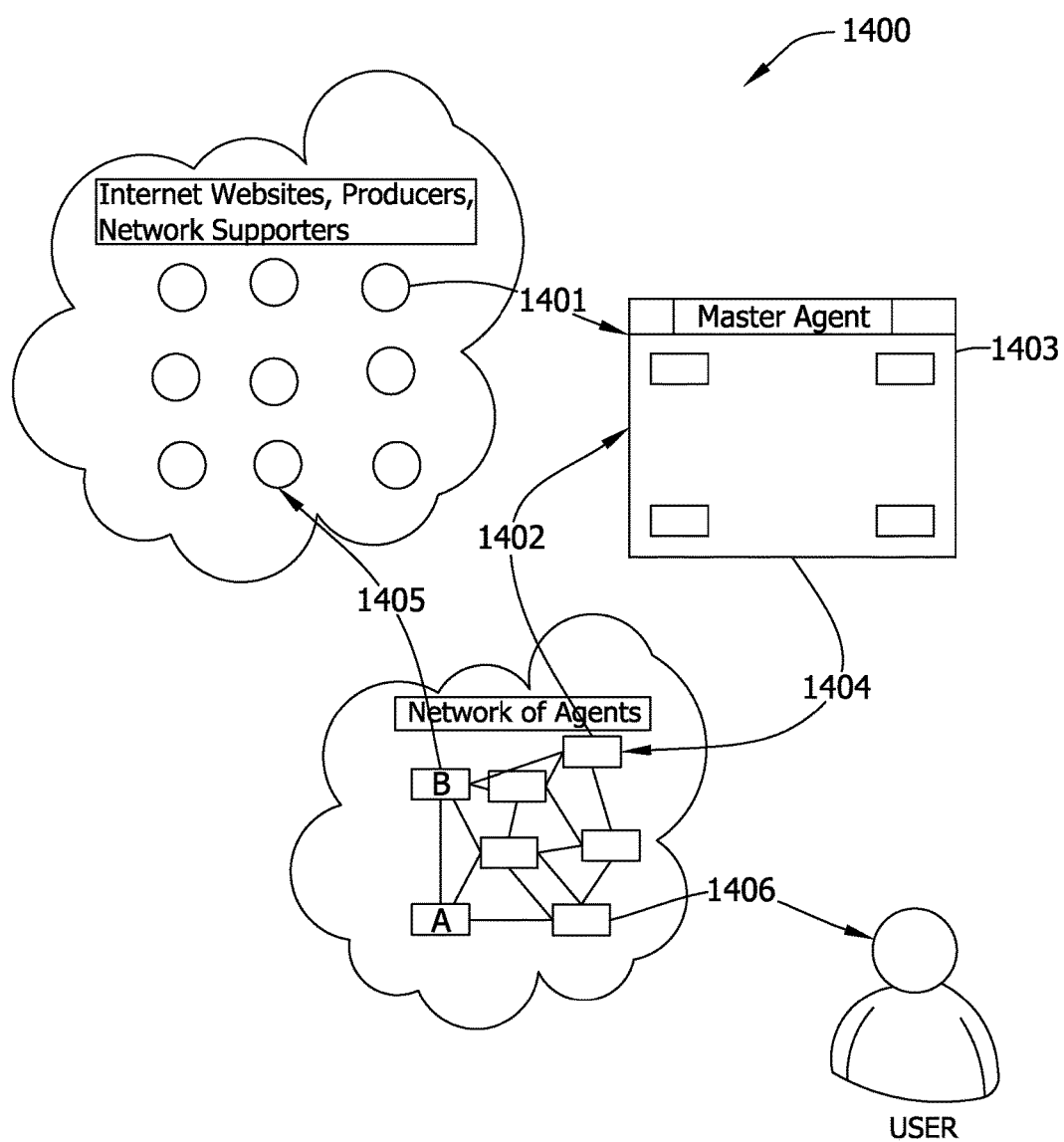
FIG. 14 is a diagram of exemplary model for connecting producers and consumers of information.

The system supports these agents with information and gives them a way to quickly process DataObjects. It provides a logistically and collectively easier method for agents to work and share information together. The system infrastructure allows additional beneficial properties to emerge due to the ease with which information is created and disseminated. One property the system provides is a network between producers and consumers of information. Some network nodes, such as a website or a user agent, produce (e.g., publish) information while other nodes consume (e.g., download and/or present) it. FIG. 14 is a diagram 1400 of an exemplary model for connecting producers and consumers of information.

The system connects producers and consumers of information together. The system does this by allowing producers to expose DataObjects to the system and allows those DataObjects to be distributed to people who want to consume them. After a producer creates content, such as a story, blog post, photo, video, or any other piece of data, the master agent will retrieve the new content, whether it is stored on network-based media or on the producer's local computer, consume it, process it, and send out its semantic value to other agents. DataObjects can be explicitly exposed by producers or the system can passively consume and analyze them if user permissions allow. This is in contrast to websites that are limited to explicit user data population. The system being described will auto-populate itself with UGC and send the UGC to others on the network. This does not mean all DataObjects or user actions are necessarily shared publically. Rather, the system enforces preferences of user agents for data syncs so that just certain permissible types of DataObjects are shared.

Currently producers have to publish to multiple sites to reach each user. This system allows users not to have to explicitly go to websites since information flows from producers to consumers (users) in a seamless, passive manner. The system is a universal platform for producers, consumers, and network supporters to store and share media of all kinds. The system provides a decentralized architecture within the fabric of the internet itself and connects the resources of each node to collaborate with each other. Since the system maximizes system resources and can assist agents in information sharing, it lessens the burden for producers to have huge IT infrastructure of servers and bandwidth to distribute their content since it can be shared P2P.

The system allows all nodes to work together in a collective manner, through information sharing. This system cohesion allows the system to converge toward the best information, intelligence, and DataObjects. The master agent supports the positive feedback process between producers and consumers so that information and intelligence can be continually consumed, re-combined, and concatenated increasing the collective intelligence of the system.

Figure 15:
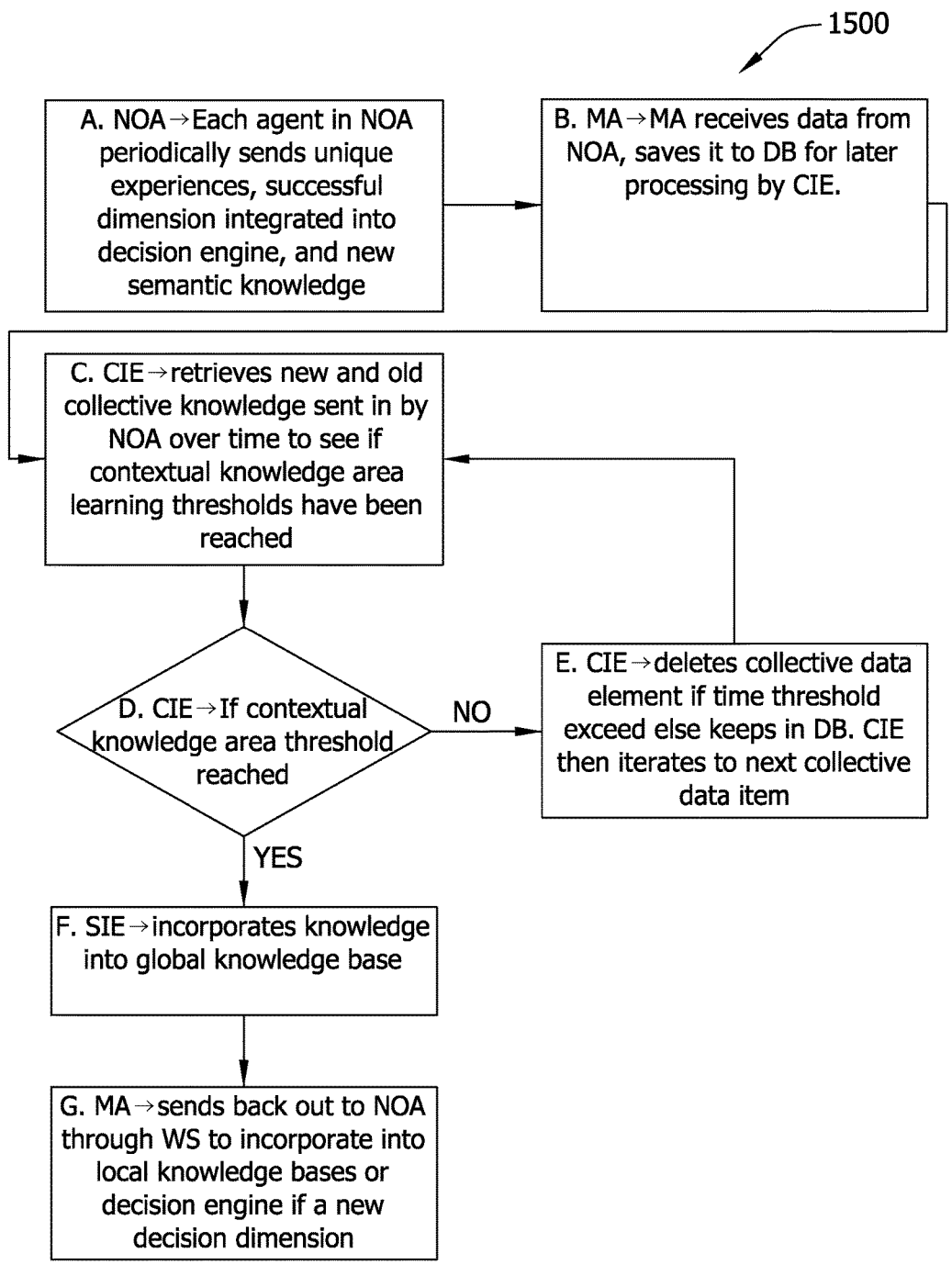
FIG. 15 is a flowchart of an exemplary method of collective data aggregation on master agent, processing the collective data, and redistribution to other agents.

The system helps to increase global and local intelligence. Agents can build their own semantic relations off their separate and unique experiences with information on the internet. Other agents can benefit when they share information together. When another agent comes into contact with the same environmental stimuli or problem space, they do not have to exhaust different pathways to find the optimum solution—they can use the successful solution of a separate agent that already figured it out. The process is made easier with a master agent that can be used as a central collective storage point to pick from several possible solutions, choose the best one, and propagate it to other agents in the network. FIG. 15 is a flowchart of an exemplary method 1500 of collective data aggregation on a master agent, processing the collective data, and redistribution to other agents. Information and intelligence can be shared on the network in this way.

The system can also find the most "important" information. The CIE determines the collective importance of information like DataObjects based on how producers and consumers take action on DataObjects through actions like consumption, production, sharing, rating, etc. This collective importance could be the popularity of the DataObject based on the number of times it's consumed by users or the importance of the DataObject based on the number of similar news stores produced by producers about the same event. The CIE can also leverage the SIE to analyze semantic content and to gauge the impact of the information based on what is already in the knowledge base. Based on new information's impact on the present knowledge base, further understanding of its importance can be understood. Through its collective view of the network and information the master agent has the ability to allow the highest quality DataObjects to emerge. It can then send out the most important information to users that they may not have been seen based on individual preferences alone.

The system supports personalized, anonymous targeted advertising for intelligent agents. The master agent can consume advertisements, analyze them for their semantic content, and output their semantic value to other agents on the network just like any other DataObject. The master agent includes the semantic value for the advertisement and also demographic information to further match users. User agents then insert personalized ads into DataObject advertising space. The agents can work together so that the advertisement is downloaded from its network location, such as an ad website, anonymously.

Figure 16:
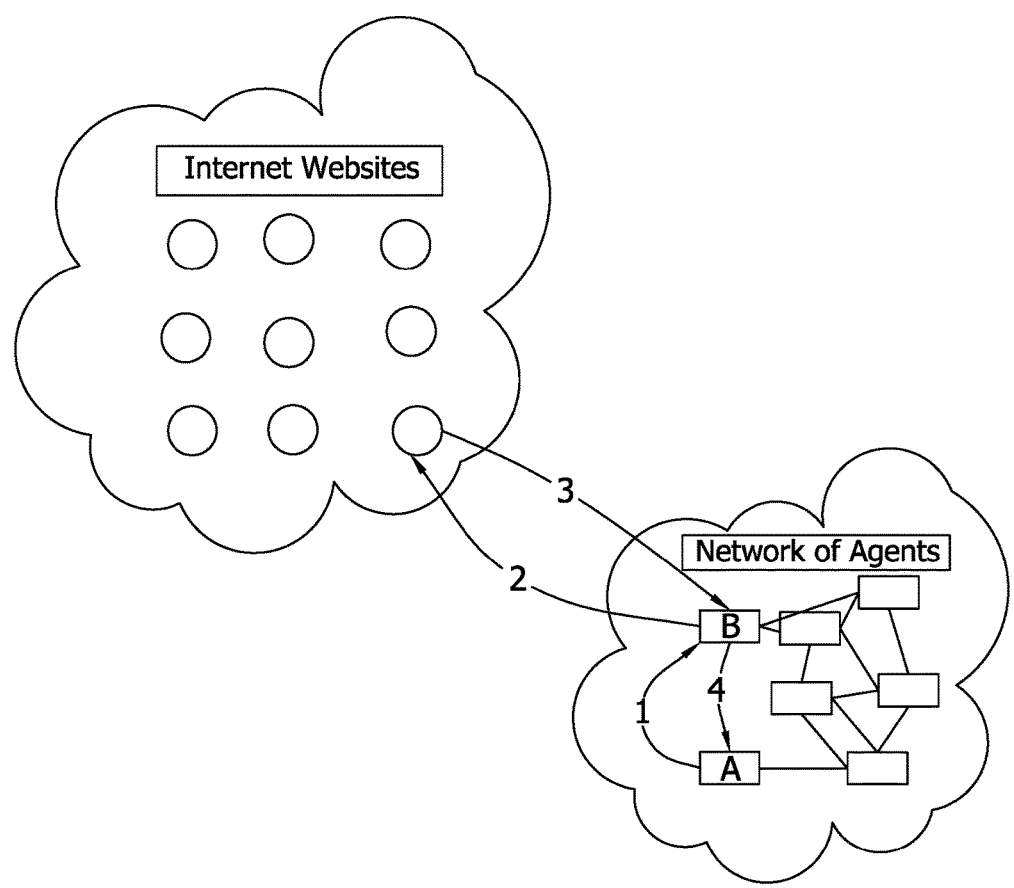
FIG. 16 is a diagram of an anonymized DataObject request to a website using another agent.

FIG. 16 is a diagram 1600 of an anonymized DataObject request to a website using another agent. Agents can work in a P2P manner or with the master agent to use other agents in a proxy scheme to anonymize advertisement requests from clients. The master agent or user agent can send requests for download to other helper agents. They would do this in an anonymization network-like manner. In some embodiments, because ads are retrieved in this way, no central points, like websites or master agents, can collect individual user consumption data, thereby keeping it private.

Users within the network producing UGC as well as more traditional media outlets that produce DataObjects can both profit from the individually targeted ads. The system allows producers of information to be paid proportionally to the contribution of the information to the system. Therefore the more popular a produced DataObject is the more producers will get paid based on advertising revenue. The system records this type of consumption information for the agents and producers (e.g., as shown in FIG. 11). A central point for such a scheme is vital. A P2P scheme among agents without a central point would be useless to producers. Such a scheme for this type of anonymized information transfer may have a centralization point for aggregation and verification purposes and also judging the overall contribution and popularity to the network. This allows the master to accurately pay producers so they have the means to keep producing information and intelligence. A cycle of overall intellectual growth for the system emerges by making the internet into a more marketable medium for advertisers while maintaining and supporting the production of new media and information. This allows producers to concentrate on the quality of their content improving user experience and the DataObjects they consume.

The system allows user agents to send back advertisement consumption information directly to the master agent. If the user has heightened privacy settings even for the master agent, agents can relay consumption information about advertising through other agents. This enables the consumer to be kept anonymous and data to be kept private (FIG. 1.11). The system is capable of receiving, validating (FIG. 1.12), and collectively processing these types of anonymized transmissions.

The system allows for safer P2P file sharing. If a producer produces a file DataObject, the master agent will process it for its semantic value, make sure it doesn't contain any malware, and get other information about the file like a hash value (e.g., an MD5 sum). The system makes sure no malware is later inserted into the file by malicious users by relaying the proper MD5 sum in the DataObject essence data sent to each agent in order for them to evaluate the semantic value to the user.

The system allows for the sharing of responsibilities between network agents. Agents can query the master agent for partner agents to help with DataObject recommendation computation while an agent is offline. Agents can coordinate the processing of DataObjects so that when a user comes back online there is no retrieval and processing delay in the recommendation of the newest DataObjects that were produced while offline. The system is also conducive toward distributed computing on a global scale of all user agents with spare processor cycles at any given time. The master agent can send commands to the user agents to process and number crunch information it's sent by the master agent. This lessens the computational power to operate the master agent and its other backend systems.

Self-Organizing Personalized, Privatized Internet Intelligence Construct

Exemplary embodiments provide intelligent agents executed by computing devices. An intelligent agent powered by an intelligent construct becomes a virtual version of a user. Intelligent agents are programs that carry out a task unsupervised, without explicit commands to do so by applying some degree of intelligence to the task. It should be noted that an intelligent agent discussed for this system is not an "agent" that a user has to delegate tasks. An agent is not a true intelligent agent if the tasks are pre-programmed by a human and there's no ability to learn from the environment of information input and ultimately increase cognitive abilities. An intelligent agent has some degree of cognitive autonomy that is beneficial to overall operation and the user's experience.

The system uses inheritable, hierarchical memory structures. An implementation in the real world is Object Oriented Programming where objects inherit the characteristics of their parent objects in a hierarchical fashion. Another example is the biological classification of organisms in biology. Like these systems and examples, the present aspects of the disclosure not only create meaningful semantic relations, it also creates a logical taxonomy of objects that inherit characters of parent objects and pass characteristics to child objects. These objects are usually different semantic types of data like entities, concepts, and context.

Therefore using the this type of storage and retrieval schema as well as the self-organizing principals of the brain, the construct builds a complex, ordered structure that can mimic user preferences so that the agent it powers can easily discern which information the user will like or dislike in future recommendations based on the information, and semantic relations within that information, that the user consumes. A self-organizing memory structure therefore programs itself and is unique to each user's intelligence construct. Through success and failure (which is accelerated by the collective knowledge of success and failures from a network of agents that may have already learned from the same data and situations or problem space variables) a pliable, brain-like storage structure starts to emerge that adapts and changes with the user over time. This is the quintessential intelligent agent functionality. It doesn't need to be explicitly programmed or told what to do. For example, it is possible for a user's agent to locate and purchase concert tickets the user would have wanted because the price was sufficiently low. The intelligence construct internally maps and relates together multiple information streams in a person's life.

Aspects of the disclosure create an internal semantic structure based on user consumption and makes decisions and predictions on what future information the user will want to consume. Unlike an unchanging, one-dimensional "recommender" algorithm, this system contains a decision engine to make predictions. This system learns and gains intelligence over time. It has short term memory (STM) and long term memory (LTM) components. Similar to how the human brain learns, overwrites, and forgets data over time; this system does the same in order to keep the important data while discarding the noisy or less valuable data. Like the brain's emotions that help guide human decision with the memory of success or failure for a previous experience, this system keeps track of prediction successes and failures for better recommendations in the future and also learning which semantic data is important to the user. This construct is not hard coded and can change itself over time. It has the ability to make decision and predictions on new types of data and relate data together continuously in an n-dimensional fashion.

Web-based recommender systems, in particular, have further limitations due to the client-server nature of the internet. Because these systems reside on centralized points like websites, they have inherently limited computational capacities which mean that they cannot perform high-dimensional calculations over very granular data. Because websites are stateless and memory-less, they are walled gardens of data. They cannot understand all user preferences because once a user leaves their site they cannot follow them without infringing on user privacy rights. Therefore they have a very limited view of data for the user. To get a better idea of users, the sites make users explicitly share data about themselves and their consumption habits. This system can follow users everywhere they go on the internet, determine user preferences implicitly, and gain a much better view of user's overall, global preferences for information. The system does all this without sharing users' information or infringing on their privacy rights.

Other recommender system algorithms, like collaboration filtering, take a more collective view in nature. Their recommendations are based on the similarity of close neighbor users and also suffer from over generalized, high-level data calculations for the same reason listed earlier. This system can make much more detailed analysis of the similarity between users and use similarity calculations in a collective manner to make better predictions.

Because sites don't have much information about user preferences they tend to show the user massive amounts of information leading the user to have to sift and filter through mostly "bad" nuggets to find the "good" nuggets of information. Information overload on the internet decreases the quality of information a user can consume. It also takes away from the user experience.

Historically, only news outlets had access to a news wire. Editors picked the best stories off the news wire and relayed them to their audience. The news wire was the network transport system. The internet itself is the new network transport mechanism that everyone has access to. This has lowered the barrier to entry and has given rise to blogging, social networks, and other means for individuals to report news and spread information and opinions. It's led to information overload. Now news outlets or anyone else can pick the best stories for an audience. The intelligence construct helps to solve this problem. Agents are the new, personal-newspaper-editor for each individual. An agent can personally pick the best stories and information for its user.

To find the best information, users currently have to surf the internet. It's a manual process of discovery and sometimes account set up. This takes time, the user has to filter through even more streams of information, and there's no way for most websites to have a good understanding of what information streams each visitor would like best. This is how the system works with the current containerized, website-based internet.

Contrarily, an agent is a bridge to a more seamless integration of any information (DataObject) on the internet. An agent is not just an aggregator. There's intelligence behind all your information streams to give you the best ones. Website aggregators don't do much in the age of information overload except more overloading. An agent is more than a social media recommender system. It's smart and doesn't just rely on what others are doing (like collaboration filtering). It's intelligent and has a memory so it truly understands what a user is interested in at a very precise, granular level. This is accomplished because the construct is located on the client's computer and not on a server. It's not scalable to put such an in-depth calculating device on a third party server. For example, a server might be needed for each user. This would be infeasible just from a profitability point of view. With a client-side agent, the user benefits with less time spent searching, less time looking at things that do not matter to them, and less time trying to tell the computer what he wants though browser commands.

These constructs can work in a decentralized P2P manner if they are fully autonomous or they can work in a centralized P2P manner with a master agent that helps out with the semantic and collective data processing and distribution. The communication streams of the agents may be encrypted for added security over the wire.

The constructs can work together in a collective, swarm-like manner with other agents. They can share information, the distributed processing of information, storage of data, and other logistical network responsibilities in cohesion. The system also allows agents to share intelligence for collective learning which can be efficiently aggregated and processed on the master agent. Agents can work together in a peer-to-peer (P2P), proxy network to anonymize source calls for information; making sure the private data like consumption stays private from centralized points.

Another difficulty transforming the current web into a semantic web is due to the very nature of the client-server model. It sequesters user information via the containerized nature of websites. Because the current internet is stateless, a website doesn't know what a visitor does once they leave the confines of the site. As a solution, pipes have been built between websites so that they can share information on user consumption habits. The sharing between third parties of user's private information is done to learn more about users' preferences, especially for marketing purposes. Users generally have little control over third party information sharing (e.g., among websites) and are usually unaware of it. Further, some computer systems request account credentials from a user to access contacts and/or other information from a corresponding account. From a security point of view, sharing credentials with third parties is extremely insecure. Exemplary embodiments operate without sharing user behavior information between websites and without requiring a user to share account credentials between websites. For example, exemplary network architectures support the network agents' ability to keep desired user information private and away from centralized points like websites and advertising networks.

By keeping information private, agents can serve up private, personalized, targeted ads to its user without infringing upon user privacy. This increases revenue in the internet ecosystem of information producers allowing more information to be created and disseminated over the internet.

The system's personalized, privatized advertisements address problems with traditional media and the problems the internet has caused it in trying to adapt their business models to the internet. Traditional media such as newspapers, TV and cable, magazines, etc. have historically made money from purchase or subscription fees. Also because they were the only information outlets for people to consume, they could make a large amount of money off advertisements, even though most of the time their advertisements were not applicable to the people seeing them. However, this shot-gun approach to marketing worked because of large viewership.

The advent of the internet with its free content and stateless nature posed a problem to traditional media and their business models. There were no subscription fees and middle-men type network supporter websites hosted their content. As the supporter site brands become popular with users, they made the money from advertising revenue off the content instead of the producer or copyright holder of the content. Exacerbating the problem is the stateless nature of the client-server architecture of the internet which makes it hard to effectively and efficiently market to users without infringing on their privacy rights and/or preferences.

This system provides mechanisms for producers of content like old media to still profit from their publications. They can profit from both their new and old media publications. It allows the efficient marketing to users without infringing on their rights. Instead of a shot-gun approach, marketing is more like a sniper rifle catered specifically to a user without infringing on their right to privacy. Since the information is relevant and helpful to the user, users may enjoy advertisements as the system makes it a more seamless experience with other information the user is interested in and consumes. Thus far the Web 2.0 world of the client-server model has been "you produce, we profit". This system allows the rightful producers of content to profit in a "you produce, you profit" manner. Where before producers were reduced to making "digital pennies" on the internet they can now lawfully and more effectively market to users to increase profits and make the internet itself a much more marketable medium.

This system democratizes the flow of information. No source or producer on the network gets preferential treatment or has an unfair advantage because of size, leverage, user base, or capital. All producers are equal and have an equal opportunity to produce information and put that information on the network so others can consume it. This is in contrast to the current consolidation of news and media outlets. The capitalistic trend is for the more powerful media outlets to consume smaller, less financially robust outlets. This leads to a narrowing in the available outlets and information over time. Instead of the user needing to know where to go to find information, which is usually the sites with the biggest advertising budgets to reach users through brand recognition, agents pull information which leads to a system that employs a fairer method of competition for information exchange. Just like websites and media outlets, users can produce information and intelligence. Their construct will disseminate any user generated content (UGC) for them throughout the network. A local classified advertisement of a garage sale has just as much potential visibility as a news story from a major news outlet because of the ability the construct gives agents to pull, assess information, and present to the user.

Exemplary embodiments provide one or more notable features, as described below.

1. No specific data set is needed to dictate success and failure in order to train the system as used in conventional Neural Network (NN) program set up. Also the system is not trained in a "brute force" way where all possible scenarios of a problem space domain are input to a system, like a NN, with preconceived output of success or failure whereby the system gets its internal variable weightings.

2. The system does not need a user to explicitly delegate tasks for it to perform. It knows how and when to act on its own based on data input and collective agent collaboration. Current P2P and torrent networks just share information. A user has to explicitly tell the program what to retrieve and how to share. This system allows for seamless, passive sharing of information where pertinent information desirable to the user is retrieved implicitly on their behalf.

3. The system can recognize and understand changes in user consumption preferences over time.

4. The system can make much more granular, deeper level calculations over higher dimensional problem spaces then mainstream web-based recommender systems because of its access to the user and its non-centralized, locally based processor.

5. The current internet client-server architecture makes it practically impossible to effectively market to users without infringing on the privacy rights and/or preferences. This system has the ability to personalized, yet privatized, marketing efforts so that privacy rights and/or preferences are not infringed upon while creating sustainable business models for information producers.

6. This system may improve the user internet experience by filtering out bad DataObjects so as to not overload the user with useless (e.g., irrelevant) information.

7. The current internet client-server infrastructure of websites leads to isolation of data in "walled gardens." This architecture is stateless and memory-less as a user navigates between different websites. Because of the architectural limitations, engineers have tried to build schemes to share information about users between websites to get a better overall view of user consumption. Unfortunately this infringes on user privacy. This system is stateful and keeps user information private. The system reports anonymized consumption data from users without infringing on their privacy rights and/or preferences.

8. The system supports a master agent in allowing a global collective memory to emerge based on the experiences of each user agent. Agents send data to a master agent that is centrally, yet privately, received, processed, and aggregated into a global knowledge base.

9. Current advertisements on the internet target users based on the content of the webpage the user is consuming or based on the explicit actions users make. Usually these ads are a burden for users to look at because they don't apply to the user. This system's ads target users based on their interests and demographics. Advertisements are more seamless and interesting to the user because they apply particularly to the user. Like the other types of DataObjects a user consumes, users benefit more from advertisements that cater to their preferences.

10. Since the system is not stateless, it keeps users secure by ostracizing malicious users and rogue agents that publish malicious DataObjects and who seek to harm others on the network. Agents can collectively work together to notify each other of malicious entities and keep users away from those entities. The system inherently can block spam and other worthless information as well as act as a social firewall from unwanted outside user transmissions.

11. The system enables average and novice internet users to use resources efficiently. The internet becomes less intimidating for new users with its endless options, having to know about certain sites that perform certain functions, and its overwhelming information overload. It's a much more passive, seamless experience for the user. The passive experience will provide the elusive "veg-factor" of TV on the internet as more people spend time online instead of in front of the TV. The "veg-factor" has been elusive on the internet because sites, such as mainstream video sites, have been unable to provide such an experience. With the intelligent flow of information to the user, a user may passively consume the information they like most. Anyone has the ability to produce DOs, get those DOs to interested users passively through the network of agents, and make money off the DOs with personalized, privatized advertisements. The system will automatically pick up newly produced information, analyze it, and send it out to the network of agents where people interested in it will be able to consume it. This more passive experience is in contrast to current systems of producers explicitly having to put information on websites and consumers explicitly having to go out and find the information to consume it.

12. The decision engine is n-dimensional where new algorithmic dimensions can be bolted on. It has the ability to continually adapt to the user and change over time. It can also adapt to the granularity of calculation possible based on the computational power available.

13. The agent inherently enables filtering out bad information nuggets so that the user does not experience information overload.

14. With a construct assisting the user's internet consumption, the user may spend less time searching, less time looking at DataObjects that have no value to the user, and less time giving the computer explicit commands on what it should be doing.

15. The construct provides personalized and targeted advertisements to users while keeping their preferences and consumption anonymous. This allows producers of information and marketers to benefit without infringing on users' privacy.

16. The system understands similarity. It knows how similar DataObjects are to each other. Similarity between DataObjects enables the construct to avoid presenting redundant DataObjects to the user. It allows the user to decide and set the threshold of similarity between DataObjects for avoiding redundant recommendations.

17. The construct provides personalized channels or streams of DataObjects for the user. These channels can be created implicitly by the construct or explicitly by the user. Popular channels can be collectively shared between constructs that have similar users.

18. The locally installed construct provides scalability advantages over that of a web-based central point in doing in-depth, granular user recommendation computations on DataObjects.

19. The system facilitates eliminating unfair advantages to information producers that reach audiences simply because of market position and brand recognition alone. The system brings equality to the dissemination of information and ability to reach users. Information has equal chance to reach any user because the presentation of the DataObject to the user is based on preferences of the user. Anyone has the ability to produce DOs, get those DOs to interested users passively through the network of agents, and make money off the DOs with personalized, privatized advertisements. The system will automatically pick up newly produced information, analyze it, and send it out to the network of agents where people interested in it will be able to consume it. This more passive experience is in contrast to current systems of producers explicitly having to put information on websites and consumers explicitly having to go out and find the information to consume it.

20. The intelligence of the system may increase over time based on collective knowledge shared between other agents and master agents. Agents can learn autonomously and share experiences with each other in a peer to peer manner or with central points, amalgamating experiences together to become smarter. Each agent can re-assemble dimensions with newly added or deleted dimensions and still make decisions, assess how that affects success or failure, and adapt decision models accordingly if advantageous.

21. The intelligence and operation of the construct can be integrated and used in a variety of systems. It can provide intelligence for devices such as an intelligent agent, computer programs, televisions, phones, car, home security systems, and any computational or information display device. The construct can provide personalized, intelligent operational features in all these devices. The system can analyze the semantic value of many different types of information streams based on user preferences, history, and collective intelligence from other agents. The system can communicate the output of this analysis to users and other devices. This is in contrast to current systems that use conventional recommender system algorithms and are programmed to handle a specific type of data in a very limited information problem space. Their systems are inflexible and static where as our system can process a much wider problem space and also learn, adapt, and change over time. The construct is able to sync state of the agent between devices. It can change the depth of computation and personalize DO types shown per device.

22. The system is designed as a generalized intelligence system. The system handles any problem space in which decisions may be made based on semantic data. The algorithm provided adapts to the problem space by its own actions and with help from the SIE.

23. Decision models allow the construct to make decision and take actions, including making a recommendation, but also potentially including performing an action in the real world based on action model.

24. Autonomous agents learn on their own, sharing with each other in a peer to peer manner or with central points, amalgamating experiences together to become smarter by new intelligence and learning sharing. Each agent can re-assemble dimensions with newly added or deleted dimensions and still make decisions, assess how that affects success or failure, and adapt decision models accordingly if advantageous.

25. Advertisement personalization may be enhanced for an advertiser and/or producer while keeping such personalization private from them. The system may function as a secure intermediary or "middle man" between the producer, ad network, and the user 26. The system enables passive retrieval of DOs (e.g., advertisements) for the user while keeping user information private from central points.

27. DOs may be passively shared with other users without explicit action. This is in contrast on how people share information now through social media where they have to take explicit action, like clicking a "share" button on different sites to share content. Agents automatically share consumed DOs (if user permissions allow) with each other and filter if those shared DOs are shown to a user based on user preference. All sharing and filtering are done under the covers—all done for the user so he only sees relevant information.

28. The system enables any producer of DOs to distribute those DOs to interested users (passively), and earn revenue from the DO with personalized, privatized ads.

30. The SIE may perform computationally intensive intelligence processing and then send data "essence" (e.g., compressed or condensed semantic data) to the client to make a decisions (on the client processor). A condensed essence list may be transmitted to a client program, and the client program may perform personalized decision making to recommend content and/or to take action on content.

31. The state of an agent may be synchronized between devices. The depth (e.g., intensity) of computation, DO type, etc., may be selected per device.

32. An SIE or SIE-like device may determine dimensions of a problem to solve, create a decision model, and send the decision model to a client. The client may also figure out new (or delete, changing weightings) dimensions in a problem space as the context might be different for different users or client computers. In one example, a desktop agent can request and get more information like elements within an operating system (OS) file system, how they are related to files, what files are and contain, etc., for the local agent to figure out how that may apply to the particular user.

Figure 17:
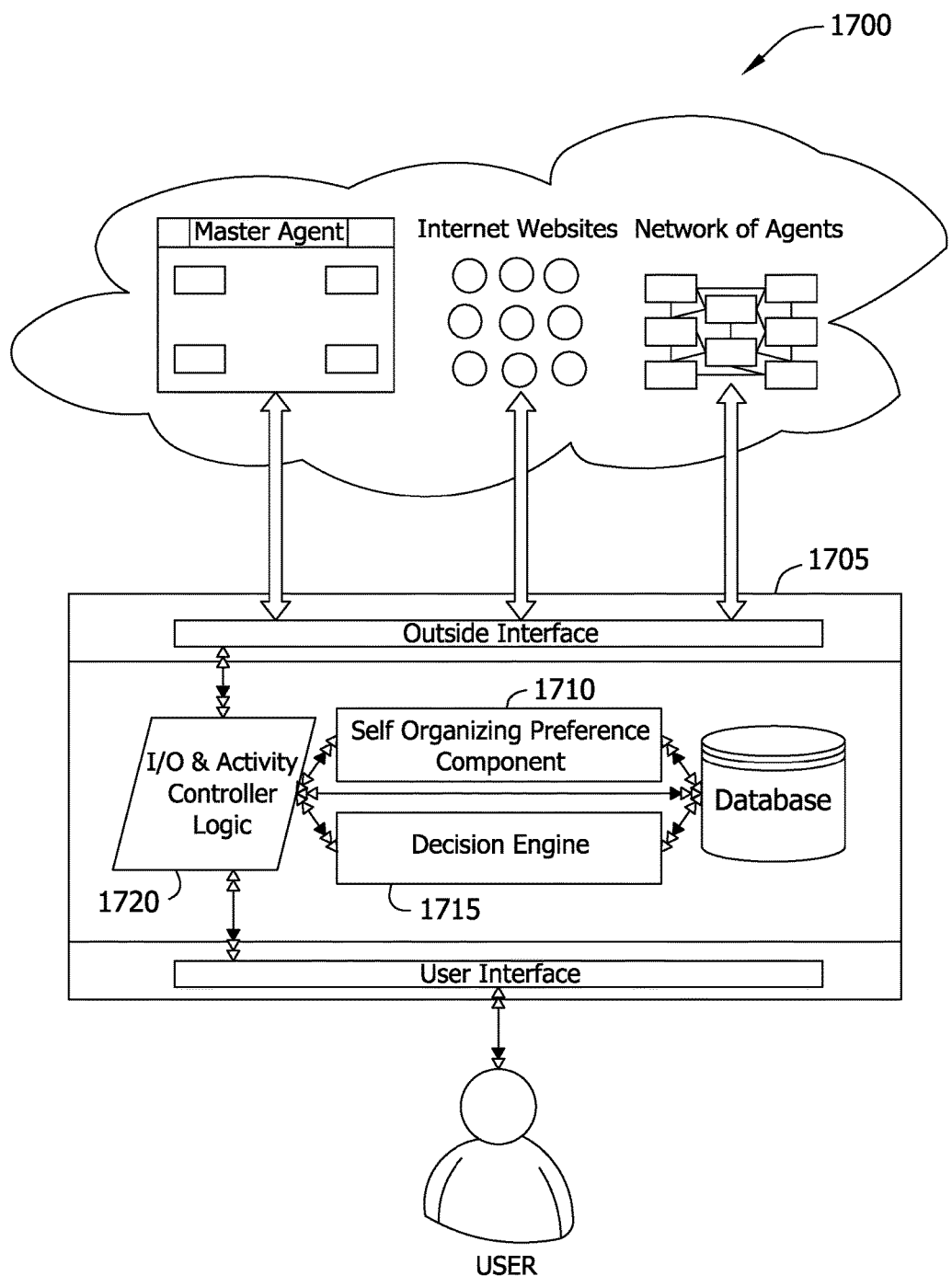
FIG. 17 is a block diagram of an information system including an agent system.

In exemplary embodiments, the system is an application for computing devices like a computer, phone, TV, car, home security system, etc. FIG. 17 is a block diagram of an information system 1700 including an agent system 1705 executed by a computing device (described below with reference to FIG. 37). Agent system 1705 includes a self-organizing user preference component 1710, a decision engine 1715, and an actions and features component 1720. The decision engine 1715 uses user preference data (e.g., provided by the self-organizing user preference component 1710) to make predictions. A database 1725 stores data provided by, and/or retrieved by, the self-organizing user preference component 1710, the decision engine 1715, and the actions and features component 1720.

Figure 18A:
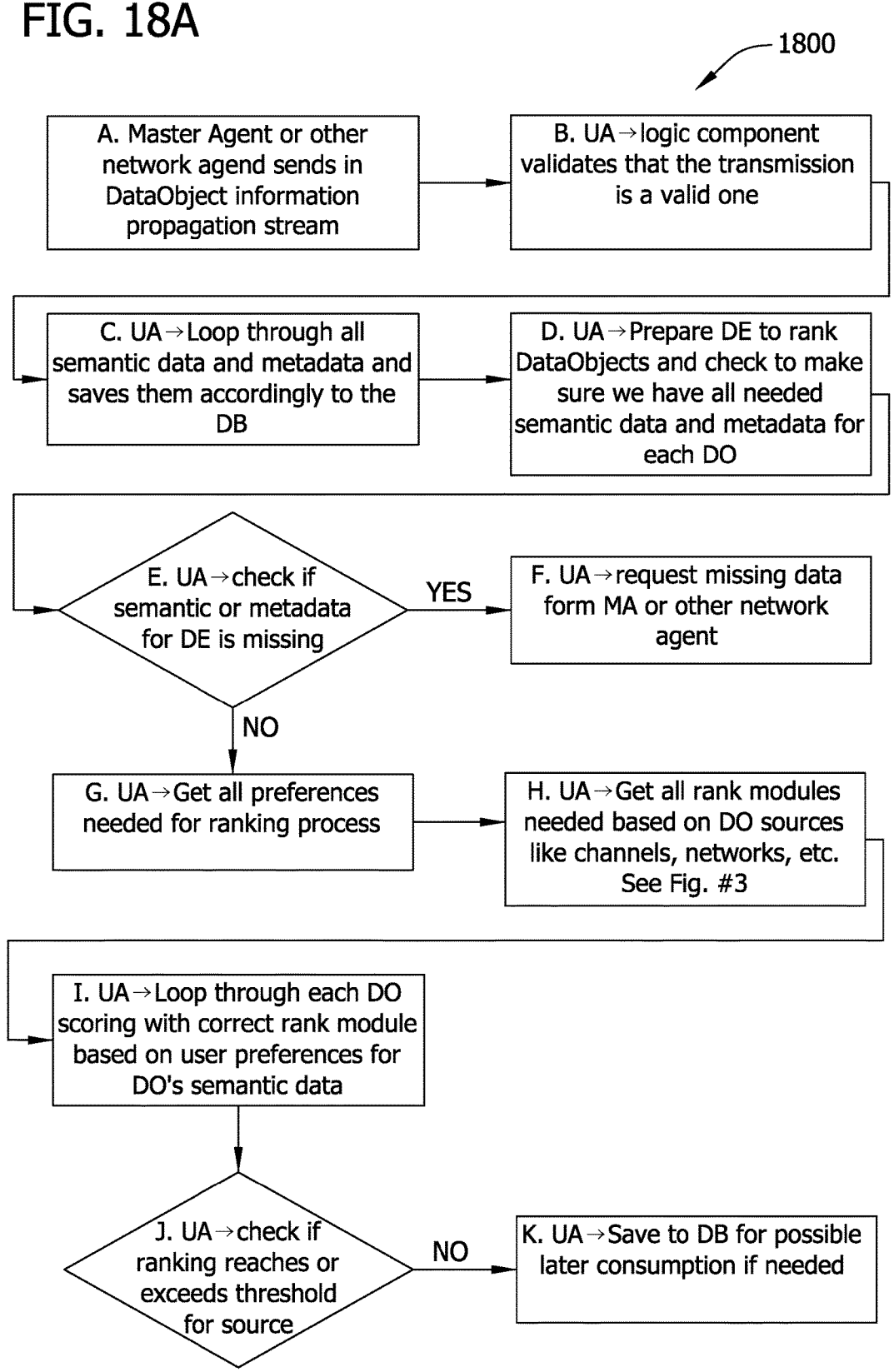
FIGS. 18A and 18B are a flowchart of an exemplary method of agent taking in information, ranking DO, presenting it to the user.
Figure 18B:
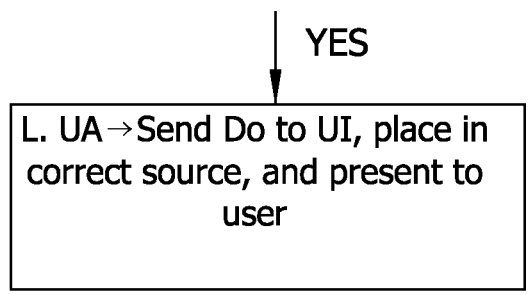

The system may be similar to an intelligent agent. It retrieves information for the user. FIGS. 18A and 18B are a flowchart of an exemplary method 1800 of an agent taking in information, ranking DO, and presenting it to the user. It performs actions on behalf of the user. It can do this implicitly without being told or explicitly if told to by the user. It provides a passive internet experience where information is brought to the user. It can operate in a decentralized or centralized manner with a master agent who performs the global semantic processing, classification, packaging, and distribution. Therefore it could be assisted by a master agent or have semantic intelligence engine incorporated into it to operate in a decentralized manner and complete autonomously.

This construct can support a fully or semi-autonomous agent. From a logistical perspective based on network and local resources, it's more efficient to do the information discovery, semantic value processing, packaging, and distribution with a central point. An autonomous agent or completely decentralized network of agents could accomplish the same tasks but it would take massive amounts of computing power on the client computer, a bandwidth-costly information syncing algorithm between all the agents, and high amounts of bandwidth. Therefore a central point may be used for such a semantic network so that user agents can spend their time evaluating information for the user and learning.

Self-Organizing User Preference Component

The agent's intelligence is self-organizing. It will automatically become "smart" around the data put through it. There is no hard coding for the agent's intelligence. It can handle any type of semantically related information.

Figure 19:
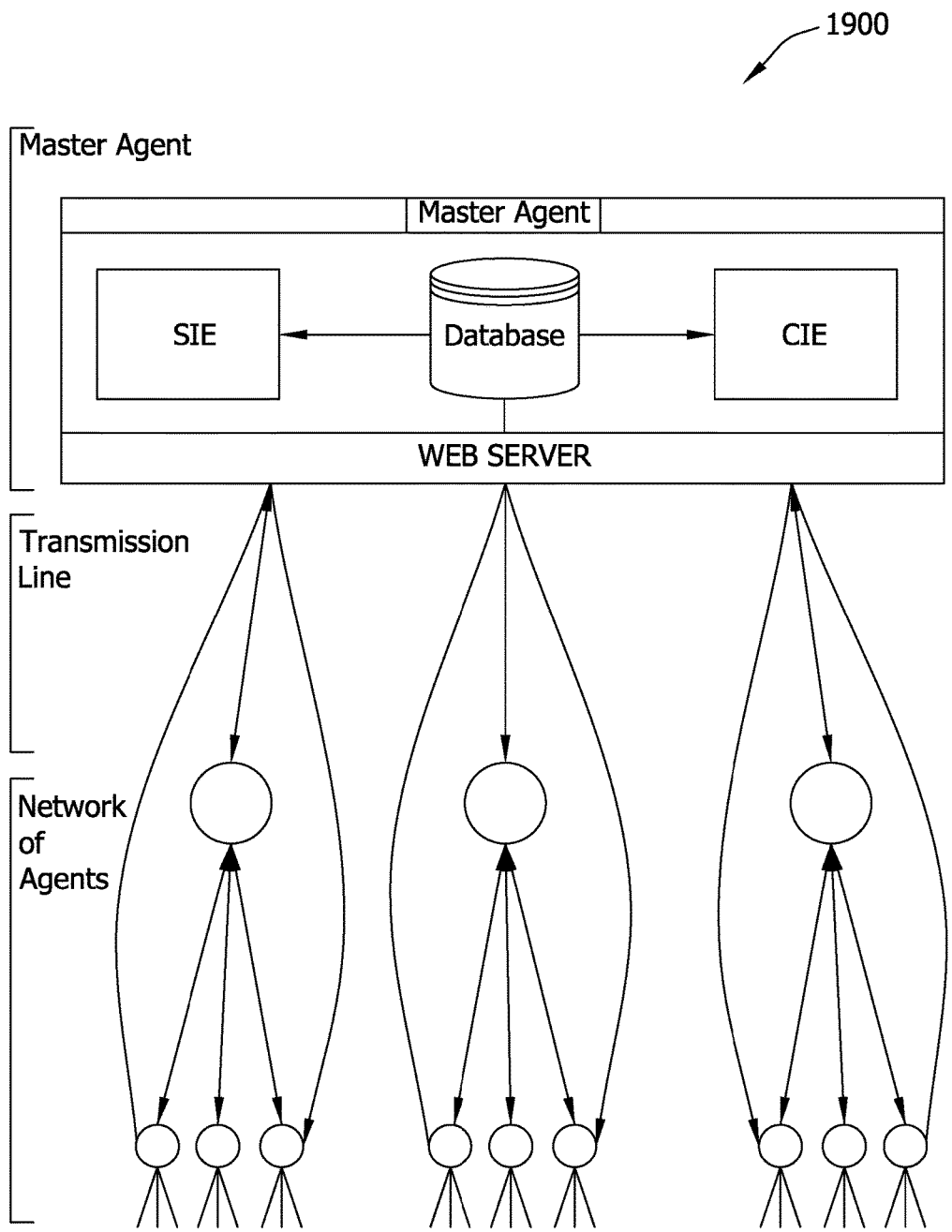
FIG. 19 is a block diagram of an information exchange system with a Master Agent (SIE, CIE, DB, WS), transmission lines, and user agents with diagram information propagation sequence.

The construct works with a master agent and/or other user agents on the network to send and receive condensed DataObject informational feeds that have been summarized and packaged for quick processing. FIG. 19 is a block diagram of an information exchange system 1900, similar to information exchange system 100, described above with reference to FIG. 1.

Based on the semantic feeds the agent knows the essence of DataObjects. With user consumption this information acts as the environmental stimuli that the construct uses to build its intelligence structure. It has an intelligence structure that includes semantic relations that are used to gauge user preferences so that it can make recommendations on new DataObjects to be presented to the user. It stores semantic data sent from a master agent that extracts semantic essence of the data. This allows the construct to store and understand user preferences for semantic data like entities, concepts, context, etc. The agent can also take in semantic formats like OWL, RDF, etc to understand DataObjects and incorporate into user preferences.

Based on consumed DataObjects, the system starts by incorporating the local semantic data found in those DataObjects into the global semantic relational data memory system of the construct. SPO, entities, concepts, and contexts (general and categorical) are related together based on locally mined DataObject composition and already known global relations. These are incorporated into the global user preferences.

Figure 20A:
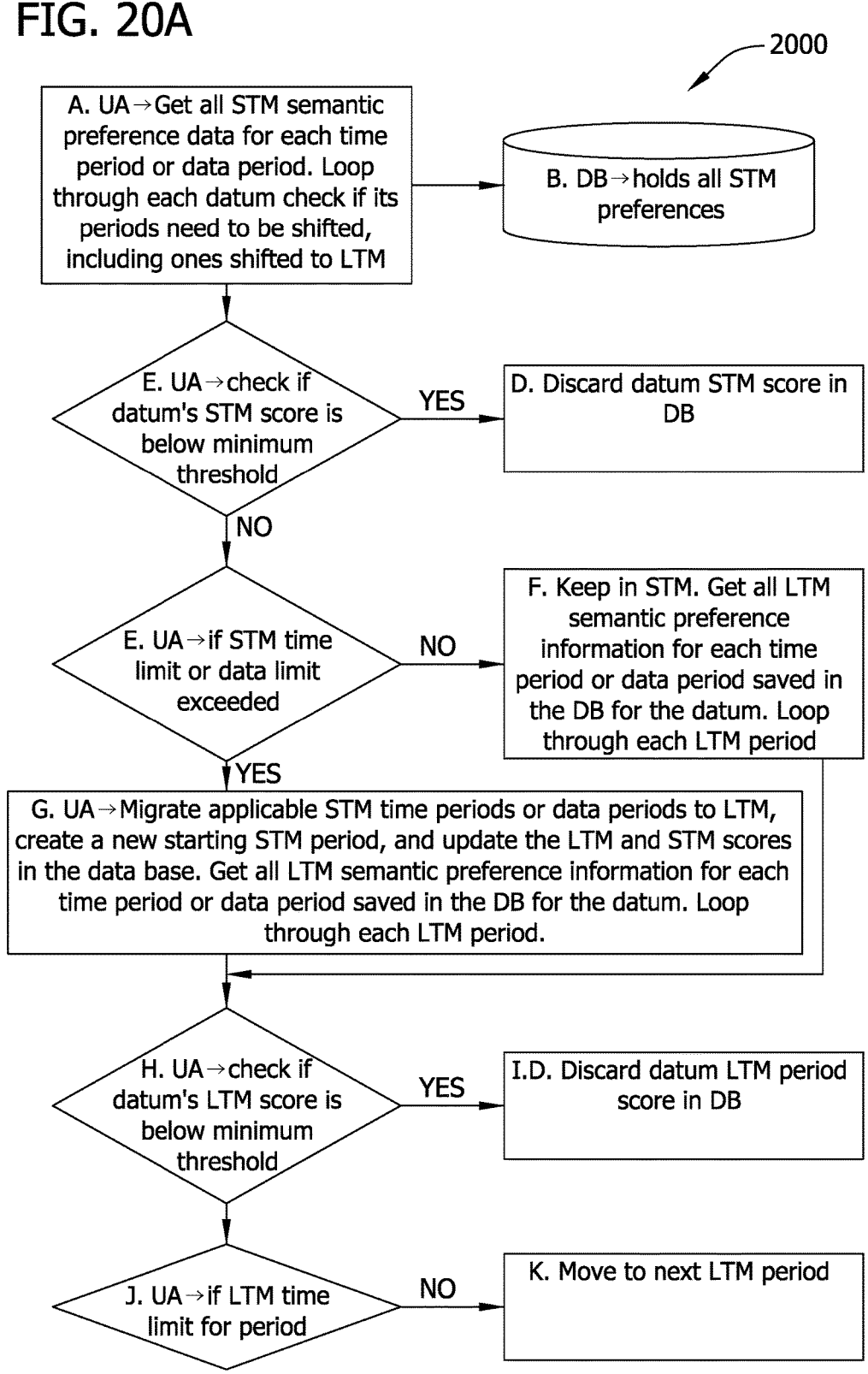
FIGS. 20A and 20B are a flowchart of an exemplary method for moving data from short term memory to long term memory and "forgetting" (e.g., discarding) data.
Figure 20B:
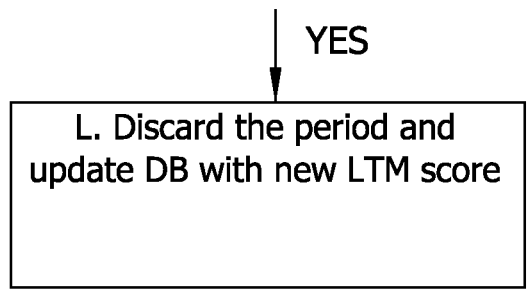

Data is examined and globally stored on a more short term basis. If over time any one of the relations is shown to be more significant, again based on local relations in DataObjects, it will be graduated to a longer, less constrained, memory. FIGS. 20A and 20B are a flowchart of an exemplary method 2000 for moving data from short term memory to long term memory and "forgetting" (e.g., discarding) data. The system tries to quickly weed out non-significant relations as to not overload the long term relational memory. If the short term memory wasn't trimmed periodically the system would grow too large too quickly and become inefficient at retrieving data. It should be noted that data within long term memory (LTM) is not permanent. It too is deleted from the system over a much longer time period if relations turn out to be weak.

The content within the DataObjects determines how preferences get organized. The system incorporates new preferences as appropriate and over time tears them down in STM & LTM if thresholds aren't met. Insignificant preferences are discarded. Multiple preferences are connected together into a network of connections building ordered semantic relationships for user preference decisions and predictions on DataObjects. This allows the preferences to change as the user changes so the construct can make good recommendations to the user through time.

Decision Engine

Figure 21:
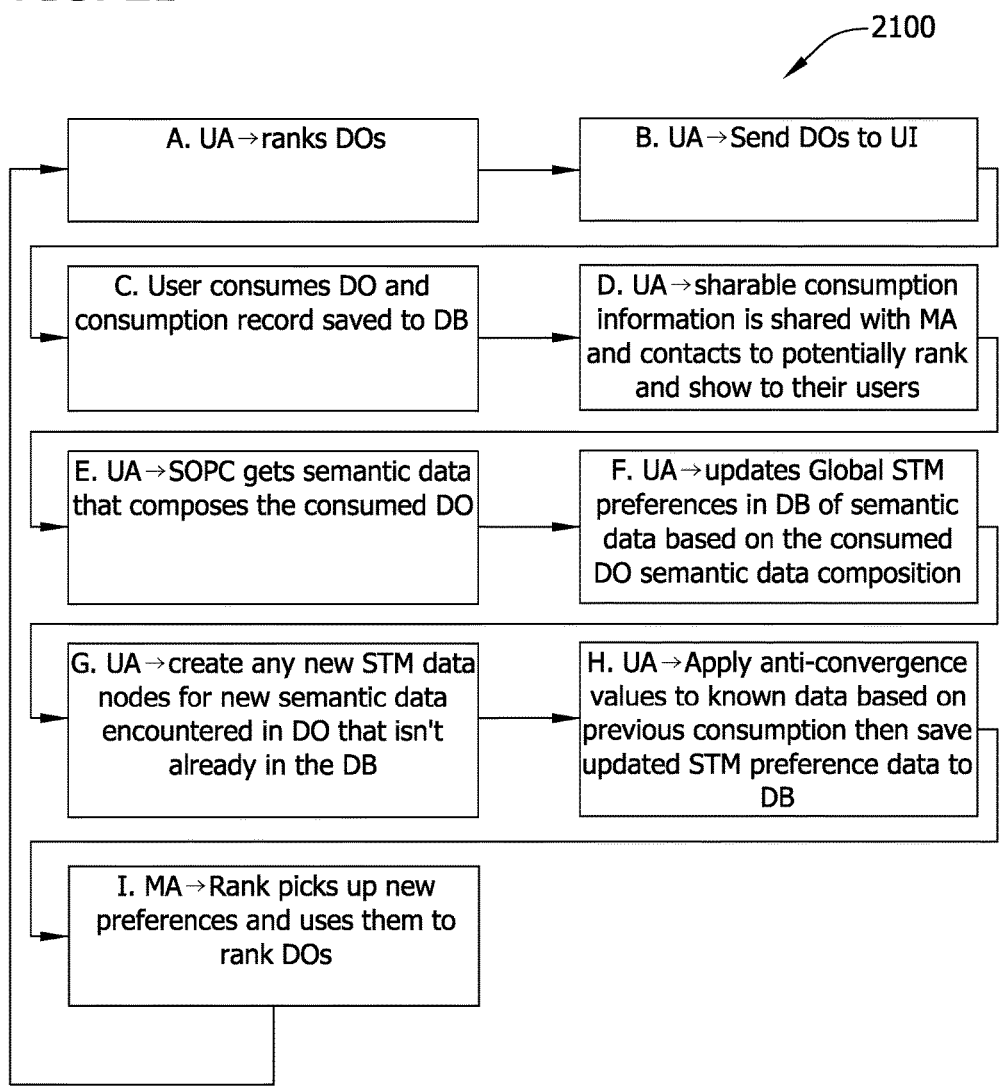
FIG. 21 is a flowchart of an exemplary method of agent recording consumption information and altering internal relations.

This decision and prediction process is the last step in the intelligent thought process before action is taken. Based on outcomes, emotional feelings help humans and other organisms gauge the success or failure of actions. If the organism felt the outcome was a bad one, it was likely a failure and a situation to avoid in the future. Likewise a situation the organism feels good about was probably successful and will influence it to repeat the situation again. The system's decision engine works in a similar fashion. It is a continual feed-back loop of prediction, recommendation, and finally reporting with success and failure which help to reinforce the stored semantic relations within the intelligence construct. FIG. 21 is a flowchart of an exemplary method 2100 of an agent recording consumption information and altering internal relations.

The decision engine is capable of extremely granular, nuanced calculations in decision making. It is a hybrid system where self-organizing intelligence works in tune with the decision engine. The semantic relational structure's information is queried so a decision can be made based on current environmental stimuli in the form of DataObject essence information. The agent predicts if the DataObject should be recommended to the user based on its semantic essence which is packaged up and distributed by the master agent. This allows user agents to quickly process thousands of DataObjects. Calculation granularity is limited by the local computational power and time constraints for DataObject delivery to the user.

To make meaningful predictions the decision engine mines the user preference data within the intelligence construct. It uses semantic relations and user preference values to make a prediction. It also takes into account data such as entities, categories, concepts, etc from within the DataObject's composition that it's sent from the master agent. Based on previous experience with this data and how the data is related, the decision engine can make predictions on the value of the information to the user.

The decision engine is not static. It may change over time, just like the user's preferences. It can adapt its algorithm to the available resources on the local client. It can adjust the number of relations taken into account for semantic data calculations. It continually tries to improve itself by finding the most important, and even new, dimensions for the user. New logic can be bolted on to the decision algorithms from the master agent and other user agents to further try to optimize prediction. New senses can be added as well such as vision, location, etc. for the construct to make decisions on.

The construct can adjust the complexity of its algorithms and depth of its decision to the computational resources available on the client device. It can also use a quicker ranking algorithm to save time to deliver the DataObjects to the user as well. It does this by decreasing the granularity and number of semantic relations and dimensions taken into account for each DataObject. This is useful for different mediums and devices that the construct could reside on. Phones have smaller processors than conventional computers so the agent can adapt its decision algorithms to the environment automatically.

Figure 22:
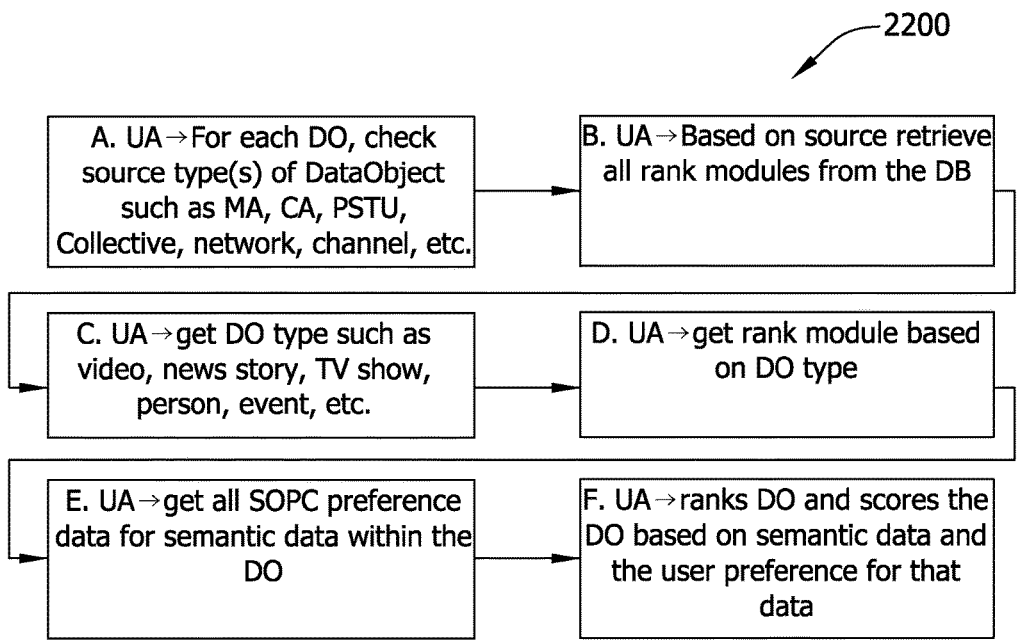
FIG. 22 is a flowchart of an exemplary method of ranking data objects based on data object type.

The decision engine is n-dimensional and can make decisions on new types of data at will. This new data can be incorporated to the algorithm for user's global preferences as well as how it relates to other, older data. New dimensions can be found, shared, received from other agents. The custom content information stream predictions can be based on all sorts of dimensions like collective purchases, demographics, race, sex, location, employment, etc. The algorithm can change based on context. Different types of information sources and data object types can have different ranking algorithms applied. FIG. 22 is a flowchart of an exemplary method 2200 of ranking data objects based on data object type.

New ones can be added, while old, less important dimensions can be taken out. If deleted dimensions become valuable again later then they can be re-added as the user changes. As an example a remote construct could figure out that its user, who watches movies, always wants to see new DVD releases on Tuesdays. It will figure out that day of the week is a significant decision dimension for some users. This agent can share it with other agents or the master agent. If applicable, the construct shares these insights with a master agent to incorporate into a global knowledge base and/or distribute to other agents on the network for algorithmic trial purposes. Other similar users interested in movies may benefit from taking into account this new dimension when it comes to recommending DVD movie DataObjects. It can also be adopted globally by the network if the majority of movie watching users find that it adds value to DataObject prediction.

New logic for new types of information can be bolted on and incorporated into algorithm. The algorithms are just models with separate parts that can be put in, taken out, or edited. As the media-scape incorporates new types of data, new algorithmic modules can be added to the construct to replace old outdated ones.

Figure 23:
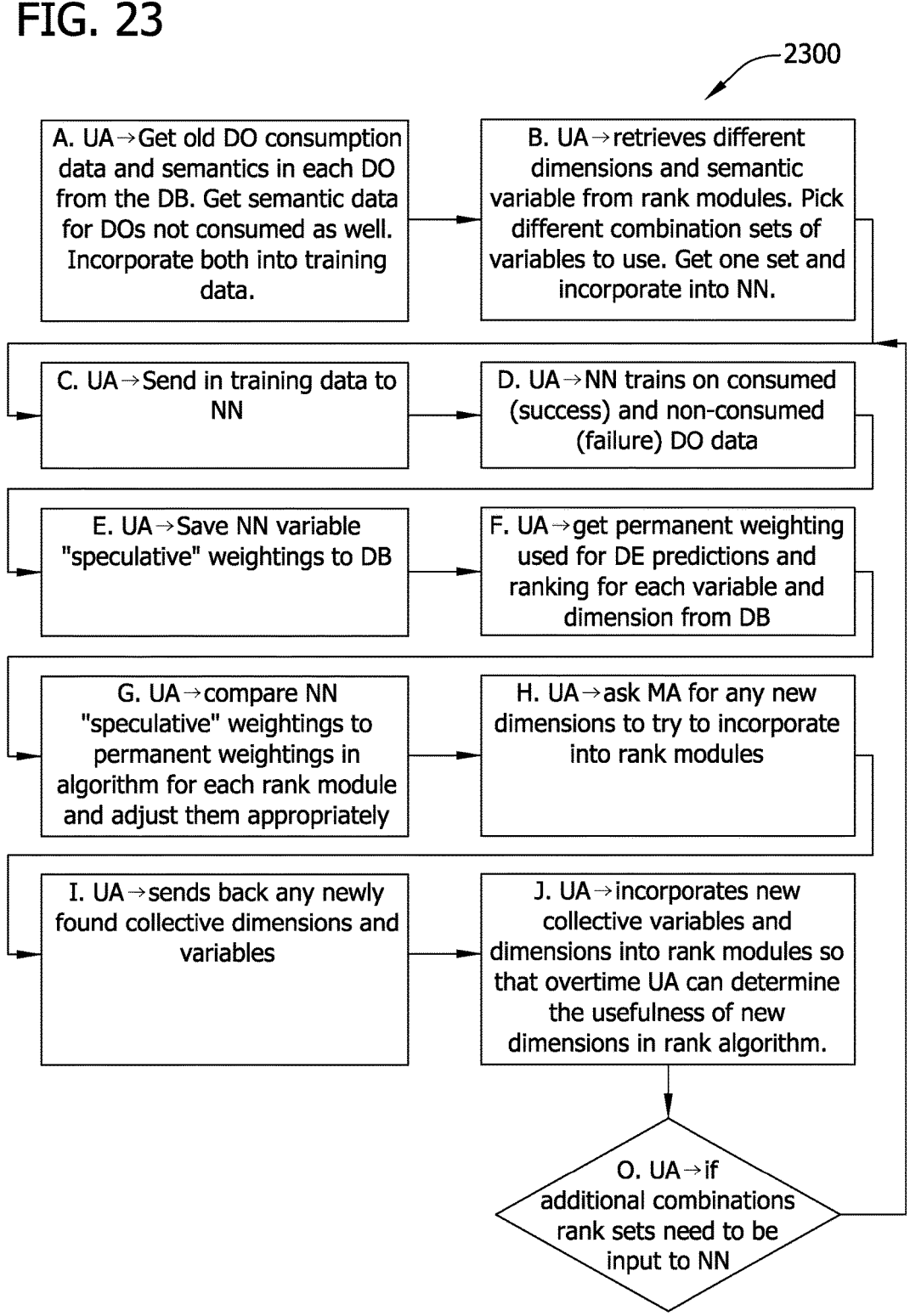
FIG. 23 is a flowchart of an exemplary method of using a neural network (NN) to optimize an algorithm with old consumption data.

Each agent's repository of semantic relations are different; however, they can work together to find optimum algorithms for their users. They continually optimize themselves based on old training data from consumption records. A neural network is used to find the optimum variable weights for the algorithm for each user. FIG. 23 is an flowchart of an exemplary method 2300 of using a neural network (NN) to optimize an algorithm with old consumption data. It should be noted that this is not the algorithm itself. It's used to further personalize the algorithm for each user. It discovers the parts that are most and least important in the decision calculation process for the inner optimizations by weighting most significant variables.

Success and failure is based on the recommendation of a DataObject and whether or not the user consumes it. The construct deems it a successful outcome if it is consumed and a failure if the user views the DataObject but doesn't consume it. The construct is locally stored on the user's computer so it has more in depth access to user behavior outside of internet consumption. It knows what the user does outside of a certain site or browser. For example, it can see how often a song is played on the user's media player. The greater the insight into the user's behavior, the better recommendations the construct can make for the user.

Figure 24:
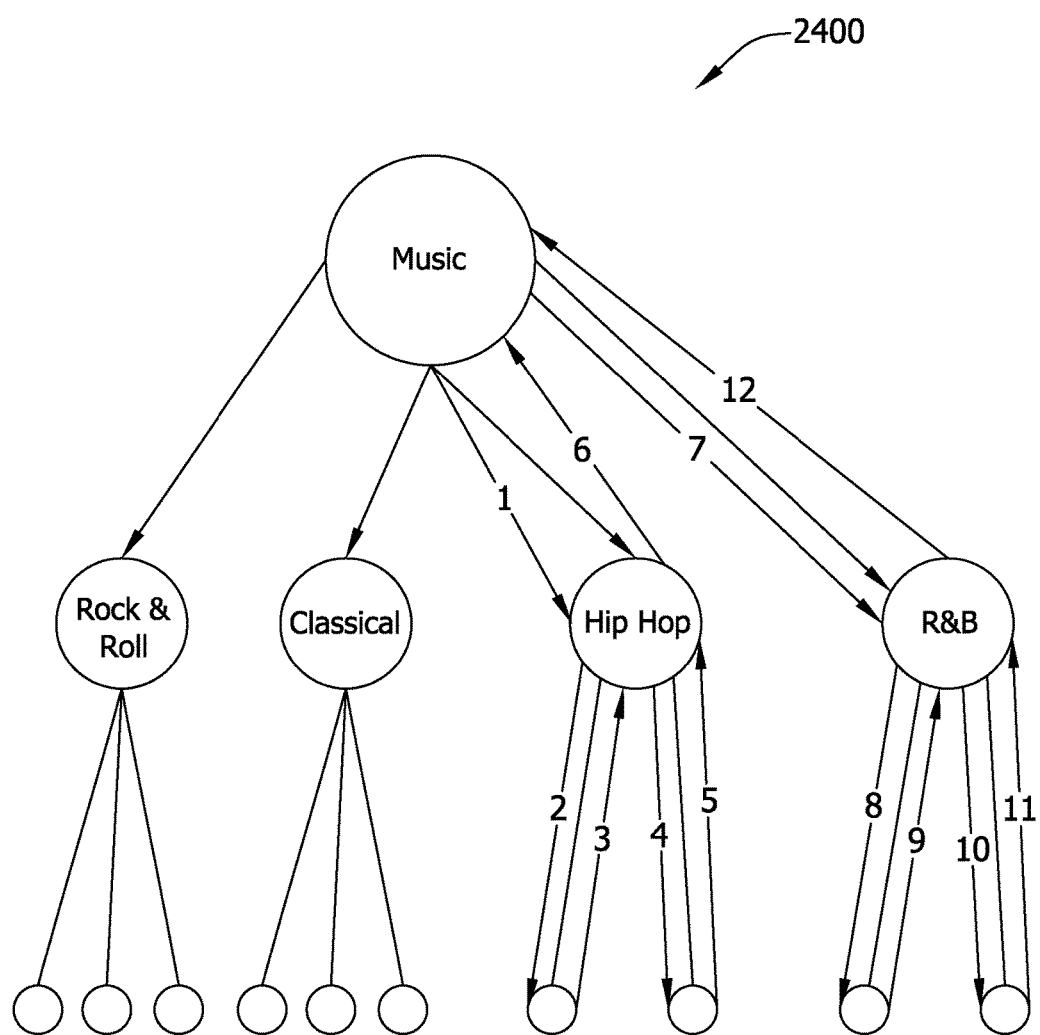
FIG. 24 is a diagram of an exemplary hierarchical music genre taxonomy.

The agent is capable of general learning instead of just detailed learning. Generalized learning allows agent to apply detailed knowledge to other related and similar knowledge. One application of this would be the construct navigating a user through an entire knowledge base that the user is interested in. As an example it could take the user through different connected music genres. FIG. 24 is a diagram 2400 of an exemplary hierarchical music genre taxonomy. Once a user exhausts consumption in one music genre, the construct can navigate up or down the music genre taxonomy. It can find sibling, parent, or child genres in the hierarchy. From nearby nodes, the construct can find new music from different yet closely related genres to recommend. Preferences and semantic relations are stored in a hierarchical memory structure. It allows the agent to navigate the taxonomy taking the user through all related, local knowledge areas. The construct is not limited by new, incoming data. The construct can understand and recommend older DataObjects as well such as composers of classical music, 70's TV shows, or ancient Greek philosophers. DataObjects and knowledge do not necessarily have to be time based.

The system has anti-convergent safe guards (e.g., FIG. 21-H). The construct is a feed-back system where preferences build up over time. If they built too quickly before they can decay then the system can become imbalanced and converge toward a preference that is too strong and outweighs other preferences. If the decision engine didn't have such a mechanism in place it would soon just recommend and predict DataObjects containing the convergent preference thereby degrading the quality of DataObject picks for the user.

Using the decision engine described above, the construct can make decisions and predictions. It can deliver custom tailored picks for each user through the traversal of the user's semantic data preferences. The composition of the decision engine may be unique to the user. Exemplary operation of a decision engine is described below with reference to FIG. 36.

System Features

Figure 25A:
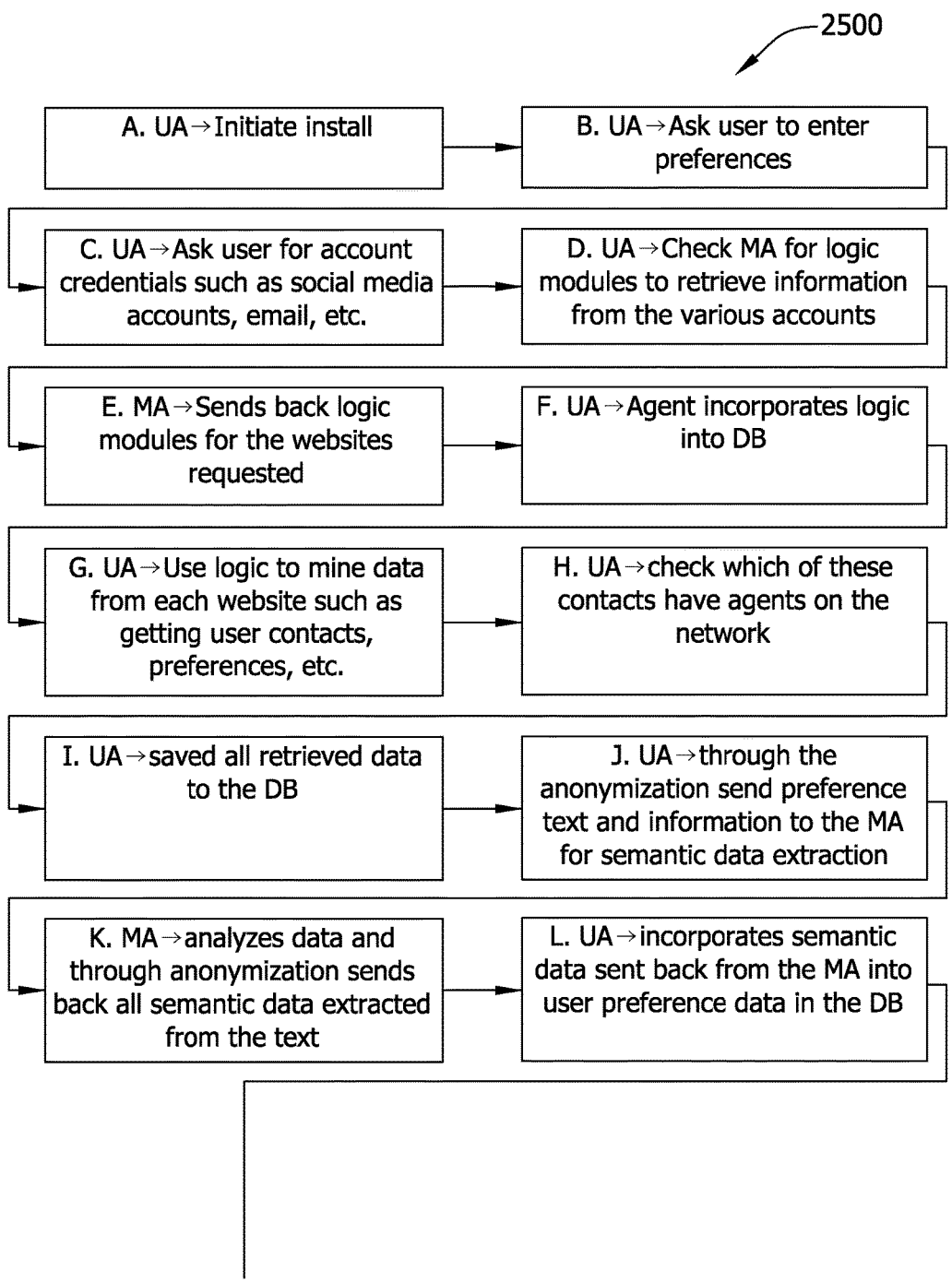
FIGS. 25A and 25B are a flowchart of an exemplary method for cold starting recommendations.
Figure 25B:
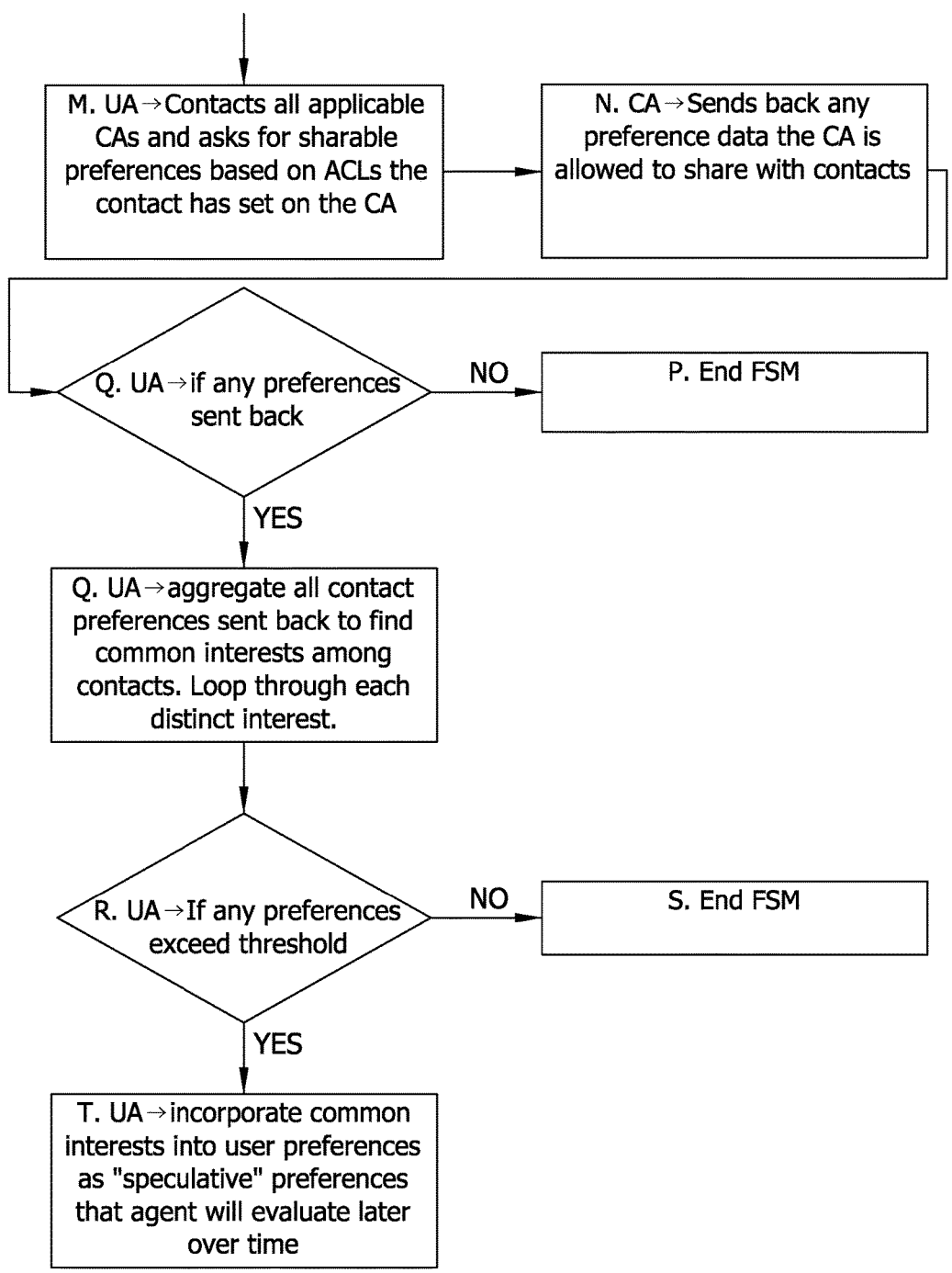

The system has several features that make it more useful to a user. The construct has a cold start program meant to facilitate making good recommendations to the user as quickly as possible after installation. FIGS. 25A and 25B are a flowchart of an exemplary method 2500 for cold starting recommendations. In the beginning the system will have no information about the user. There are several ways it can quickly learn about the user. The system will mine the content of the user's online accounts such as email and social networking sites. It will get all the user's contacts from those accounts and see if any of them have agents or publicly accessible information. If they do the system can quickly find common preference with the local group of contacts. The user is likely to share these common preferences. The cold start program also allows users to explicitly input any preferential data on categories, context, concepts, entities, websites, profession, age, sex, location, etc. Any content that is gleaned from the user's accounts can be semantically processed by a master agent with the data essence sent back. The master agent can also find user similarity right away with contacts and other users within the network (PSTU). Based on the DataObjects the user's PSTU are consuming, DataObjects can be sent. In this way agents can collectively work together to expose preferences that contacts and PSTUs have in common.

The agent can also learn about the user through the implicit actions of the user. The user does not have to explicitly tell the agent what to do or what the user likes. The agent can infer preferences simply from what user's activities. For example the agent would be able to see what songs a user plays on another application or on other devices. From this it can learn preferences and know not to recommend recently consumed DataObjects.

These agents are capable of being centralized (e.g., as shown in FIG. 4) and/or decentralized. (e.g., as shown in FIG. 7). Centralized agents communicate with a central point of some kind to get DataObject feed updates and find other agents on the network. Decentralized agents don't report to a central point. They rely solely on an internal routing table and autonomously query other agents for DataObject updates and how to locate other agents on the network. The user has the ability to set the construct to a decentralized mode of operation. To receive incoming messages so that agents can communicate in a decentralized manner they will set a NAT mapping for the internet gateway device, such as a router, for the LAN in which the agent is operating. This port forwards the router to send incoming messages from external agents to the network's internal agent.

Both centralized and decentralized agents work in an anonymization network to relay data in a more secure fashion. They can share DataObjects, including advertisements, in a P2P manner and do it anonymously through the anonymization network. Sometimes agents will not want to report consumption information for collective learning directly to the master agent because of privacy concerns. Therefore they can use the anonymization and allow other, trusted agents to report consumption data for them. Agents work together in anonymization so that consumption data is not directly reported to central points (e.g., as shown in FIGS. 11 and 12). Therefore a central point cannot track the preferences of each individual agents and users since calls in are coordinated and anonymized.

Figure 26:
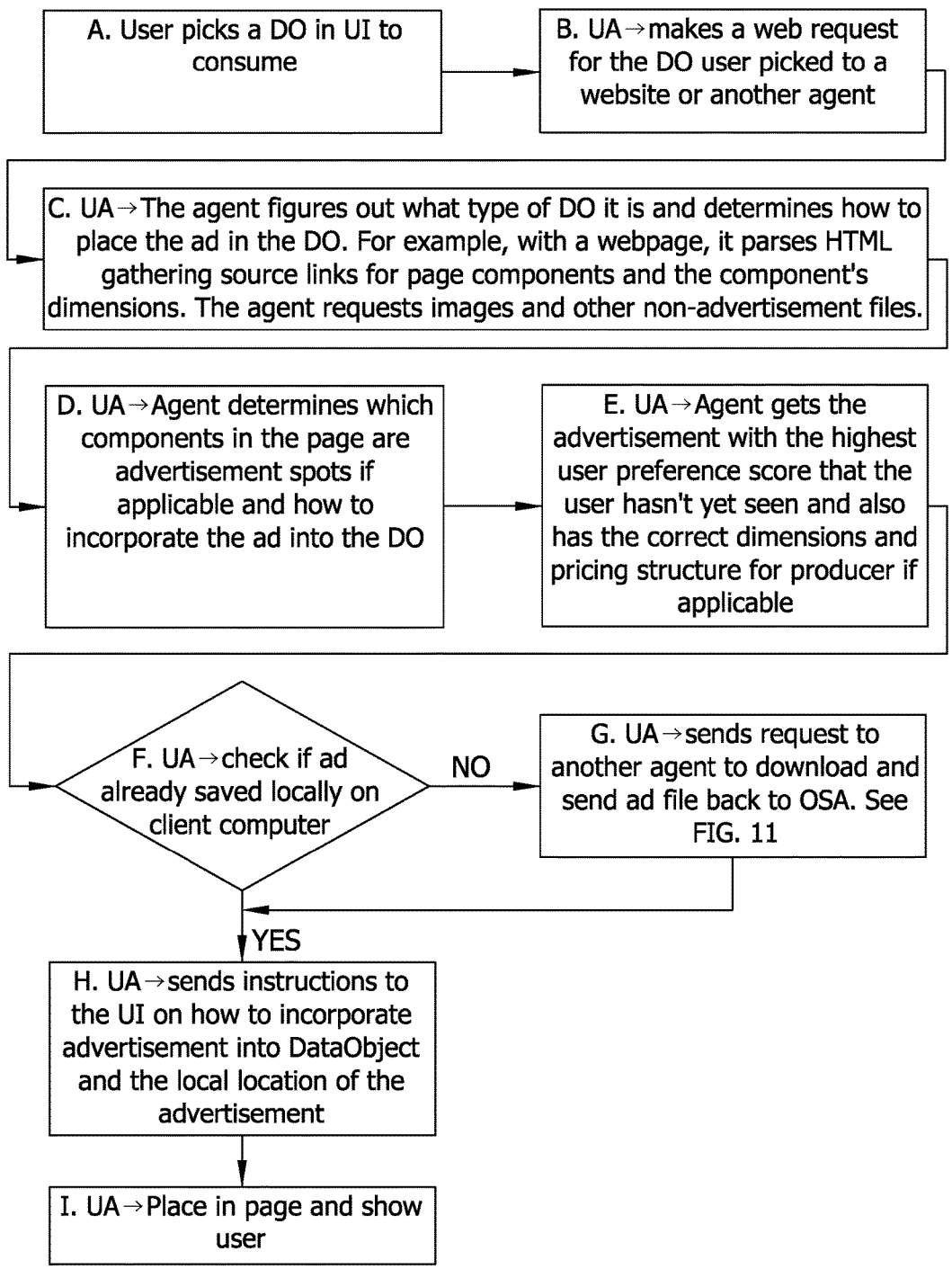
FIG. 26 is a flowchart of an exemplary method of replacing an ad for a user in a webpage or video

Agents can get a feed of DataObjects from a master agent (e.g., as shown in FIG. 2) or other agents. Some of these DataObjects are advertisements. The agent can pick the ads that a user would be most interested in. For example a soccer coach may be interested when team jerseys go on sale before the start of the soccer season at the local soccer shop. The agent can pick ads for users that are helpful to the users. FIG. 26 is a flowchart of an exemplary method 2600 of replacing an ad for a user in a webpage or video. The construct determines the personalized, private ads that are displayed to each user. This is a similar process to the agent picking personalized DataObjects such as webpages, media, events, etc. Agents work together to deliver new advertisements and the semantic content of the advertisement. They also report consumption information about both DataObjects and advertisements in an anonymized manner (e.g., as shown in FIG. 16). As stated earlier to mask user advertisement consumption, agents can relay information to a central point like a master agent through anonymization network of agent proxies. This facilitates keeping user ad consumption private. In some embodiments, the reported browsing and consumption data cannot be tied back to an individual. This creates a healthier internet ecosystem by increasing revenue for information producers so that creation of future information is funded. Agents integrate with advertisement networks and websites to work in cohesion for displaying advertisements. It can use a network's or site's collection of advertisements from an ad repository to target users in a personalized, yet anonymous, way while still allowing proper verification of impressions, click-throughs, and conversion statistics to the central points such as websites and advertisement networks.

There is no extra advertising. Agents simply replace the non-personalized ads with the targeted ads in the webpages, videos, and other DataObjects that user consumes. An agent can even personalize commercials as users watch television or listen to the radio. Instead of ads that don't apply to the user and waste time, pertinent ads that apply to him are inserted for the user to see. Agents can work in a collective manner with ads just like DataObjects. They can tell other agents with users that possess similar advertising preferences which ads have worked best for their user. In this way other agents can better rank ads from not just an individual preference sense but also a collective sense. Agents can integrate with other programs such as other computer programs like a computer's browser to help deliver customized information, including ads, to further personalize the user experience.

Agents keep internal routing tables of contact and PSTU network locations. They can use these agents as an anonymization network to route messages and other information to a central point. They can also use them to request DataObjects from a central point like a master agent. In this way the central point may have no awareness of who is really requesting or consuming information keeping everything private and not allowing users to be tracked. The agents can specify the extent of the routing table and if contacts of contacts (commonly called Friend of a Friend—FOAF) can use them to route messages as well. In this way they can create routing tables and sync data with each other when IP addresses change so that the flow of information isn't hindered in a decentralized network.

These agents work collectively in a number of ways. The basic intelligence (brain-like) structure, which is the foundation of the agent, will be used for greater and greater actions over time as the swarm learning allows agents to bolt on new knowledge of other agents into their memory structure (e.g., as shown in FIG. 15). With a common sharing interface between agents these new wirings will continually be bolted on to the agent's memory structure to make it more sophisticated and useful to its user. New programming code can be sent to the agent from a certified master agent, new semantic relations can be sent between trusted agent contacts or the master agent, new algorithm parts can be shared between trusted agents or the master agent.

Agents understand similarity in user preferences and share information between each other based on similarity. They can generalize problems from other agents and use this knowledge to solve specific problems for their user. Other intelligent agents store information that the user enters like "send flowers to mother on Mother's Day". As agents work together and the agent gets to know its user, it can recommend, if applicable, that the user send flowers for Mother's Day.

Constructs can coordinate and share responsibilities with each other. Agents can autonomously find partner agents or they can query the master agent for partner agents to help with DataObject computing while offline. Agents can coordinate the processing of DataObjects so that when a user comes back online there is no retrieval and processing delay in the recommendation of the newest DataObjects that were produced while offline. These agents will trade off processing duties while the other is offline to increase the user experience for both of their users.

Agents communicate with each other over a secure connection. They can use a central point like a master agent as a key store for agent verification and to facilitate the public/private key exchange (e.g., as shown in FIGS. 9 and 10). Each transmission is also tokenized so that agents are not susceptible to replay attacks by malicious users. All system transmissions, including transmissions between the master and user agents and also transmissions between just user agents are encrypted. The constructs use a public/private key encryption scheme. For agents to be able to communicate securely in a P2P manner, they may have some way of verifying that the other agent they are trying to communicate with is the actual agent and not an imposter. They can work with a master agent that acts as the certifying authority for agent identification. As certifying authority it authenticates the identity of each agent before they can communicate over an encrypted stream. Once the master agent confirms that both agents really are who they say they are, it provides the public keys of each agent to the other. This allows each agent to then decrypt messages from the other agent while making sure that it is communicating with the correct agent on the other end. If there are agents in the network trying to masquerade as an agent different from themselves, the system can record their malicious activities. Agents can learn from the master or each other about malicious network elements and ostracize them from the network.

The constructs has internal security features as well. It can facilitate secure web account integration by storing random passwords and security questions that are independent to the user so that malicious hackers cannot data mine user public data on websites to try a social media-style attack to take over the account. Agents can be backed up securely, encrypted on an online drive of a network supporter. Only the user will have the ability to unlock the backup.

User Interaction

The construct can reside on and/or be executed by any computing device (e.g., any device with a processor). It can be put in a phone, TV, car, home security system, etc. It can be used to assist other applications such as being a plug-in for a web browser application. The user interaction for all devices takes place through a user interface (UI). There are several areas of knowledge and data consumption in the UI. Each major area has sorting, filter, and custom viewing options. The agent picks the best DataObjects types for the user and displays in these areas.

The UI contains Queues of DataObjects that have been selected for the user. Queues are lists of DataObjects for the user to consume or that already have been consumed in some way. Queues can be based on best DataObjects from all channels, saved DataObjects, consumed DataObjects, etc.

The UI contains Channels. These can be made dynamically by the agent, explicitly by the user, or shared collectively between agents for similar users. They contain a list of DataObjects for the user to consume. There are many different types of channels based upon collective consumption like friends or PSTU, network popularity, top-rated, etc; user preference, semantic data like entities, concepts, and categories; and there can even be custom channels made by the user, agent, or collective by other network agents.

Based on possible SPO's and semantic relations users can custom make channels tailored to their specifications. Based on the channel composition, the agent will retrieve DataObjects that conform to the custom criteria. Channels can be general or specific. They can be as general as "Tell me when congress passes a new law" or "Retrieve new episodes of Family Guy when they come out". A user can construct very granular channels well such as "Retrieve all video highlights of Lionel Messi scoring goals for Barcelona in La Liga" will be sent to the user. Agents can try to autonomously make these channels based on user preferences as well. The constructs can see if the user is receptive to the DataObjects it produces. If the user consumes those DataObjects, it will ask the user if the channel should be adopted. Adopted channels can be shared collectively with other agents since similar users may be interested in the same custom DataObject feed. Channels can be based on different channel types such as popularity, user preference, importance, etc. Channels can also be based off networks that the user is a part of or similar people that the user is connected to. These networks can be created to be public or private among users and agents to share information about different knowledge areas or simply for data synchronization. Channels can also present the user with specific DataObject types such as videos, people, news stories, events, etc.

Channels can be set up to integrate with online accounts as well. For example the agent could integrate with a user's online bank account and give various updates such as the account balance each day or whenever the account balance is below a certain amount. These account updates are configurable by both the agent and the user.

The UI contains a messaging section for user to create messages and consume messages from various online accounts like email or social networking. Users can also send messages directly to users of other agents strictly through the network. The UI contains all the user's contacts from the various accounts and the network agents. Based on ACL's the agent automatically disseminates user consumption data to other trusted agents so their users can benefit from each other through consumption in similar, preferred knowledge areas.

The UI contains mechanisms for displaying data such as a browser for displaying web pages as well as and media player for playing videos, TV shows, and movies. The user has the ability to consume DataObjects outside the construct in different browsers or media players as well.

The UI contains calendars for upcoming events like concerts, future TV shows or movies, or a dentist appointment. The user can tell the construct which DataObjects to retrieve once the DataObjects are released. For instance, the user could tell the construct to retrieve a future episode of Family Guy when it comes out later in the week. DataObjects can be synced to other construct instances on other devices through the calendar.

Agent behaviors can be set up by user or learned dynamically by the agent. They can be shared collectively among agents and also through a master agent for similar users. The agent behaviors can sync data between different agent instances that reside on different devices. The data syncs are intelligent so the agents can synchronize data and devices based on user habits. They can auto download content based on these habits and individual device limitations. For instance if a businessman rides the train to work each weekday, the agent can sync stock markets news, videos, and also textual stories to the user's portable computing device. It the device's bandwidth is limited the agent can figure this out based on data type consumption and send low bandwidth DataObjects that are easily and quickly downloaded such as news stories that are in textual content form. In this way the agent intelligently pulls in information for the user ahead of time to improve the user experience by saving time and resources.

Agent behaviors can be made explicitly by the user. However, like channels, constructs can learn successful behaviors from other agents in a collective manner. If the users are similar, it can learn from connected agents of similar users that were successful in presenting new channels to the user. Behaviors include the relational knowledge between a behavior and a network supporter so that the syncs can be integrated and automatically sync to online drives. Videos can be sent to the work computer with high bandwidth. The agent can learn over time based on consumption and generally from the collective to send certain DataObject types based on capacity of the device to receive and store data. For instance, it won't send big files and send the most important DataObjects to a portable device.

These behaviors also include action behaviors for the agent to perform specifically with certain DataObjects. The behaviors are combined with semantic relational data so it knows what a website is, and that a website holds data objects at a certain location such as a URL. With the correct logic modules, an agent can parse the page correctly and download the data for user or replace a certain part of the page with personalized ads or even personalized content. This logic is extraction logic for the internet (how to get DOs) and also behaviors, new channels, new additions or updates found for ranking and the decision algorithm.

Monitoring

Exemplary methods of monitoring user actions are described below.

The system has a HTTP Proxy that monitors all web traffic that goes in and out of device on which the construct operates. There is two way communications between the HTTP Proxy and the agent over a local socket and port. The HTTP Proxy simply updates the agent with new HTTP streams. The agent takes action analyzing the streams and with proper user permission can anonymously send stream and consumption data to the Master Agent for further collective processing. The MA may classify the site or webpage DO and inform the sending agent, possibly through proxy agents, of the semantics of the site, page, video, etc. The user agent will then update user preferences accordingly for the consumed DO. The construct can also send back modifications on the HTTP stream to the HTTP Proxy. For instance it can send personalized ads for a web page that the HTTP Proxy can insert before sending back to the browser whether a browser plug-in exists or not.

It can determine the web accounts the user has, account credentials, in accordance with a browser plug-in or key logger to help with encrypted streams; account contact interaction; actions taken while web surfing, for instance it can discover the user does bill pay through a banking website once per month and checks account balances every Friday; and overall web consumption that occurs outside of the agent. These are all done so that the construct has a better idea of all user preferences. The HTTP Proxy is also used collectively for website discovery. For instance new websites and web-based DO producers, such as a new blogger, can be discovered. If enough users go to a new site the Master Agent may decide to incorporate the site or blog into the system as a producer and analyze its DOs to send back out to other network agents.

Through repeated actions like the user going to a banking website to check the account balance every Friday, new decision model dimensions and user actions can be discovered. Relevant data can be extracted and automatically delivered to the user so he doesn't have to take explicit actions anymore. As mentioned above, the agent, with the help of Master Agent which harnesses data collectively from the network of agents and similar users, can discover new dimensions for global decision models or local models used by the user. In this case it may discover the website, action, and day dimensions to learn to make decisions and DO recommendation based on them. It may learn to tell the user his bank account balance on Fridays for example.

The construct can interact with program plugs-ins such as an agent browser plug-ins. Agent browser plug-ins allow the user to do most of the functions and features of the agent within the browser such as consuming new DOs, communicating with contacts, watching videos (web videos, TV shows, movies, web cams, etc), and getting updates on new DOs and contact status changes while the user surfs the web. The agent browser plug-in harnesses API's that the browser exposes. The agent plug-in acts as another UI container for the agent to populate with information. The agent still does its own DO processing in the background. The agent updates the plug-in with new data while the plug-in updates the agent with user actions. The plug-in can modify underlying web page HTML as well. The agent can send personalized ads to the plug-in so it can replace the current ads with the personalized ones for web pages in the browser.

The construct exposes APIs that allow other programs to communicate with the construct. Other local programs can communicate with the agent on a local socket and port on the computing device. Other programs can interact with the agent to get personalized ads, DOs, contact status updates. The construct can do intelligence calculations for the programs as well. The user would be explicitly prompted to allow certain actions and information sharing to take place between the programs like off-loading intelligence calculations or serving up personalized ads.

Through the HTTP Proxy or an agent browser plug-in, the construct can interact with websites to deliver custom content for a user. One example would be changing what is displayed on a website such as stories, social media messages, videos, even ascetics of the site like color. The construct can publically expose an API so that when websites send content to a user's browser, they do it in a format compliant with the API so that the construct or plug-in can quickly filter content to give the user a personalized view of the site's data. This could also help websites that recommend items to users. It could assist these sites in making better recommendations. This is done in a secure manner so that user preferences are not revealed to the site unless users take further actions on site content. Users have the ability to allow or deny the construct to personalize web content.

The construct could interact with the underlying Operating System (OS) as well to change OS settings if an OS API exists and is exposed to local programs. For instance it may tell the OS where to store a document based on its semantics such as a Word document. The agent would analyze its semantics and tell the user where to save it. Normally the word processing programs like Word will save a new document in the user's "My Documents" folder. The agent can observe how the user saves documents over time. Based on those dimensions, it can figure out that the user usually doesn't save Word documents in the "My Documents" folder as much as saving in user created directories near other relevant data to the Word document. The agent could tell the OS not to use the "My Documents" by default and instead specify which directory to use. This is how the agent can locally or via Master Agent, which collectively monitors new and successful actions other agents take with their users, pick up dimensions and incorporate them into the decision process. For the directory dimension of the action, the default "My Documents" directory is a weaker factor in deciding which directory to save data compared to directories with data files with knowledge area similarity in user created directories. It should be noted that this is a very simplistic explanation of learning that would be iterative and would takes a significant amount of dimensions, relations, generalization, and especially processor cycles.

Exemplary Decision Engine

Figure 27A:
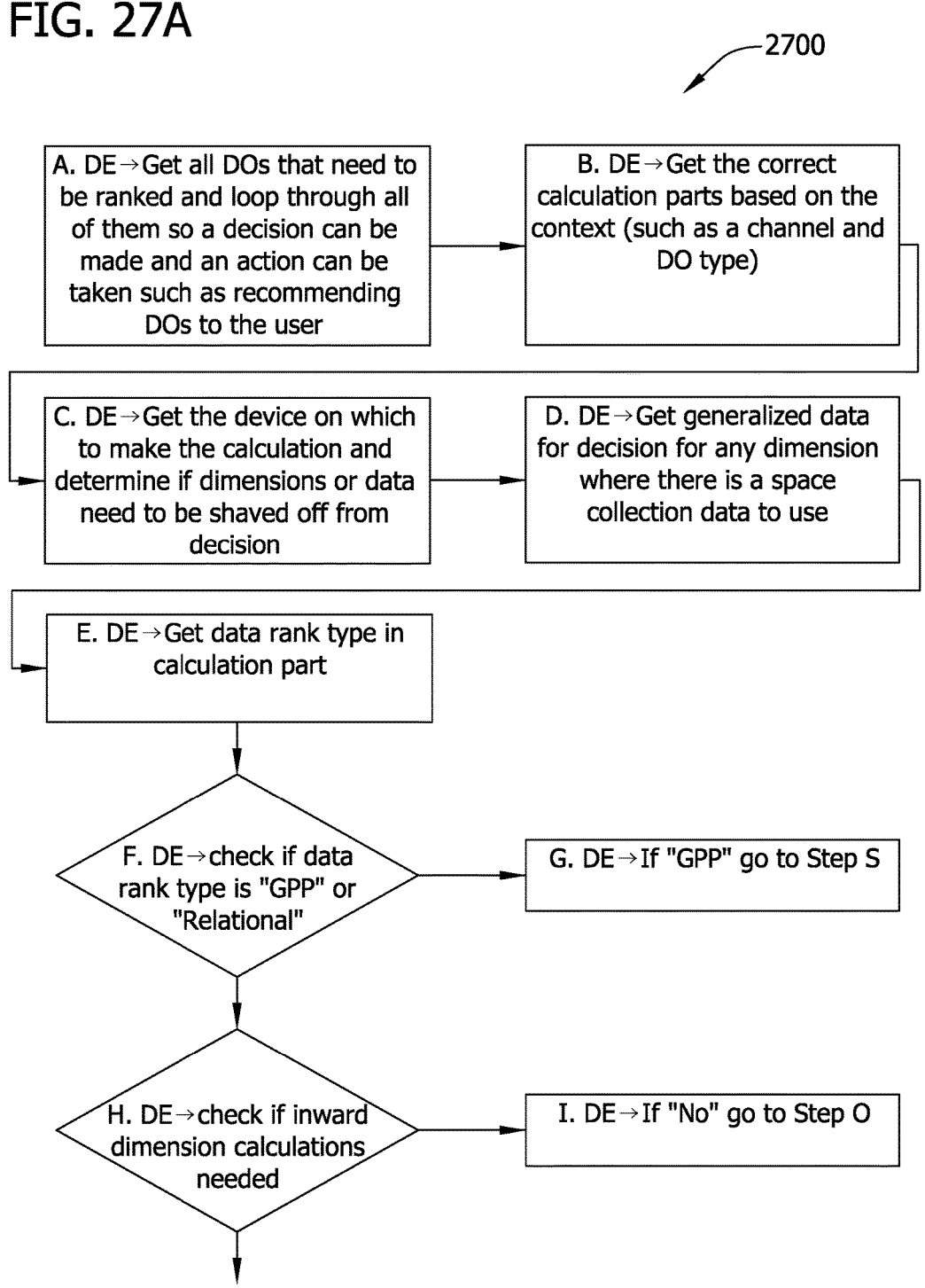
FIGS. 27A, 27B, and 27C are a flowchart of an exemplary method of operating a decision engine.
Figure 27B:
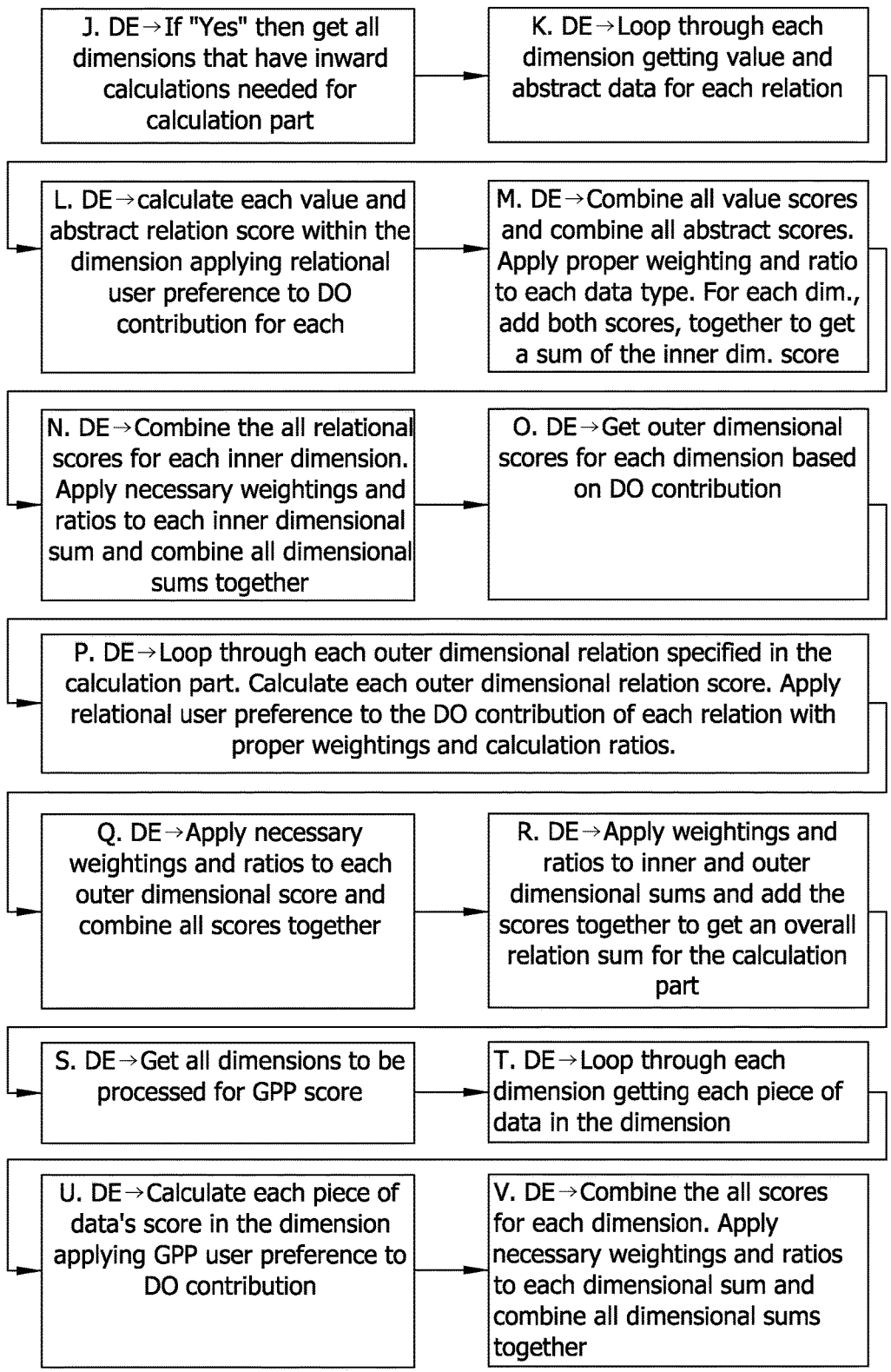
Figure 27C:
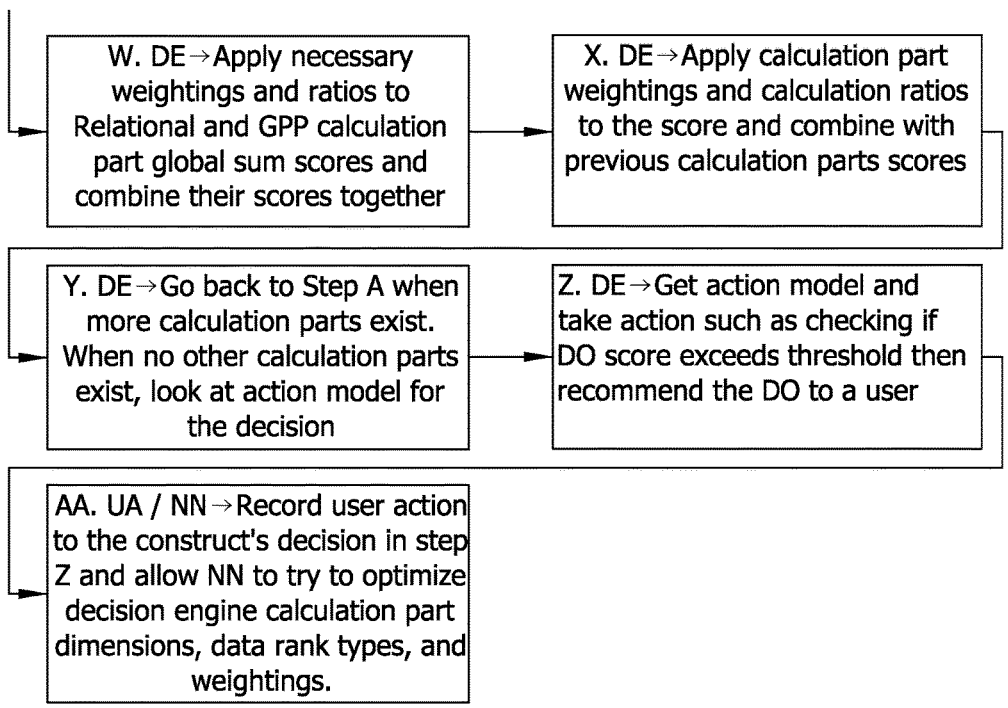

FIGS. 27A, 27B, and 27C are a flowchart describing an exemplary method 2700 of operating a decision engine. In exemplary embodiments, a Semantic Intelligence Engine (SIE) remotely builds global semantic intelligence in a self-organizing manner outside of the intelligence construct. The SIE updates network constructs with decision models. The Decision Engine (DE) within the intelligence construct makes decisions based on Data Objects (DOs) semantic essence data sent to the construct via the SIE and user actions over time (recorded locally by the construct). The two parts of the SIE and DE work together. The DE leverages user data that is locally created (data is also forgotten) over time to continually improve on the decisions the agent makes.

1. Dimensions

The dimensions in each calculation represent different variables or data types in the problem space used to make a decision. Dimensions are used in different ways in the decision. Based on the calculation part they are processed in a certain order; they are sometimes combined with other dimensions; they sometimes have inner data dimensions to be processed; and they all have different weightings in the decision.

Inner Dimensional Data and Relations—Some dimensions will have inner dimensions to be taken into account. Usually this occurs when there are multiple data instances of a certain dimension in the problem space of the decision. For example a DO may have many entities. Although "entity" may be a dimension, it may be appropriate to calculate how each of the inner dimensions (each entity) contribute to the entity dimension and the DO as a whole based on its relevance in the DO, its weighting, and its relations to other entities in the DO.

Abstract vs. Value for Inner Dimensions—An example of value data for the entity dimension would be "Brett Favre". His entity type may be "Football Player". Brett Favre acts as the value data piece while Football Player acts as the abstract data piece. Abstract data is important for data generalization purposes as well as for small data sets where huge numbers of combinations exist for value relations in a certain DO type like movies. The value relations may not be as repeatable over time; however, the general relations will be. Generalized relations, based on abstract data, can gauge user preference better than a weak scoring value relation unlikely to be seen again. Generalized relations will be more repeatable over time and therefore have a better chance to contribute to overall user preference.

Outer Dimensional Relations—Outer dimensions are relations between different dimensional data types. User may like to consume videos of Yankee games but not like to read stories about them, a user may like NFL articles from ESPN but no SI, or user may like to consume articles about Albert Pujols when he plays for the Cardinals but not like DOs about his local charity work. Therefore the decision can be made based on different outer dimensional relations that are significant in user consumption.

2. Decision Models

The Semantic Intelligence Engine (SIE) remotely builds global semantic intelligence outside of the intelligence construct. Through the Master Agent the SIE updates network constructs with decision models. The Decision Engine (DE) within the intelligence construct uses decision models to make decisions based on DataObjects' semantic essence data sent to the construct via the Master Agent and user actions over time (recorded locally by the construct). The two parts of the SIE and DE work together. The DE leverages user data that is locally built up (data is also forgotten) over time to continually improve on the decisions the agent makes. It should be noted that terms "Decision Models" and "Rank Modules" are used interchangeable in the patent when in reference to making decisions that score or rank DOs in order to recommend them to a user.

There is a sequence of steps based on the decision model with different data types, components, and factors used by the DE to make decisions. Below are explanations of the elements used in making a decision:

Dimensions—The dimensions in each calculation represent different variables or data types in the problem space for making a decision. Dimensions are used in different ways in the decision. Based on the calculation part they are processed in a certain order; they are sometimes combined with other dimensions; they sometimes have inner data dimensions that should be processed; and they all have different weightings in the decision.

Inner Dimensional Data and Relations—Some dimensions will have inner dimensions that should be taken into account. Usually this occurs when there are multiple data instances of a certain dimension in the problem space of the decision. For example a DO may have many entities. Although "entity" may be a dimension, the system should calculate how each of the inner dimensions (each entity) contribute to the entity dimension and the DO as a whole based on its relevance in the DO, its weighting, and its relations in the DO.

Abstract and Value Data Types for Inner Dimensions—An example of value data for the entity dimension would be "Brett Favre". His entity type may be "Football Player". Brett Favre acts as the value data piece while Football Player acts as the abstract data piece.

Outer Dimensional Relations—Outer dimensions are relations between different dimensional data types. User may like to consume videos of Yankee games but not like to read stories about them, a user may like NFL articles from ESPN but not SI. The user may like to consume articles about Albert Pujols when he plays for the Cardinals but not like DOs about his local charity work. Therefore the decision can be made based on different outer dimensional relations that are significant in user consumption.

Decision Models—The SIE sends decision models to agents to assist them on making decisions. These are sent in such a format so that for any type of decision the agent has to make, the proper dimensional data types, weightings for those dimensions, and sequence of processing is available to plug into the decision. All decisions are made based on what the SIE determines is relevant for a given contextual problem space and has an action associated with it such as making a recommendation. The SIE develops models for these based on experiences it has with data it encounters. The internet and network of agents act as the domain of its experience; however, with more data, like sensor data, this could be extended into the physical world as well. These models or experiences can be shared with local user agents. The network of agents can also figure out new significant dimensions based on their own experiences and number crunching (See example in Other Program & OS Interactions & API's below in the Monitoring section). These local experiences can be sent to the SIE to do collective computations and processing. If relevant to the network as a whole any local experiences and learning will be globalized on the network and sent out to other agents to assist in their decision processes. The domain of semantic data is covered specifically but this process and the decision models can be used to make decisions over any problem space, even for problems in the real world.

Example 1: Golf Putt (Physical World)

A human can determine significant dimensions when making a putt. From repeated experiences a human knows it's largely based on slope of green, wind, speed of green and which way the grass is facing, how far away the hole is versus how far back a person needs to take the backswing for the putter, ball and putter face resilience, etc. There are possibly thousands more variables and dimensions to consider on varying levels. Most levels are very small in magnitude in relation to a few larger dimensions. All relevant dimensions are put together to make a decision about putting. A human inherently determines how these dimensions relate together. Then the overall importance of the dimensions themselves and also how they relate to each other is taken into account when making a decision. The SIE does the same thing so that user agents have a way to make decisions on with the proper data, dimensions, relations, and weightings.

Example 2: Sports Article Recommendation (Electronic Environment)

Dimensions for this decision might include producer of article (website), author, concepts in article, entities, SPO's, and other data and relationships. These are taken into account and applied to user preferences to decide whether or not to show the DO to the user.

Calculation Parts—Calculation Parts are cascading logic models connected together like links in a chain for decision processing. Many links can be cascaded together to make a decision as there may be different levels to the decision based on data types, dimensions, and generalization. The decision model determines the order that the cascading calculation parts are processed in. The calculation part determines the order that different dimensions are processed in. A score is determined for each calculation part. The sums of previous parts are weighted against the newly calculated part. Parts can be for one significant dimension or for multiple less important dimensions. For each part the DE takes into account many pieces of data within a dimension, amalgamates them in various ways based on weighting, context, and comes up with a score for each piece of data within the different knowledge areas of the calculation part. These knowledge area scores are again amalgamated based on context, level in cascading chain, etc. to come up with a score for the calculation part. This process can be repeated many times till the final DO score is completed depending on number of calculation parts.

Context—The SIE sends a different decision model for each context. Context is like the environmental dimension of the decision. It's an over-arching part of the decision that has the power to change the decision model itself. It can change dimensions used, weighting, etc. Context is the view or perspective (like a "channel" from User Interaction section below) in which the decision takes place. The construct may want to make a decision on DOs from a "new interest" perspective. This would dramatically shift weighting between STM and LTM. The STM component would have a much more dominant weighting over the dimensional data that make up the decision then the LTM component. Data Object type, such as videos, articles, TV shows, messages, etc, also act as a contextual component of the decision. For instance shared DOs and social media messages are sent from a contact or PSTU. The contact or PSTU dimension is brought in for this DO type decision or in a social oriented perspective. Contact and PSTU data may not apply to other DO types or contexts. A popularity perspective may bring a collective social dimension based on the larger viewpoint of the whole network and what it thinks about a DO. New dimensions can be added, deleted, or dimensional weightings can all change based on the decision model for a given context in a particular problem space.

Data Rank Types: Relations and Global Personal Preferences—GPP has no relational bias taken into account. Its value is solely a representation of a user's preference for a particular piece of data like an entity. Relational preferences are based on the relationship and co-existence of two or more pieces of data in DOs. Both of these types of data valuations should be taken into account in the decision process. Each piece of data, whether GPP or relational, has a particular weighting in a calculation part. This weighting is combined with its contribution within the DO to get its score within the dimension or calculation part for its particular data rank type (GPP or relational). All GPP data pieces are combined and all relational data is also combined and added to the overall calculation part score. It should be noted that any piece of semantic data within the DO, for example a particular entity, can reside in both GPP and relational calculations. The DE would rate how much the user likes Brett Favre from GPP and inner-dimensional relational perspective. A user may very like Brett Favre but only DOs about him with Packers and not the Vikings or only prefer DOs about him in a sports context and not a gossip context. The calculation part would specify what type of inner and outer dimensional relations to process and the weightings for each in the DO for a particular context.

Generalized Data—Data can be generalized when a decision is unclear, the semantic data make up of a DO is uncertain, or the known data is very sparse. Abstract data, relations, and taxonomy parental nodes can all be brought into the decision process to generalize the data that is known to get a better understanding of DO make up and how much the user will be interested in the DO. Generalized Data's weighting is much less than known data weightings and may not necessarily be used in the decision process at all if there is enough known data to make a decision on.

Short Term Memory (STM) and Long Term Memory (LTM)—Data progression and forgetting data are used for the intelligence construct to adapt to user changes in preference over time. Preference data is migrated from short term memory to long term memory during its life cycle. At the end of its life cycle the data is discarded or forgotten by the construct. Data exists in short term memory for a certain interval before it's migrated to long term memory. It incrementally progresses through its life cycle from STM to LTM to being forgotten. Based on what stage the data is in it has a certain weighting within calculation parts. For example in a new interest context where DOs are displayed based on user's new interests, STM has a much higher weighting than it does in an overall user preference context which values more established preferences (LTM). These weightings are always taken into account in data calculations. Weighting values can vary for different dimensions (entity, concept, general knowledge area, producer, etc) and data rank types (GPP or relational).

The rate at which data progresses through the memory intervals and is eventually discarded and forgotten is dependent upon data type and frequency of datum exposure. For example a person entity like "Barack Obama" may be forgotten a lot faster than a seasonal TV show like "The Sopranos". The person entity is continually exposed in the news day after day where a user has the opportunity to consume it. The TV show may only have several new TV show DOs created every couple years. They progress and are forgotten at different rates else a TV show will be forgotten too soon or a person entity may persist too long in user preference. Combined with user actions this data migration and progression largely dictates how the DE algorithms change and optimize themselves over time Normalization factors—Normalization is used to equalize different dimensions (inner and outer parts of the same dimension as well) and data rank types scores within different steps of each calculation part. This helps ensure that no one particular dimension or data tank type dominates the overall score of the calculation part thereby making other data within the calculation part insignificant to the score and overall decision. Normalization is applied to different scoring steps in the calculation parts based on the difference in data scores that is recorded over time. A normalization score can be produced for different data sets so that they all contribute on equal footing. As the scoring contribution for a particular data type rises or falls over time the normalization factors will adjust as well. Factors are helpful because large data (like entities) sets may have lower score contributions for an individual datum versus other data types with small data sets (like producers) which will tend to have higher score contributions individually. Also for each DO there can be multiple entities while only one producer. For GPP and relational scores the producer user preference and DO contribution will dominate and render the entity scores and entity relations meaningless to the overall decision. Likewise relations are spread over a much larger domain of possibility so they will have a smaller overall individual score than individual GPP scores. Both these data examples would perform normalization so scoring for each type of data or dimension is accurate and has a chance to equally contribute as it should to the decision dictated by the calculation part they reside in. Decision models from SIE can tell the construct how to create the normalization factoring between the data rank types and dimensions for a given context. The actual normalization score value is user dependent and determine by the local construct.

Weightings—Weightings exist for the different parts of making a decision between dimensions, GPP and relations, abstract and value data, inner and outer dimension, STM and LTM, and even between different calculation parts within the same decision model for a given context. These weightings affect the overall contribution of the particular data part for the decision. For a certain context GPP may contribute 90% of the score versus 10% for relational data. Within a "new interests" context STM will be weighted much higher than LTM.

DO Make Up and Data Part Contribution—Thousands of different pieces of semantic intelligence data make up a DO and each one has a contribution within the DO. The data includes different data dimensions such as entities, Subject-Predicate-Objects (SPO), concepts, categories, etc. They all contribute to the overall make up of a DO and how the DE scores it. If a DO has an entity that contributes highly to a DO and the user has a high preference for that entity the DO will be scored higher in that portion of the decision than another DO with same entity that doesn't contribute as much to the DO make up. Likewise if an entity has low contribution to a DO and the user only mildly likes the entity that DO will score even lower in that portion of the decision. Each portion for dimensions, data rank types, and calculation parts are added and weighted properly to make an overall decision.

Algorithmic Changes and Optimizations—The construct continually fine tunes decision model calculation part weightings, data rank types, and dimensions. A Neural Network (NN) based algorithm is used to go over all parts of each decision and find which parts ultimately contribute most and least to successful user outcomes like DO consumption for recommendation actions. This employs a brute force method of trying out new weightings, data rank types, and dimensional combinations over time to find an optimum decision path. The NN goes back through DO's, rescores them, taking into account which ones were consumed and not consumed, with different combinations of dimensions, weightings, data parts used with different calculation parts to optimize and personalize the algorithm for the user so that the best dimensions, data parts, and the most accurate weights are used. This not only personalizes the DE for the user but also optimizes the algorithm so that parts of the algorithm (dimensions, data parts, calculation parts, etc) that aren't highly contributive to successful user outcomes like DO consumption are not used thereby saving time and process cycles to deliver better data faster to the user more efficiently. The NN is also used to optimize the data progression process from STM to LTM to finally data deletion. Migrations intervals and decision contribution weighting are optimized.

Adding New Calculation Parts and Learning New Dimensions—New contexts, dimensions, data rank types, calculation parts all can be added and incorporated at any time from Master Agent or local agent. The agent can figure out new decision model dimensions and data and update existing models. The agent will incorporate them into decisions process to see if there's any benefit to DO consumption or other successful actions. Successes are kept in the local algorithm and also shared with Master Agent so other network agents can benefit from the new knowledge to make better decisions for their users. (See example in Other Program & OS Interactions & API's below in the Monitoring section) The discovery of new dimension is a brute force discovery method traversing all relevant, exposed data in a problem space. The discovery of new dimension is really just limited to available processing power and spare processor cycles.

Algorithmic Device Depth—Depth of number crunching, number of dimensions per calculation part, number of data parts per inner dimension can be reduced or "shaved" based on attributes (e.g., processing power, memory, and/or battery capacity) the device making the decision. A mobile phone may have an algorithm that shaves less likely data (usually lower contribution and lower user preference scored data/dimensions) so that the decision process is streamlined and doesn't use as much processor power to conserve battery life. Decisions can be based on higher or lower level data as dictated based on time and computation environmental constraints. The construct can take the device itself on as a dimension to learn what DO types a user is likely to consume per device with the help of other agents, the SIE, or through the use of the NN optimization algorithm. It can easily learn to recommend TV shows and movies for a television agent.

Similarity—Similarity calculations can be taken into account for certain context as dictated by calculation parts. For instance constructs may want to determine how similar user preference is to a contact in a certain knowledge area such as music genres when a contact shares a new song on a social media website. The construct can decide to recommend the social media message-based song to the user or not partly based on similarity of the two users over the semantic domain of the DO as well as individual user preferences. The calculation parts can tell the DE when to use a similarity calculation to help score the decision.

Decision Threshold Scoring—Each decision has a threshold to take action or not. If the intelligence construct tabulates a score that exceeds the decision threshold for a certain contextual decision model then the action is taken such as making a recommendation.

Figure 28:
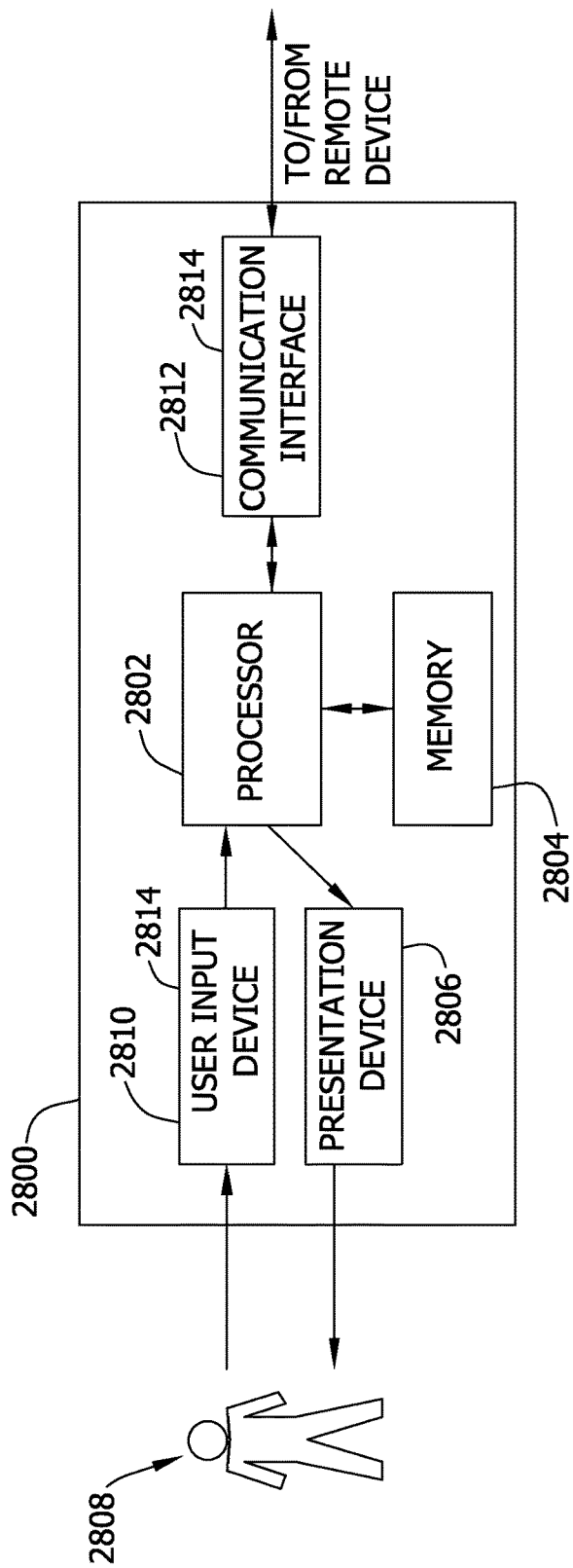
FIG. 28 is a block diagram of an exemplary computing device.

Methods and operations described herein may be performed by one or more computing devices. FIG. 28 is a block diagram of an exemplary computing device 2800. Computing device 2800 includes a processor 2802 for executing instructions. In some embodiments, executable instructions are stored in a memory 2804. Memory 2804 is any device allowing information, such as executable instructions, bodies of text, semantic data, preference data, configuration options (e.g., predetermined durations for receiving transmissions), and/or other data, to be stored and retrieved.

Computing device 2800 also includes at least one presentation device 2806 for presenting information to a user 2808. Presentation device 2806 is any component capable of conveying information to user 2808. Presentation device 2806 may include, without limitation, a display device (e.g., a liquid crystal display (LCD), organic light emitting diode (OLED) display, or "electronic ink" display) and/or an audio output device (e.g., a speaker or headphones). In some embodiments, presentation device 2806 includes an output adapter, such as a video adapter and/or an audio adapter. An output adapter is operatively coupled to processor 2802 and configured to be operatively coupled to an output device, such as a display device or an audio output device.

In some embodiments, computing device 2800 includes a user input device 2810 for receiving input from user 2808. User input device 2810 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 2806 and user input device 2810.

Computing device 2800 also includes a communication interface 2812, which enables computing device 2800 to communicate with a remote device (e.g., another computing device 2800) via a communication medium, such as a wired or wireless network. For example, computing device 2800 may transmit and/or receive messages (e.g., requests and/or responses related to semantic data and/or preferences) via communication interface 2812. User input device 2810 and/or communication interface 2812 may be referred to as an input interface 2814.

In some embodiments, memory 2804 stores computer-executable instructions for performing one or more of the operations described herein.

Exemplary Operating Environment

Methods described herein may be performed by a computer or computing device. A computer or computing device may include one or more processors or processing units, system memory, and some form of computer readable media. Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules, or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for determining, distributing, and acting upon semantic data.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A storage device having embodied thereon computer-executable instructions, wherein when executed by a processor of a user computing device, the computer-executable instructions cause the user computing device to:
predict, by a user computing device decision engine, a value to a user, of information associated with each of a plurality of data objects (DOs) based on previous experience with the information and relations amongst the information using semantic relations and user preference values;

receive data object (DO) information including locations and semantic data associated with each DO of the plurality of DOs from a remote computing device;

select a DO from the plurality of DOs that is predicted to include information of value to the user based on the semantic data associated with the DO and user preference data associated with a user of the user computing device;

retrieve at least a portion of the selected DO from the location associated with the selected DO; and present the retrieved portion of the selected DO.

2. The storage device of claim 1, wherein the user preference data is not transmitted to the remote computing device.

3. The storage device of claim 1, wherein the computer-executable instructions further cause the user computing device to:

transmit a portion of the user preference data to the remote computing device via one or more other user computing devices; and receive the DO information by receiving, via the one or more other user computing devices, locations and semantic data associated with DOs that are selected by the remote computing device based on the transmitted portion of the user preference data.

4. The storage device of claim 1, wherein the DO information includes locations and semantic data associated with a plurality of advertisements, and the computer-executable instructions further cause the user computing device to present the selected DO by presenting a selected advertisement within another DO that is not an advertisement.

5. The storage device of claim 1, wherein the computer-executable instructions further cause the user computing device to:

receive a selection of the presented portion of the selected DO;

retrieve a full copy of the DO from the location associated with the DO in response to the selection;

present the full copy of the DO; and update the user preference data based on the semantic data associated with the presented DO.

6. The storage device of claim 5, wherein the computer-executable instructions cause the user computing device to update the user preference by updating preference data representing one or more user interests associated with the user.

7. The storage device of claim 5, wherein the user computing device is a first user computing device associated with a first user, and the computer-executable instructions cause the user computing device to transmit the location and the semantic data associated with the selected DO to a second user computing device based on the selection of the presented portion of the selected DO and based further on an association between the first user and a second user associated with the second user computing device.

8. The storage device of claim 1, wherein the computer-executable instructions further cause the user computing device to:

monitor DO access by the user of the user computing device; and transmit a location of an accessed DO to a server computing device when semantic data associated with the accessed DO has not been received.

9. The storage device of claim 1, wherein the computer-executable instructions further cause the user computing device to:

receive a selection of a user account associated with the user of the user computing device; and update the user preference data based on one or more of the following: content of messages within the selected user account, preference data within the selected user account, and contacts within the selected user account.

10. The storage device of claim 1, wherein the computer-executable instructions further cause the user computing device to:

receive a DO decision model from the remote computing device; and select the DO based further on the DO decision model.

11. The storage device of claim 1, wherein the user computing device is a first user computing device, and the computer-executable instructions further cause the first user computing device to request the DO information from a second user computing device.

12. The storage device of claim 1, wherein the DO is selected based on a DO decision model including a plurality of dimensions, and the computer-executable instructions further cause the user computing device to determine a subset of the plurality of dimensions based on one or more attributes of the user computing device; and selecting the DO based on the determined subset.

* * * * *